(12) United States Patent
Kimura et al.

(10) Patent No.: US 6,785,060 B2
(45) Date of Patent: Aug. 31, 2004

(54) REFLECTING TYPE OPTICAL SYSTEM

(75) Inventors: Kenichi Kimura, Kanagawa-ken (JP); Tsunefumi Tanaka, Kanagawa-ken (JP); Toshiya Kurihashi, Tokyo (JP); Shigeo Ogura, Tokyo (JP); Keisuke Araki, Kanagawa-ken (JP); Makoto Sekita, Kanagawa-ken (JP); Nobuhiro Takeda, Kanagawa-ken (JP); Yoshihiro Uchino, Fukuoka-ken (JP); Toshikazu Yanai, Kanagawa-ken (JP); Norihiro Nanba, Kanagawa-ken (JP); Hiroshi Saruwatari, Kanagawa-ken (JP); Takeshi Akiyama, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 368 days.

(21) Appl. No.: 10/043,305

(22) Filed: Jan. 14, 2002

(65) Prior Publication Data

US 2002/0105734 A1 Aug. 8, 2002

Related U.S. Application Data

(62) Division of application No. 09/612,290, filed on Jul. 7, 2000, which is a division of application No. 08/606,824, filed on Feb. 26, 1996, now Pat. No. 6,166,866.

(30) Foreign Application Priority Data

Feb. 28, 1995 (JP) .............................. 7-065109
Apr. 24, 1995 (JP) .............................. 7-123238

(51) Int. Cl.$^7$ ............................................. G02B 17/00
(52) U.S. Cl. ..................... 359/729; 359/726; 359/720
(58) Field of Search ................................. 359/729, 726, 359/720, 676, 683, 731

(56) References Cited

U.S. PATENT DOCUMENTS

| | | | |
|---|---|---|---|
| 2,534,543 A | 12/1950 | Bullock | 95/11 |
| 3,012,464 A | 12/1961 | Papke | 88/2.4 |
| 3,305,294 A | 2/1967 | Alvarez | 351/169 |

(List continued on next page.)

FOREIGN PATENT DOCUMENTS

| | | |
|---|---|---|
| EP | 0 722 106 | 7/1796 |
| EP | 0 365 406 | 4/1990 |
| EP | 0 730 180 | 9/1996 |
| EP | 0 790 513 | 8/1997 |
| GB | 2 126 746 | 3/1984 |
| JP | 2-297516 | 12/1990 |
| JP | 4-40688 | 7/1992 |
| JP | 5-12704 | 1/1993 |
| JP | 6-139612 | 5/1994 |
| JP | 6-347699 | 12/1994 |
| WO | WO 92/21054 | 11/1992 |

OTHER PUBLICATIONS

S. Yamazaki, et al., "Development of Super Compact HMD With Sight Line Input," Proceedings of 3D Image Conference '95 (Jul. 6, 1995), pp. 70–75 (and translation).

Primary Examiner—Scott J. Sugarman
(74) Attorney, Agent, or Firm—Fitzpatrick, Cella, Harper & Scinto

(57) ABSTRACT

A reflecting-type optical system according to the invention includes an optical element composed of a transparent body having an entrance surface, an exit surface and at least three curved reflecting surfaces of internal reflection. A light beam coming from an object and entering at the entrance surface is reflected from at least one of the reflecting surfaces to form a primary image within the optical element and is, then, made to exit from the exit surface through the remaining reflecting surfaces to form an object image on a predetermined plane. In the optical system, 70% or more of the length of a reference axis in the optical element lies in one plane.

7 Claims, 26 Drawing Sheets

U.S. PATENT DOCUMENTS

| | | | |
|---|---|---|---|
| 3,674,334 A | 7/1972 | Offner | 350/55 |
| 3,677,621 A | 7/1972 | Smith | 350/157 |
| 3,741,622 A | 6/1973 | Cox | 350/40 |
| 3,810,221 A | 5/1974 | Plummer | 88/1.5 R |
| 3,897,133 A | 7/1975 | Warner et al. | 378/34 |
| 3,914,011 A | 10/1975 | Mallinson et al. | 350/50 |
| 4,192,573 A | 3/1980 | Brown, Jr. | 350/55 |
| 4,249,793 A | 2/1981 | Uehara | 350/43 |
| 4,265,510 A | 5/1981 | Cook | 350/55 |
| 4,407,567 A | 10/1983 | Michelet et al. | 350/423 |
| 4,477,156 A | 10/1984 | Gebelein et al. | 350/503 |
| 4,571,036 A | 2/1986 | Gebelein et al. | 350/503 |
| 4,650,292 A | 3/1987 | Baker et al. | 350/432 |
| 4,682,237 A | 7/1987 | Kato et al. | 358/225 |
| 4,737,021 A | 4/1988 | Korsch | 350/505 |
| 4,743,103 A | 5/1988 | Estelle | 350/445 |
| 4,775,217 A | 10/1988 | Ellis | 350/538 |
| 4,812,030 A | 3/1989 | Pinson | 350/620 |
| 4,812,864 A | 3/1989 | Baker | 354/224 |
| 4,971,428 A | 11/1990 | Moskovich | 350/442 |
| 4,993,818 A | 2/1991 | Cook | 350/505 |
| 5,034,764 A | 7/1991 | Inabata | 354/223 |
| 5,063,586 A | 11/1991 | Jewell et al. | 378/34 |
| 5,134,526 A | 7/1992 | Inabata | 359/726 |
| 5,144,476 A | 9/1992 | Kebo | 359/366 |
| 5,148,308 A | 9/1992 | Miyauchi | 359/432 |
| 5,231,534 A | 7/1993 | Kato | 359/432 |
| 5,381,265 A | 1/1995 | Ohshita | 359/422 |
| 5,448,411 A | 9/1995 | Morooka | 359/676 |
| 5,452,126 A | 9/1995 | Johnson | 359/407 |
| 5,453,877 A | 9/1995 | Gerbe et al. | 359/633 |
| 5,557,454 A | 9/1996 | Takahashi | 359/378 |
| 5,559,629 A | 9/1996 | Sheets et al. | 359/364 |
| 5,594,588 A | 1/1997 | Togino | 359/631 |
| 5,640,632 A | 6/1997 | Koyama et al. | 396/382 |
| 5,644,436 A | 7/1997 | Togino et al. | 359/731 |
| 5,663,833 A | 9/1997 | Nanba et al. | 359/631 |
| 5,687,025 A | 11/1997 | Nanba | 359/633 |
| 5,689,736 A | 11/1997 | Okuyama et al. | 396/51 |
| 5,699,194 A | 12/1997 | Takahashi | 359/633 |
| 5,701,202 A | 12/1997 | Takahashi | 359/631 |
| 5,726,807 A | 3/1998 | Nakaoka et al. | 359/631 |
| 5,734,505 A | 3/1998 | Togino et al. | 359/631 |
| 5,739,956 A | 4/1998 | Ohtake | 359/643 |
| 5,777,804 A | 7/1998 | Nakamura et al. | 359/727 |
| 5,912,769 A | 6/1999 | Iizuka et al. | 359/631 |
| 5,917,662 A | 6/1999 | Sekita | 359/729 |
| 5,973,858 A | 10/1999 | Sekita | 359/729 |
| 5,995,287 A | 11/1999 | Sekita | 359/599 |
| 5,999,311 A | 12/1999 | Nanba et al. | 359/365 |
| 6,021,004 A | 2/2000 | Sekita et al. | 359/676 |
| 6,049,429 A | 4/2000 | Iizuka et al. | 359/631 |
| 6,097,550 A | 8/2000 | Kimura | 359/729 |
| 6,124,986 A | 9/2000 | Sekita et al. | 359/691 |
| 6,163,400 A | 12/2000 | Nanba | 359/365 |
| 6,166,866 A | 12/2000 | Kimura et al. | 359/729 |
| 6,204,978 B1 | 3/2001 | Akiyama et al. | 359/729 |
| 6,292,309 B1 | 9/2001 | Sekita et al. | 359/729 |
| 6,301,064 B1 | 10/2001 | Araki et al. | 359/834 |

FIG.6A
VERTICAL ANGLE OF INCIDENCE
Ux 24.8
Uy 31.7
HORIZONTAL ANGLE OF INCIDENCE
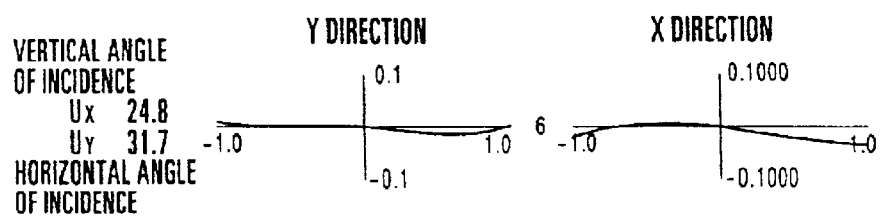

FIG.6B
VERTICAL ANGLE OF INCIDENCE
Ux 24.8
Uy 0
HORIZONTAL ANGLE OF INCIDENCE
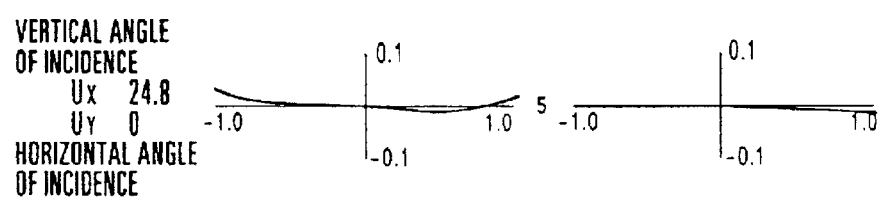

FIG.6C
VERTICAL ANGLE OF INCIDENCE
Ux 24.8
Uy -31.7
HORIZONTAL ANGLE OF INCIDENCE
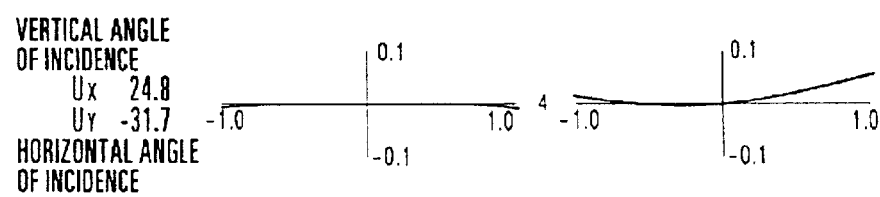

FIG.6D
VERTICAL ANGLE OF INCIDENCE
Ux 0
Uy 31.7
HORIZONTAL ANGLE OF INCIDENCE
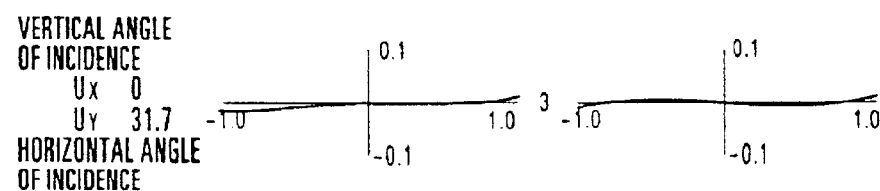

FIG.6E
VERTICAL ANGLE OF INCIDENCE
Ux 0
Uy 0
HORIZONTAL ANGLE OF INCIDENCE
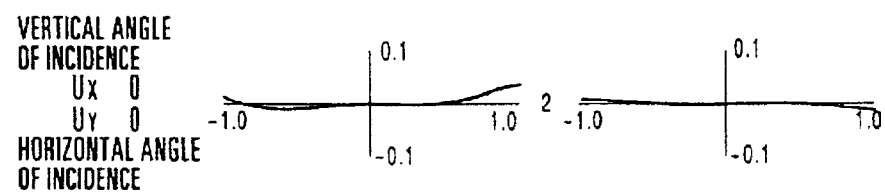

FIG.6F
VERTICAL ANGLE OF INCIDENCE
Ux 0
Uy -31.7
HORIZONTAL ANGLE OF INCIDENCE
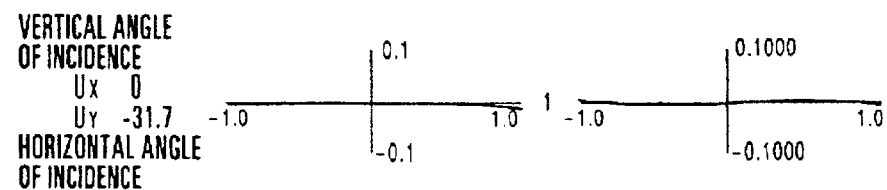

FIG. 12
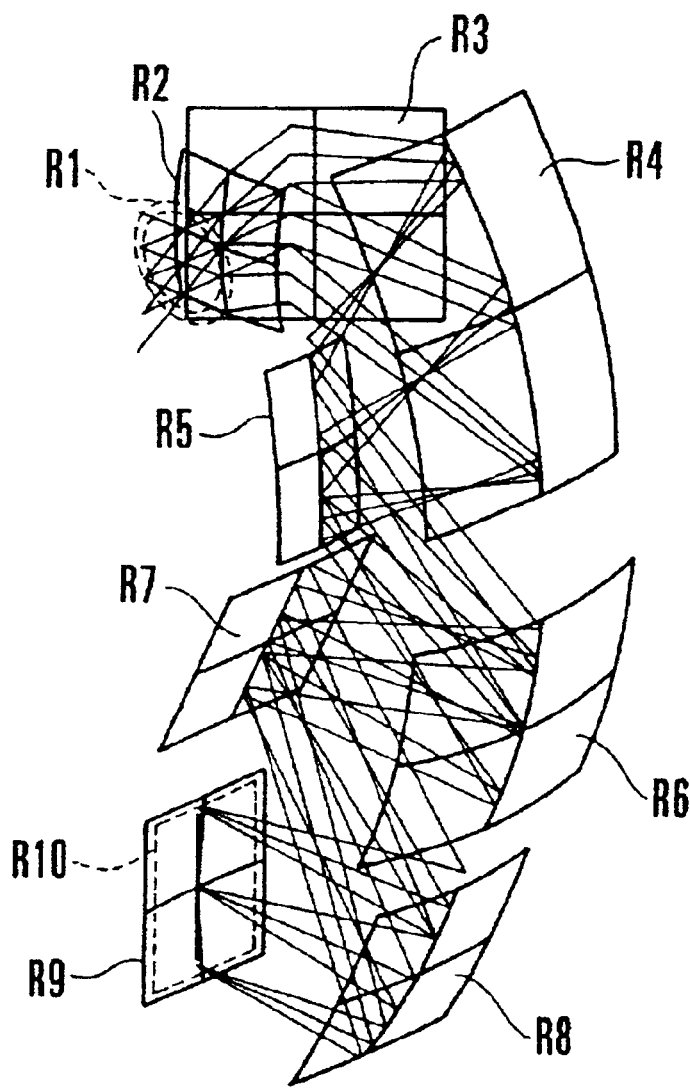
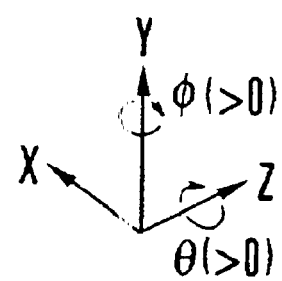

FIG. 22
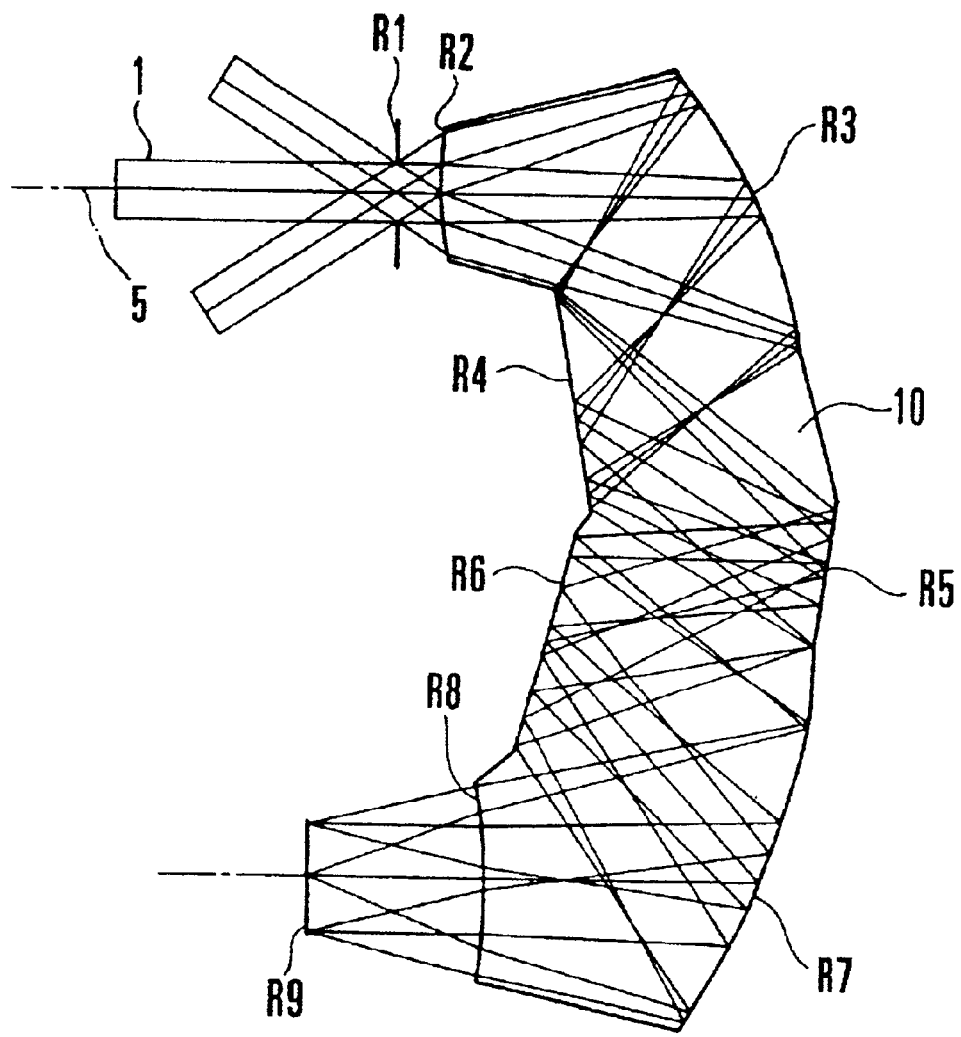
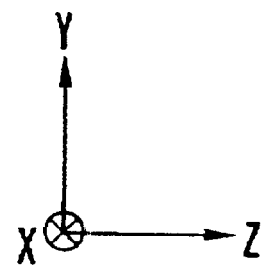

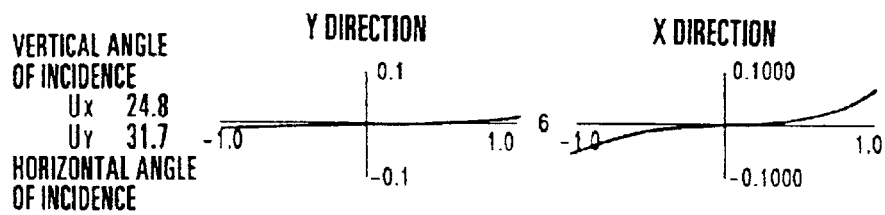

FIG.23A  VERTICAL ANGLE OF INCIDENCE Ux 24.8 Uy 31.7 HORIZONTAL ANGLE OF INCIDENCE

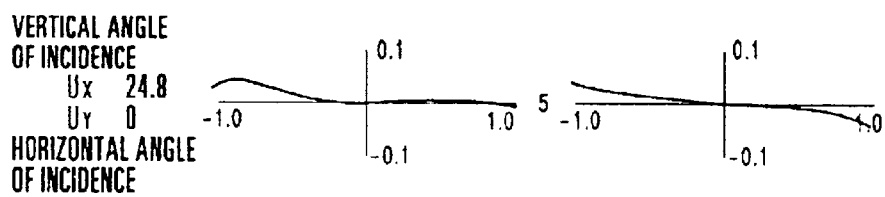

FIG.23B  VERTICAL ANGLE OF INCIDENCE Ux 24.8 Uy 0 HORIZONTAL ANGLE OF INCIDENCE

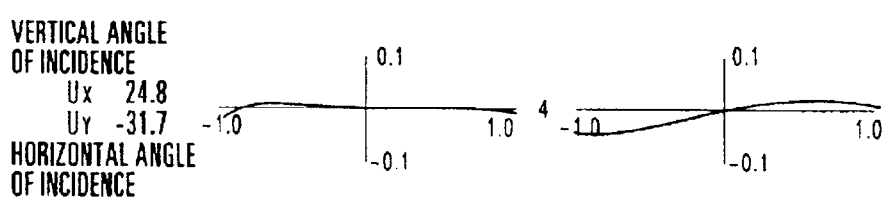

FIG.23C  VERTICAL ANGLE OF INCIDENCE Ux 24.8 Uy -31.7 HORIZONTAL ANGLE OF INCIDENCE

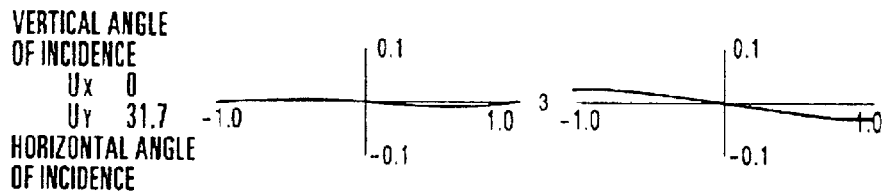

FIG.23D  VERTICAL ANGLE OF INCIDENCE Ux 0 Uy 31.7 HORIZONTAL ANGLE OF INCIDENCE

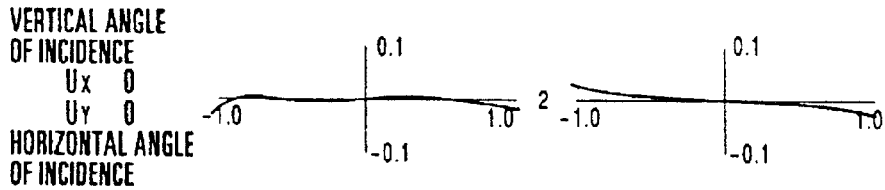

FIG.23E  VERTICAL ANGLE OF INCIDENCE Ux 0 Uy 0 HORIZONTAL ANGLE OF INCIDENCE

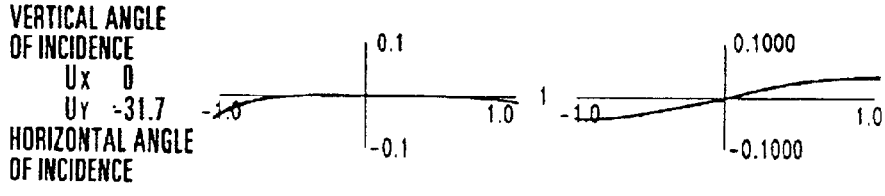

FIG.23F  VERTICAL ANGLE OF INCIDENCE Ux 0 Uy -31.7 HORIZONTAL ANGLE OF INCIDENCE

REFLECTING TYPE OPTICAL SYSTEM

This application is a division of application Ser. No. 09/612,290 filed Jul. 7, 2000, which is a division of application Ser. No. 08/606,824 filed Feb. 26, 1996 now U.S. Pat. No. 6,166,866.

BACKGROUND OF THE INVENTION

1. Field of the Invention

This invention relates to optical systems of reflecting type and image pickup apparatuses using the same and, more particularly, to such optical systems which, using an optical element of many reflecting surfaces, form an object image on a predetermined plane. Still more particularly, this invention relates to improvements of the compact form of the entirety of the optical system suited to video cameras, still cameras or copying machines.

2. Description of the Related Art

There have been many previous proposals for utilizing the reflecting surfaces of convex and concave mirrors in the optical system for an image pickup apparatus. FIG. 24 schematically shows a so-called mirror optical system composed of one concave mirror and one convex mirror.

In the so-called mirror optical system of FIG. 24, an axial beam 104 coming from an object is reflected from the concave mirror 101. While being converged, it goes toward the object side and is then reflected by the convex mirror 102 to form an image on an image plane 103.

This mirror optical system is based on the configuration of the so-called Cassegrainian reflecting telescope. The aim of adopting it is to shorten the total length of the entire system as the equivalent telephoto system which is constructed with refracting surfaces or lenses alone has a long total length. To this purpose, the optical path is folded twice by using two reflecting surfaces arranged in confronting relation.

Even for the objective lens systems of telescopes, besides the Cassegrainian type, there are known, from a similar reason, a large number of forms with the use of a plurality of reflecting mirrors in shortening the total length of the optical system.

Like this, in a case where a photographic lens would take a long total length, it has been the common practice to employ reflecting mirrors instead of some of the lens members. By folding the optical path to good efficiency, a compact mirror optical system is obtained.

However, the Cassegrainian reflecting telescopes and like mirror optical systems generally suffer a problem due to the vignetting effect by the convex mirror 102, as the object light beam is partly mutilated. This problem will exist so long as the convex mirror 102 is laid at the central passage of the object beam 104.

To solve this problem, the reflecting mirror may be decentered, thus avoiding obstruction of the passage of the object beam 104 by the unintegrated part of the optical system. In other words, the principal ray 106 of the light beam is dislocated away from an optical axis 105. Such an optical system, too, has previously been proposed.

FIG. 25 is a schematic diagram of a mirror optical system disclosed in U.S. Pat. No. 3,674,334, wherein the problem of mutilation described above is solved in such a way that the reflecting mirrors to be used are rotationally symmetric with respect to the optical axis and partly cut off.

The mirror optical system of FIG. 25 comprises, in order of passage of the light beam, a concave mirror 111, a convex mirror 113 and a concave mirror 112, which, when in the prototype design, are, as shown by the double dot-and-dash lines, the complete reflecting surfaces of rotational symmetry with respect to the optical axis 114 of these, the concave mirror 111 is used only in the upper half on the paper of the drawing with respect to the optical axis 114, the convex mirror 113 only in the lower half and the concave mirror 112 only in a lower marginal portion, thereby bringing the principal ray 116 of the object beam 115 into dislocation away from the optical axis 114. The optical system is thus made free from the mutilation of the object beam 115.

FIG. 26 shows another mirror optical system which is disclosed in U.S. Pat. No. 5,063,586. The reflecting mirrors have their central axes made themselves to decenter from the optical axis. As a result, the principal ray of the object beam is dislocated from the optical axis, thus solving the above-described problem.

Referring to FIG. 26, assume that the perpendicular line 127 to the object plane 121 is an optical axis. With a convex mirror 122, a concave mirror 123, a convex mirror 124 and a concave mirror 125 in order of passage of the light beam, it is then proven that the centers of their reflecting areas do not fall on the optical axis 127 and that their central axes (the lines connecting those centers with the respective centers of curvature of the reflecting surfaces) 122$a$, 123$a$, 124$a$ and 125$a$ are decentered from the optical axis 127. In connection with this figure, the decentering amount and the radius of curvatures of every one surface are appropriately determined to prevent the object beam 128 from being mutilated by the other mirrors. Thus, an object image is formed on a focal plane 126 with high efficiency.

Besides these, U.S. Pat. Nos. 4,737,021 and 4,265,510 even disclose similar systems freed from the vignetting effect either by using certain portions of the reflecting mirrors of revolution symmetry about the optical axis or by decentering the central axes themselves of the reflecting mirrors from the optical axis.

These reflecting type photographic optical systems, because they have a great number of constituent parts, require highly precise assembly of the individual optical parts to insure satisfactory optical performance. In particular, because the tolerance for the relative positions of the reflecting mirrors is severe, later adjustment of the position and angle of orientation of each reflecting mirror is indispensable.

To solve this problem, one of the proposed methods is to construct the mirror system in the form of, for example, a block, thus avoiding the error which would otherwise result from the stepwise incorporation of the optical parts when in assembling.

It has been known to provide one block with a large number of reflecting surfaces. For example, the viewfinder systems employ optical prisms such as pentagonal roof prisms or Porro prisms.

These prisms are made by molding techniques to unify the plurality of reflecting surfaces. Therefore, all the reflecting surfaces take their relative positions in so much good accuracy as to obviate the necessity of adjusting the positions of the reflecting surfaces relative to one another. However, the main function of these prisms is to change the direction of travel of light for the purpose of inverting the image. Every reflecting surface is, therefore, made to be a flat surface.

For the counterpart to this, there is also known an optical system by giving curvature to the reflecting surface of the prism.

FIG. 27 is a schematic diagram of the main parts of an observing optical system disclosed in U.S. Pat. No. 4,775, 217. This optical system is used for observing the external field or landscape and, at the same time, presenting an information display of data and icons in overlapping relation on the landscape.

The rays of light 145 radiating from the information display device 141 are reflected from a surface 142, going to the object side until they arrive at a half-mirror 143 of concave curvature. The reflected ones of the light rays 145 from the half-mirror 143 are nearly collimated by the refractive power of the concave surface 143, and refract in crossing the surface 142, reaching the eye 144 of the observer. The observer views an enlarged virtual image of the displayed data or icons.

Meanwhile, a light beam 146 from an object enters at a surface 147 which is nearly parallel with the reflecting surface 142, and is refracted by it and arrives at the concave surface 143. Since this surface 143 is coated with a half-permeable layer by the vacuum evaporation technique, part of the light beam 146 penetrates the concave surface 143 and refracts in crossing the surface 142, entering the pupil 144 of the observer. So, the observer views the display image in overlapping relation on the external field or landscape.

FIG. 28 is a schematic diagram of the main parts of another observing optical system disclosed in Japanese Laid-Open Patent Application No. Hei 2-297516. This optical system, too, is used for viewing the external field or landscape and, at the same time, noticing the information on the display device in overlapping relation.

In this system, a light beam 154 from an information display 150 enters a prism Pa at a flat surface 157 and is incident on a paraboloidal reflecting surface 151. Being reflected from this surface 151, the display light beam 154 becomes a converging beam. Before the display light beam 154 forms an image on a focal plane 156, three total reflections occur as the beam 154 travels between two parallel flat surfaces 157 and 158 of the prism Pa. A thinning of the entirety of the optical system is thus achieved.

From the focal plane 156, the display light beam 154 exits as a diverging beam and, while repeating total reflection from the flat surfaces 157 and 158, goes on until it is incident on a paraboloidal surface 152. Since this surface 152 is a half-mirror, the beam 154 is reflected and, at the same time, undergoes its refractive power, forming an enlarged virtual image of the display and becoming a nearly parallel beam. After having penetrated the surface 157, the beam 154 enters the pupil 153 of the observer. Thus, the observer looks at the display image on the background of the external field or landscape.

Meanwhile, an object light beam 155 from the external field passes through a flat surface 158b constituting a prism Pb, then penetrates the paraboloidal half-mirror 152 and then exits from the surface 157, reaching the eye 153 of the observer. So, the observer views the external field or landscape with the display image overlapping thereon.

Further, an optical element can be used in the reflecting surface of the prism. This is exemplified as disclosed in, for example, Japanese Laid-Open Patent Applications Nos. Hei 5-12704 and Hei 6-139612 as applied to the optical head for photo-pickup. Such a head receives the light from a semiconductor laser, then reflects it from the Fresnel surface or hologram surface to form an image on a disk, and then conducts the reflected light from the disk to a detector.

The mirror optical systems of the U.S. Pat. Nos. 3,674,334, 5,063,586 and 4,265,510 mentioned before have a common feature that all the reflecting mirrors are made decentered by respective different amounts to one another. Hence, the mounting mechanism for the reflecting mirrors becomes very complicated in structure. It is also very difficult to secure the acceptable mount tolerance.

It should be also noted that the known reflecting-type photographic optical systems are adapted for application to the so-called telephoto type of lens systems as this type has a long total length and a small field angle. To attain a photographic optical system handling field angles from the standard lens to the wide-angle lens, which require an increasing number of reflecting surfaces for correcting aberrations, the parts must be manufactured even more precisely and assembled with even severer a tolerance. Therefore, production costs rise. Otherwise, the size of the entire system tends to increase largely.

Also, the observing optical systems of the U.S. Pat. No. 4,775,217 and the Japanese Laid-Open Patent Application No. Hei 2-297516 mentioned before each have an aim chiefly to produce the pupil image forming function such that, as the information display is positioned remotely of the observer's eye, the light is conducted with high efficiency to the pupil of the observer. Another chief aim is to change the direction of travel of the light. Concerning the positive use of the curvature-imparted reflecting surface in correcting aberrations, therefore, no technical ideas are directly disclosed.

Also, the optical systems for photo-pickup of the Japanese Laid-Open Patent Applications Nos. Hei 5-12704 and Hei 6-139612 mentioned before each limit its use in the detecting purpose. Therefore, these systems are unable to satisfy the imaging performance for photographic optical systems and particularly image pickup apparatus using CCD or like area type image sensor.

SUMMARY OF THE INVENTION

A plurality of reflecting surfaces of curved and flat shapes are formed in unison to produce an optical element. By using a plurality of such optical elements, a mirror optical system is constructed to minimize its size. At the same time, the position and orientation tolerances (assembling tolerances) for the reflecting mirrors are made looser than was heretofore usually necessary mirror optical systems. It is, therefore, a first object of the invention to provide a highly accurate optical system of reflecting type and an image pickup apparatus using the same.

A stop is located at a position nearest the object side in the optical system, and an object image is formed at least once within the optical system. With this, even in a reflecting-type wide angle optical system, the effective diameter of the optical system is shortened. Moreover, a plurality of reflecting surfaces constituting the optical element are given appropriate refractive powers and the reflecting surfaces constituting every optical system are arranged in decentering relation to thereby zigzag the optical path in the optical system to a desired conformation, thus shortening the total length of the optical system in a certain direction. It is, therefore, a second object of the invention to provide a compact optical system of reflecting type and an image pickup apparatus using the same.

To attain the above objects, a reflecting-type optical system according to the invention comprises an optical element composed of a transparent body having an entrance surface, an exit surface and at least three curved reflecting surfaces of internal reflection, wherein a light beam coming from an object and entering at the entrance surface is reflected from at least one of the reflecting surfaces to form a primary image within the optical element and is, then, made to exit from the exit surface through the remaining reflecting surfaces to form an object image on a predetermined plane, and wherein 70% or more of the length of a reference axis in the optical element lies in one plane.

In particular, the characteristic features of the invention are as follows:

A stop is located adjacent to the entrance surface of the optical element;

The first curved reflecting surface of the optical element, when counted from the object side, has a converging action;

The first curved reflecting surface is formed to an ellipsoid of revolution;

The shape of the first curved reflecting surface is expressed by using a local coordinate system (x,y,z) for the first curved reflecting surface and letting coefficients representing the shape of a base zone of the first curved reflecting surface be denoted by a, b and t, wherein, putting $$A = (a + b)(y^2 \cos^2 t + x^2)$$
$$B = 2ab \cos t[1 + \{(b - a) y \sin t/(2ab)\}$$
$$+ \{1 + \{(b - a) y \sin t/(ab)\} - \{y^2/(ab)\}$$
$$- \{4ab \cos^2 t + (a + b)^2 \sin^2 t\} x^2/(4a^2 b^2 \cos^2 t)\}^{1/2}]$$

and defining $$z = A/B + C_{02}y^2 + C_{20}x^2 + C_{03}y^3 + C_{21}x^2y + C_{04}y^4 + C_{22}x^2y^2 + C_{40}x^4$$

the following conditions are satisfied:

$a\ b > 0$ $0.9 < t/|\theta| < 1.5$ $0.9 < a/d < 2.0$ $0.9 < b/d < 2.0$ where θ is an angle of inclination of the first curved reflecting surface with respect to the reference axis and d is the distance between the center of the stop and the first curved reflecting surface as measured along the reference axis;

All design parameters are so determined that an entrance pupil of the reflecting type optical system is located nearer to an object side than the first reflecting surface, when counted from the object side, of the optical element;

In the optical element, an entering reference axis and an exiting reference axis are in parallel and are directed in the same direction;

In the optical element, an entering reference axis and an exiting reference axis are in parallel and are directed in opposite directions;

In the optical element, an entering reference axis and an exiting reference axis are orthogonal to each other;

The curved reflecting surfaces constituting the optical element each are of a form having only one plane of symmetry;

The entrance surface and the exit surface each have a refractive power;

The entrance surface has a positive refractive power;

The entrance surface has a negative refractive power and the exit surface has a positive refractive power;

The entrance surface and the exit surface each have a negative refractive power;

The entrance surface and the exit surface each have a positive refractive power;

The entrance surface has a positive refractive power and the exit surface has a negative refractive power;

The entrance surface and the exit surface each have a form which is rotationally symmetric with respect to the reference axis;

The optical element moves in parallel to the exiting reference axis to effect focusing;

The whole of the reference axis of the optical element lies on one plane; and

The optical element has a reflecting surface whose normal line at a point of intersection with the reference axis is inclined with respect to a plane in which more than 70% of the length of the reference axis of the optical element lies.

Another reflecting type optical system according to the invention comprises an optical element having at least three curved reflecting surfaces of surface reflection whose reference axis lies on one plane and which are formed in unison so as to be opposed to each other, wherein a light beam coming from an object is reflected from at least one of the three curved reflecting surfaces to form an object image and the object image is then re-formed in a contracted fashion on a predetermined plane by the remaining reflecting surfaces.

In particular, the characteristic features of the invention are as follows:

A stop is located on an object side of the optical element;

The first curved reflecting surface, when counted from the object side, of the optical element has a converging action;

The first curved reflecting surface is formed to an ellipsoid of revolution;

The shape of the first curved reflecting surface is expressed by using a local coordinate system (x,y,z) for the first curved reflecting surface and letting coefficients representing the shape of a base zone of the first curved reflecting surface be denoted by a, b and t, wherein, putting $$A = (a + b)(y^2 \cos^2 t + x^2)$$
$$B = 2ab \cos t[1 + \{(b - a) y \sin t/(2ab)\}$$
$$+ \{1 + \{(b - a) y \sin t/(ab)\} - \{y^2/(ab)\}$$
$$- \{4ab \cos^2 t + (a + b)^2 \sin^2 t\} x^2/(4a^2 b^2 \cos^2 t)\}^{1/2}]$$

and defining $$z = A/B + C_{02}y^2 + C_{20}x^2 + C_{03}y^3 + C_{21}x^2y + C_{04}y^4 + C_{22}x^2y^2 + C_{40}x^4$$

the following conditions are satisfied:

$ab > 0$ $0.9 < t/|\theta| < 1.5$ $0.9 < a/d < 2.0$ $0.9 < b/d < 2.0$ where θ is an angle of inclination of the first curved reflecting surface with respect to the reference axis and d is the distance between the center of the stop and the first curved reflecting surface as measured along the reference axis;

All design parameters are so determined that an entrance pupil of the reflecting type optical system is located nearer to an object side than the first reflecting surface, when counted from the object side, of the optical element;

In the optical element, an entering reference axis and an exiting reference axis are in parallel and are directed in the same direction;

In the optical element, an entering reference axis and an exiting reference axis are in parallel and are directed in opposite directions;

In the optical element, an entering reference axis and an exiting reference axis are orthogonal to each other;

A refracting optical system is located on the object and/or image side of the optical element;

The curved reflecting surfaces constituting the optical element each are of a form having only one plane of symmetry; and The optical element moves in parallel to the exiting reference axis to effect focusing.

A further optical system of reflecting type according to the invention comprises an optical element having formed therein in unison at least three curved reflecting surfaces composed of surface-reflecting mirrors and a reflecting surface whose normal line at a point of intersection with a reference axis is inclined with respect to a plane in which the reference axis among the plurality of reflecting surfaces lie, wherein, as a light beam coming from an object repeats reflection from the plurality of reflecting surfaces and then exits to form an image of the object, the object beam coming from the object is once focused to form an object image in one of spaces among the plurality of reflecting surfaces and is then focused to re-form the object image.

In particular, the characteristic features of the invention are as follows:

A stop is located on an object side of the optical element;

The first curved reflecting surface, when counted from the object side, of the optical element has a converging action;

The first curved reflecting surface is formed to an ellipsoid of revolution;

The shape of the first curved reflecting surface is expressed by using a local coordinate system (x,y,z) for the first curved reflecting surface and letting coefficients representing the shape of a base zone of the first curved reflecting surface be denoted by a, b and t, wherein, putting $$A = (a + b)(y^2 \cos^2 t + x^2)$$
$$B = 2ab \cos t [1 + \{(b-a) y \sin t/(2ab)\} + \{1 + \{(b-a) y \sin t/(ab)\} - \{y^2/(ab)\} - \{4ab \cos^2 t + (a+b)^2 \sin^2 t\} x^2/(4a^2 b^2 \cos^2 t)\}^{1/2}]$$

and defining $$z = A/B + C_{02}y^2 + C_{20}x^2 + C_{03}y^3 + C_{21}x^2y + C_{04}y^4 + C_{22}x^2y^2 + C_{40}x^4$$

the following conditions are satisfied:

$$ab > 0$$
$$0.9 < t/|\theta| < 1.5$$
$$0.9 < a/d < 2.0$$
$$0.9 < b/d < 2.0$$

where $\theta$ is an angle of inclination of the first curved reflecting surface with respect to the reference axis and d is the distance between the center of the stop and the first curved reflecting surface as measured along the reference axis;

All design parameters are so determined that an entrance pupil of the reflecting type optical system is located nearer to an object side than the first reflecting surface, when counted from the object side, of the optical element;

In the optical element, an entering reference axis and an exiting reference axis are orthogonal to each other; and The curved reflecting surfaces constituting the optical element each are of a form having only one plane of symmetry.

BRIEF DESCRIPTION OF THE DRAWINGS

FIGS. 6A–6F are graphs of lateral aberrations of the embodiment 2.

FIG. 12 is a perspective view of the embodiment 5.

FIG. 22 is a sectional view in the YZ plane of an embodiment 10 of the optical system according to the invention.

FIGS. 23A–23F are graphs of lateral aberrations of the embodiment 10.

Figure 1:
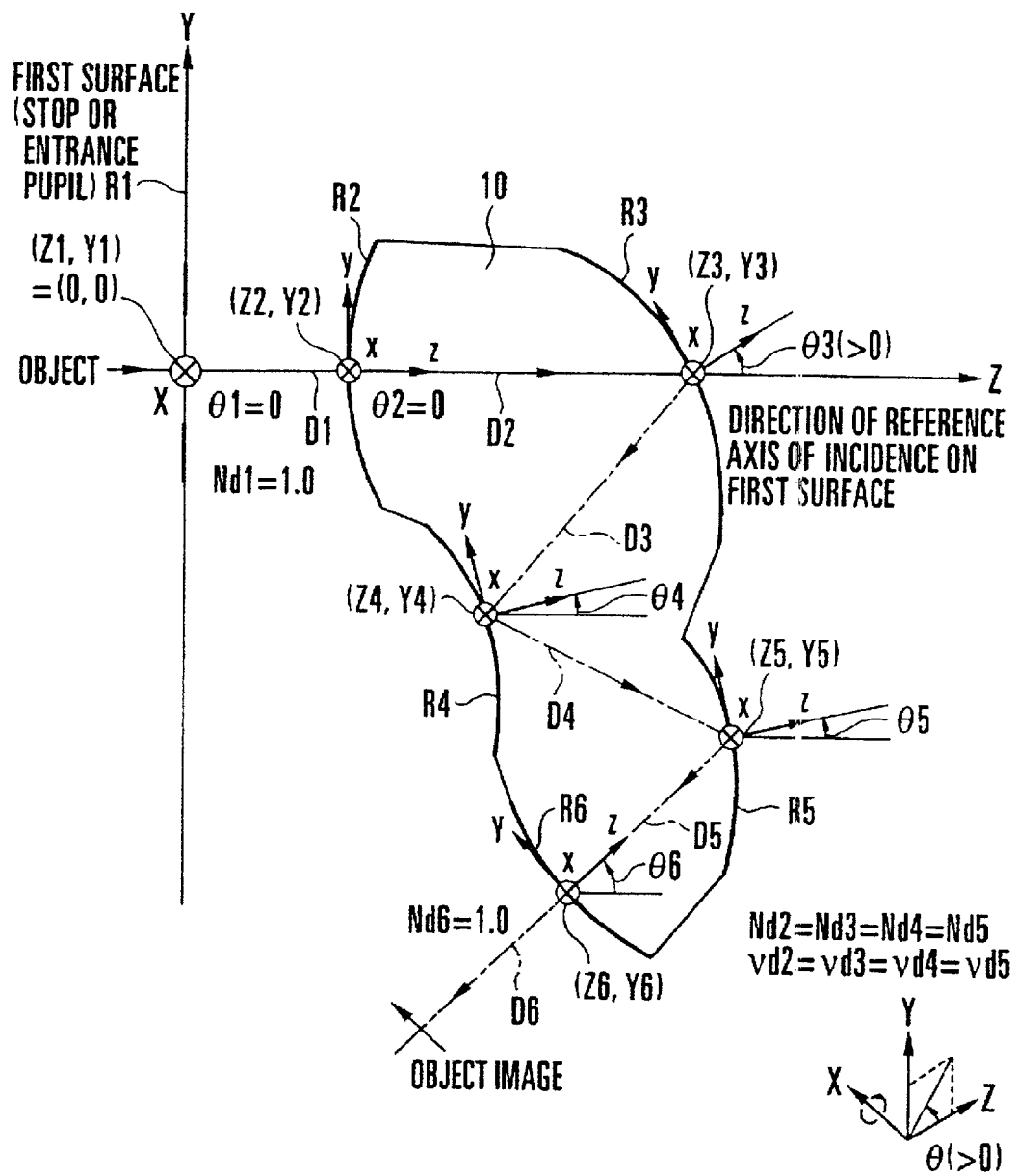
FIG. 1 is a diagram of geometry to explain a coordinate system in embodiments of the invention.

In the drawings, reference character Ri denotes the surface except R1 represents the stop, reference character Di is the separation between adjacent two of the surfaces along the reference axis, and reference characters Ndi and vdi are respectively the refractive index and Abbe number.

DETAILED DESCRIPTION OF THE PREFERRED EMBODIMENTS

Prior to the description of the embodiments, the expression of the various constitutional dimensions and the common features of all the embodiments are described below.

FIG. 1 is a diagram taken to explain a coordinate system by which to define the design parameters for the optical system of the invention. In the embodiments of the invention, as one ray of light (shown by dot-and-dash lines and referred to as the "reference axis" ray) travels from the object side to an image plane, the surfaces are numbered consecutively along this ray and represented by Ri for the i-th surface.

In FIG. 1, the first surface R1 is a stop, the second surface R2 is a refracting surface coaxial to the first surface, the third surface R3 is a reflecting surface tilted relative to the second surface R2, the fourth surface R4 and the fifth surface R5 each are a reflecting surface shifted and tilted relatively to the respective preceding surface, and the sixth surface R6 is a refracting surface shifted and tilted relatively to the fifth surface R5. All of the second to sixth surfaces R2 to R6 are formed on a substrate of glass, plastic or like medium to form a single optical element indicated by reference numeral 10.

In the construction and arrangement of FIG. 1, therefore, the medium from an object plane (not shown) to the second surface R2 is air, the space from the second to sixth surface R2 to R6 is a certain common medium, and the medium from the sixth surface R6 to a seventh surface R7 (not shown) is air.

Since the optical system of the invention is the decentering one, all the surfaces constituting the optical system have no common optical axis. Accordingly, for the embodiments of the invention, an absolute coordinate system is established with the original point at the center of a ray effective diameter of the first surface.

Then, in the embodiments of the invention, the central point of a ray effective diameter of the first surface is assumed to be the original point, and the path of a ray of light passing the original point and the center of the last image forming plane (reference axis ray) is assumed to be a reference axis. Further, the reference axis has an orientation (direction). This orientation points to the direction in which the reference axis ray advances in forming an image.

Though, in the embodiments of the invention, the reference axis on which the design of the optical system is based has been determined as described above, it is to be noted that choice of an axis for the reference of the optical system may otherwise be made as is favorable for the design of optics, good compromise of aberrations, or the expression of the shapes of all the surfaces constituting the optical system. In the general case, however, as the reference axis, use is made of the optical path that intersects an image plane at the center thereof and one of the stop, the entrance pupil, the exit pupil and the first and last surfaces of the optical system at the center thereof.

With this regard, in the embodiments of the invention, determination of the reference axis is made in the steps of selecting a ray which crosses the first surface, that is, the stop plane, at the central point of the ray effective diameter thereof and is to arrive at the center of the last image forming plane (or the reference axis ray), tracing it across each refracting surface and by each reflecting surface, and adopting the found path as the reference axis. The numbering of each surface is determined in the order of succession of the refractions and reflections the reference axis ray undergoes.

Therefore, each time the found surface number increases by one, the reference axis changes its orientation depending on the law of refraction or reflection, finally reaching the center of the image plane.

In each embodiment of the invention, of the surfaces constituting the optical system, the tilted ones are fundamentally all obtained as the result of tilting in one and the same plane. Accordingly, the axes of the absolute coordinate system are defined as follows:

Z axis: the reference axis passing the original point and advancing to the second surface R2;

Y axis: a line passing the original point and making an angle of 90° with respect to the Z axis as obtained by turning counterclockwise in the tilt plane (in the paper of the drawing of FIG. 1); and X axis: a line passing the original point and perpendicular to each of the Z and Y axes (the line normal to the paper of the drawing of FIG. 1).

To express the shape of the i-th surface constituting part of the optical system, the absolute coordinate system is not as suitable for the purpose of better understanding as using a local coordinate system whose original point is taken at the point of intersection of the reference axis with the i-th surface. In the specific embodiments of the invention, therefore, the numerical data of the design parameters for the i-th surface are given by using the local coordinate system.

As the i-th surface tilts in the YZ plane, the counterclockwise direction from the Z axis of the absolute coordinate system is taken as positive when the tilted angle $\theta i$ is measured (in units of degree (°).) In the embodiments of the invention, therefore, the original point of the local coordinate system for each surface lies on the YZ plane in FIG. 1. It should be also noted that there is no decentering in the XZ and XY planes. Further, in view of the absolute coordinate system (X,Y,Z), the local coordinate system (x,y,z) for the i-th surface have its y and z axes inclined by $\theta i$ in the YZ plane. Accordingly, the axes of the local coordinate system are defined as follows:

z axis: a line passing the original point of the local coordinates and making an angle $\theta i$ with respect to the Z direction of the absolute coordinate system as obtained by turning counterclockwise in the YZ plane;

y axis: a line passing the original point of the local coordinates and making an angle of 90° with respect to the z axis as obtained by turning counterclockwise in the YZ plane; and x axis: a line passing the original point of the local coordinates and perpendicular to the YZ plane.

Di is the scalar space between the original points of the local coordinates for the i-th and (i+1)st surfaces, and Ndi and vdi are respectively the refractive index and Abbe number of the medium between the i-th and (i+1)st surfaces.

Also, the embodiments of the optical systems of the invention are illustrated in the diagrams and given the numerical data.

The optical system of each of the embodiments of the invention has a spheric surface and an aspheric surface which is rotationally asymmetric. Of these, the spheric ones are expressed as the spheres described by the radius of curvature Ri. The radius of curvature Ri is given a minus sign when the center of curvature lies on the first surface side in the reference axis (the dot-and-dash lines in FIG. 1) oriented from the first surface to the image plane, or a plus sign when on the image plane side.

The shape of the sphere is expressed by the following equation:

$$z = \frac{(x^2 + y^2)/Ri}{1 + \{1 - (x^2 + y^2)/Ri^2\}^{1/2}}$$

Also, as the optical system of the invention employs at least one aspheric surface which is rotationally asymmetric, the shape of this aspheric surface is expressed by the following equation:

$$z = A/B + C_{02}y^2 + C_{20}x^2 + C_{03}y^3 + C_{21}x^2y + C_{04}y^4 + C_{22}x^2y^2 + C_{40}x^4$$

where $A = (a + b)(y^2 \cos^2 t + x^2)$
$B = 2ab \cos t[1 + \{(b - a) y \sin t/(2ab)\}$
$\quad + \{1 + \{(b - a) y \sin t/(ab)\} - \{y^2/(ab)\}$
$\quad - \{4ab \cos^2 t + (a + b)^2 \sin^2 t\} x^2/(4a^2 b^2 \cos^2 t)\}^{1/2}]$ Since the surface equation described above contains only the terms of even number orders in respect to x, the surface defined by such an equation takes the YZ plane as a plane of symmetry so it has the shape of symmetry with respect to a plane. Further, in a case where the following conditions are satisfied, $C_{03}=C_2,=0$, t=0 its shape is symmetrical with respect to the XZ plane. Further, in a case where the following conditions are satisfied, $C_{03}=C_{21}=0, t=0$ its shape is symmetrical with respect to the XZ plane. Further, in a case where the following conditions are satisfied, $C_{02}=C_{20}, C_{04}=C_{40}C_{22}/2$ its shape is of rotational symmetry. In a case where the foregoing conditions are not satisfied, its shape is of rotational asymmetry.

It should be noted that, in all the embodiments of the invention, "$C_{02}=C_{20}=0$" is satisfied. So, the shape is obtained by adding the higher order asymmetric asphere to the basic form of the second order sphere.

In each embodiment of the invention, as shown in FIG. 1, the first surface is the stop. Also, the term "horizontal half-angle of view $u_y$" used herein means the maximum angle of view of the light beam entering the stop R1 in the YZ plane, and the term "vertical half-angle of view $u_x$" means the maximum angle of view entering the stop in the XZ plane. Also, the diameter of the first surface or the stop is shown as the aperture diameter. This correlates to the speed of the optical system. It should be noted that since the entrance pupil is in the first surface, the aperture diameter described above is equal to the entrance pupil diameter.

Also, the effective image area on the image plane is shown as the image size. The image size is represented by a rectangular area in which the size in the y direction is a horizontal one and the size in the x direction is a vertical one.

Further, the size of the optical system is shown in each of the embodiments. The optical system size is determined by the effective diameter of the light beam.

Also, as far as the embodiment which has the data of the design parameters cited therein is concerned, its lateral aberrations are shown by graphic representations. These graphs are depicted in every such embodiment by tracing the rays of light whose angles of incidence have the values ($u_y$, $u_x$), (0, $u_x$), ($-u_y$, $u_x$), ($u_y$, 0), (0,0) and ($-u_y$, 0) in the coordinates of the horizontal and vertical angles of incidence on the stop R1. In the graphs of the lateral aberrations, the abscissa represents the height of incidence on the pupil and the ordinate represents the amount of aberration. In each of the embodiments, basically every surface has the form of plane symmetry with the yz plane made to be the plane of symmetry. Therefore, even in the graphs of the lateral aberrations, the plus and minus directions of the vertical angle of view become the same. For the simplicity of representation, the graphs of the lateral aberrations of the minus direction are omitted.

Next, each of the embodiments is described in detail below.

(Embodiment 1)

Figure 2:
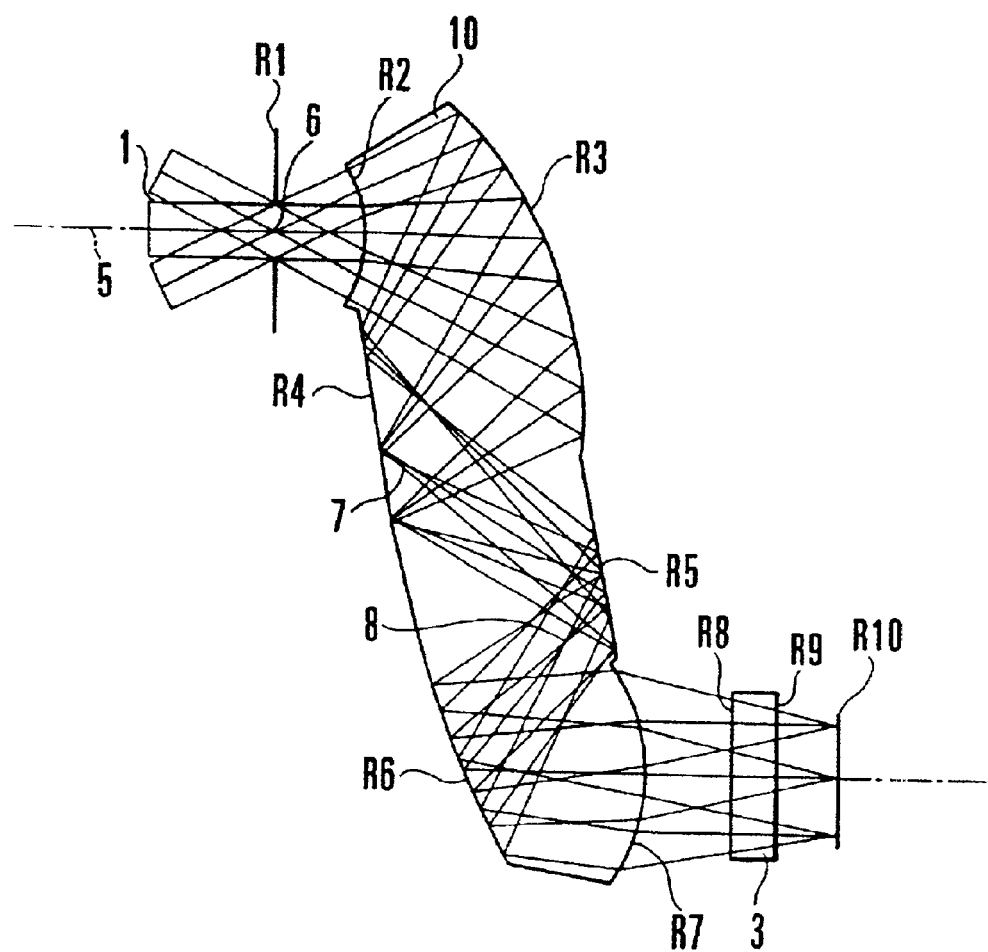
FIG. 2 is a sectional view in the YZ plane of an embodiment 1 of the optical system according to the invention.
Figure 3:
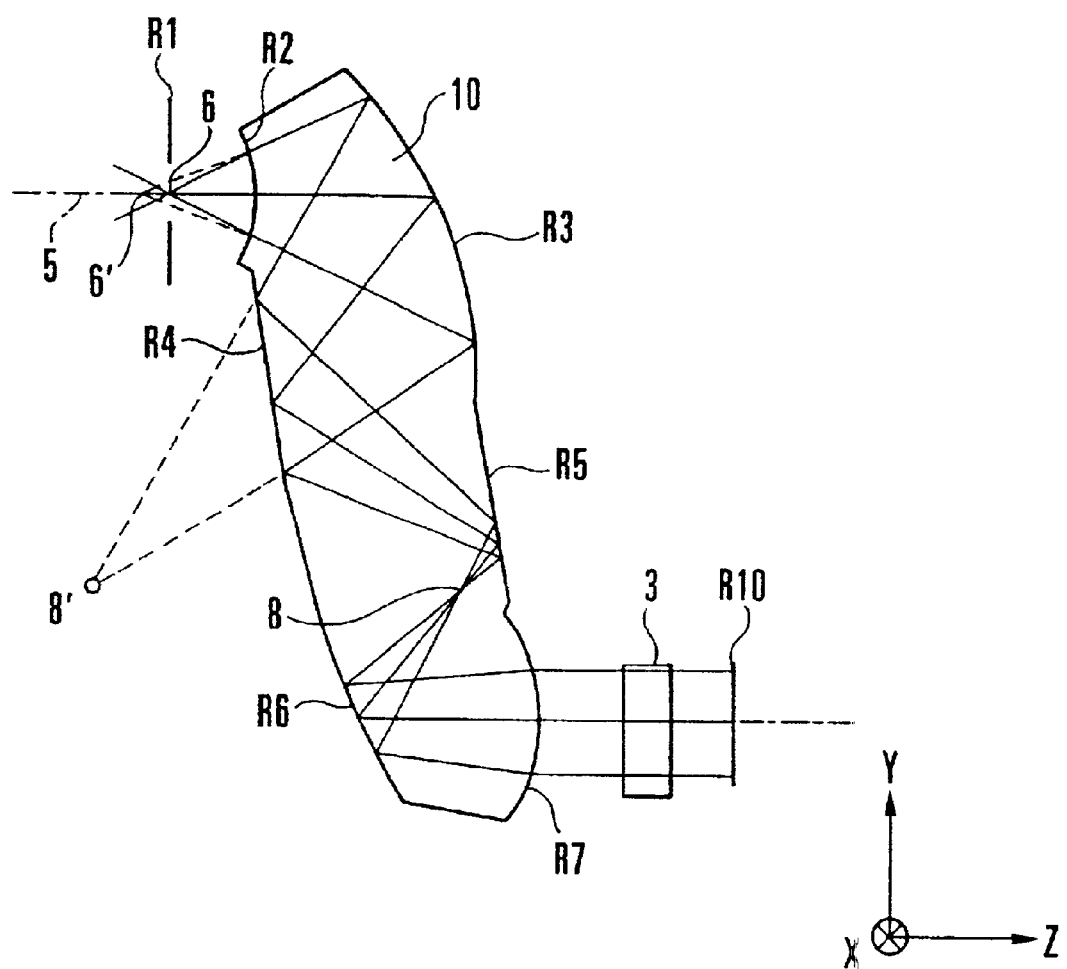
FIG. 3 is similar to FIG. 2 except that the path of the pupil light rays is shown.
Figure 4A:
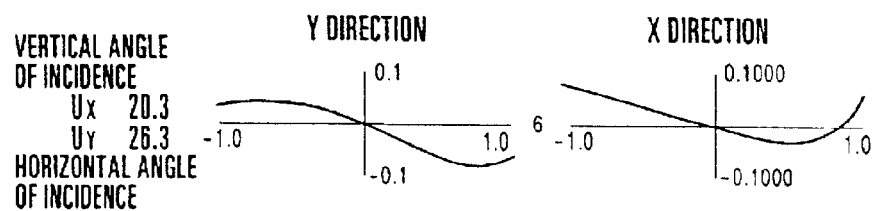
FIGS. 4A–4F are graphs of lateral aberrations of the embodiment 1.
Figure 4B:
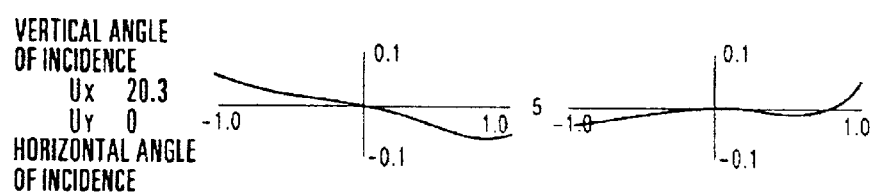
Figure 4C:
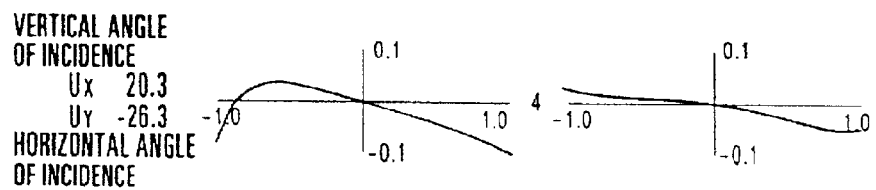
Figure 4D:
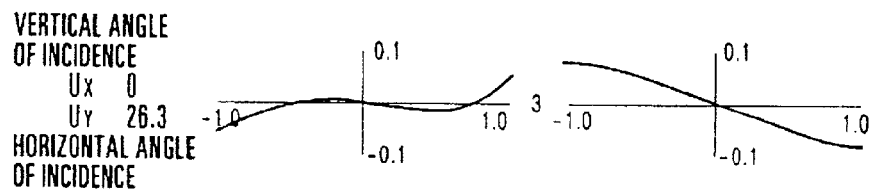
Figure 4E:
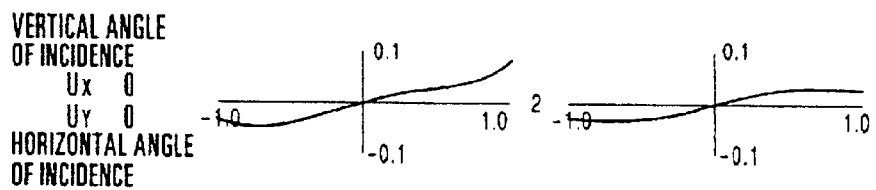
Figure 4F:
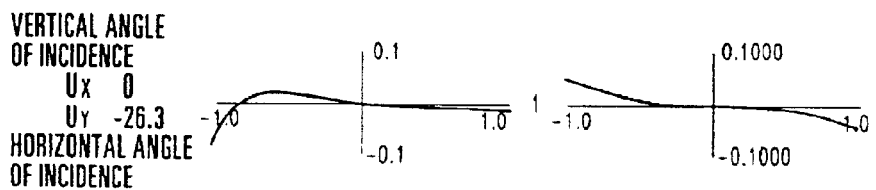

FIGS. 2 and 3 are sectional views in the YZ plane of a first embodiment of the optical system according to the invention. This embodiment is a photographic optical system whose horizontal angle of view is 52.6 degrees and whose vertical angle of view is 40.6 degrees. The optical path is even shown in FIG. 2. FIG. 3 shows the optical path of the pupil ray (off-axial principal ray). The numerical values of the parameters of the present embodiment are listed below:

Horizontal Half-Angle of View: 26.3°

Vertical Half-Angle of View: 20.3°

Aperture Diameter: 2.0 mm

Image Size: Horizontal 4 mm×Vertical 3 mm

Optical System Size: (X×Y×Z)=10.4×27.4×21.2

| i | Yi | Zi | θi | Di | Ndi | vdi | Surface |
|---|---|---|---|---|---|---|---|
| 1 | 0.00 | 0.00 | 0.00 | 3.40 | 1 | | Stop |
| 2 | 0.00 | 3.40 | 0.00 | 7.00 | 1.51633 | 64.15 | R* |
| 3 | 0.00 | 10.40 | 25.00 | 10.00 | 1.51633 | 64.15 | L* |
| 4 | −7.66 | 3.97 | 10.00 | 10.00 | 1.51633 | 64.15 | L |
| 5 | −12.66 | 12.63 | 10.00 | 8.50 | 1.51633 | 64.15 | L |
| 6 | −19.17 | 7.17 | 25.00 | 7.00 | 1.51633 | 64.15 | L |
| 7 | −19.17 | 14.17 | 0.00 | 3.00 | 1 | | R |
| 8 | −19.17 | 19.17 | 0.00 | 2.00 | 1.51633 | 64.15 | R |
| 9 | −19.17 | 19.17 | 0.00 | 2.07 | 1 | | R |
| 10 | −19.17 | 21.24 | 0.00 | 0.00 | 1 | | I.P. |

*R for refracting surface; L for reflecting surface; I.P. for image plane

Spherical Shape

R1:∞

R2:−4.887

R7:−6.524

R8:∞

R9:∞

R10:∞

Aspherical Shape

| R 3: | a = −1.61839e+01 | b = −1.25665e+01 | t = 2.59881e+01 |
| --- | --- | --- | --- |
| | $C_{02}$ = 0. | $C_{20}$ = 0. | |
| | $C_{03}$ = −1.38328e−04 | $C_{21}$ = 4.61307e−04 | |
| | $C_{04}$ = 9.02763e−06 | $C_{22}$ = 7.64906e−05 | $C_{40}$ = 1.02169e−05 |
| R 4: | a = −2.50732e+00 | b = 2.52739e+00 | t = −8.04837e+01 |
| | $C_{02}$ = 0. | $C_{20}$ = 0. | |
| | $C_{03}$ = 1.15553e−03 | $C_{21}$ = 4.86323e−03 | |
| | $C_{04}$ = −1.25972e−04 | $C_{22}$ = −2.57791e−04 | $C_{40}$ = −6.89833e−04 |
| R 5: | a = −9.53779e+01 | b = −3.53371e+01 | t = 4.35207e+01 |
| | $C_{02}$ = 0 | $C_{20}$ = 0. | |
| | $C_{03}$ = 3.53074e−04 | $C_{21}$ = −1.26967e−03 | |
| | $C_{04}$ = −2.02832e−05 | $C_{22}$ = −3.46921e−04 | $C_{40}$ = −8.12941e−05 |
| R 6: | a = 5.05342e+00 | b = −8.31188e+00 | t = −2.24737e+01 |
| | $C_{02}$ = 0. | $C_{20}$ = 0. | |
| | $C_{03}$ = −5.59866e−04 | $C_{21}$ = −1.17474e−03 | |
| | $C_{04}$ = −1.39401e−04 | $C_{22}$ = −2.09750e−04 | $C_{40}$ = −1.35370e−04 |

In FIG. 2, an optical element 10 has a plurality of curved reflecting surfaces and is made from a glass or like transparent body. The external surface of the optical element 10 is constructed, as comprising, in order of passage of the ray from an object, a refracting surface R2 (entrance surface) having a negative refractive power in concave form toward the object side, four reflecting surfaces, namely, a concave mirror R3 for giving convergence to the ray, a reflecting surface R4, a reflecting surface R5 and a concave mirror R6, and a refracting surface R7 (exit surface) having a positive refractive power in convex form toward the image side. A stop R1 (entrance pupil) is located on the object side of the optical element 10. A quartz low-pass filter, infrared cut filter or like optical correction plate 3 is located in front of a last image plane R10 which is coincident with the image sensing surface of a CCD or like image pickup element (or recording medium). A reference axis of the photographic optical system is indicated by reference numeral 5.

It is to be noted that the two refracting surfaces R2 and R7 each are of rotational symmetry, or a sphere, and all the reflecting surfaces R3 to R6 are symmetrical with respect' to the YZ plane only.

Next, the image forming function in this embodiment is described. A light beam 1 coming from the object, after its amount of incidence is restricted by the stop R1, enters the optical element 10 at the entrance surface R2, in which it is reflected from the surfaces R3 and R4 and once forms an image in the neighborhood of the surface R4. The light beam 1 from the image is then reflected from the surfaces R5 and R6 in succession, then exits from the exit surface R7, then passes through the optical correction plate 3 and then forms an image again on the last image plane R10. It is noted that the object light beam forms the intermediate image in the neighborhood of the surface R4 and the pupil rays forms an intermediate image in a space between the surfaces R5 and R6.

In the present embodiment, the direction of the reference axis entering the optical element 10 and the direction of the reference axis exiting therefrom are parallel to each other and are the same direction. Also, the whole of the reference axis including entering and exiting lies in the paper of the drawing (YZ plane).

In such a manner, the optical element 10, owing to the refractive powers by the entrance and exit surfaces and to the refractive powers in the interior thereof by the plurality of curved reflecting mirrors, functions as a lens unit having the desired optical performance with the overall refractive power being positive.

In the present embodiment, focusing on a close object is performed by moving the whole optical system relative to the image sensing surface R10 of the image pickup element. Particularly in the present embodiment, because the direction of the reference axis entering the optical element 10 and the direction of the reference axis exiting from the optical element 10 are parallel to each other and are the same direction, the whole optical system can be moved in parallel to the direction of the exiting reference axis (Z axis direction). Thus, the focusing operation can be carried out as in the conventional lens system.

Also, the lateral aberrations of the optical system of the present embodiment are shown in FIG. 4. It is found that, in the present embodiment, good balance of aberration correction is obtained.

The advantages of the present embodiment are described below.

In the case of the present embodiment where the entrance pupil is located in the neighborhood of the first surface R2 of the optical element 10, particularly the fact that the first curved reflecting surface R3, when counted from the object side, is given the converging action, contributes to a reduction of the size of the optical system. In more detail, the pupil ray (principal ray) is caused to form the intermediate image in the stage near to the entrance surface, thereby further reducing the thickness of the optical system. After having exited from the stop R1 and before expanding largely, the off-axial principal ray is made to converge. With this, when increasing the angle of view of the optical system, the increase of the effective diameters of the first reflecting surface R3 and those that follow is suppressed.

In particular, as shown in FIG. 3, the first reflecting surface R3 is made to be an ellipsoid of revolution with a focus at an apparent stop center 6' (entrance pupil to the surface R3) as viewed from that reflecting surface and another focus at a virtual point 8' on the yz plane having contained therein the zigzagging reference axis of the interior of the optical system. Therefore, the off-axial principal ray can be focused at an internal point 8 with almost no aberrations. By this, thinning of the optical element 10 can be achieved and, at the same time, the off-axial aberrations are suppressed in the initial stage.

In this connection, it is desirable that the parameters 'a', 'b' and 't' that represent the shape of the base zone of the first reflecting surface R3 satisfy the following conditions:

$$ab > 0 \quad (1)$$

$$0.9 < t/|\theta| < 1.5 \quad (2)$$

$$0.9 < |a|/d < 2.0 \quad (3)$$

$$0.9 < |b|/d < 2.0 \quad (4)$$

where d is the distance from the center of the stop to the first reflecting surface R3 as measured along the reference axis.

The inequality of condition (1) is to determine the aspect of the shape of the base zone. In the case of its value being positive, an ellipsoid of revolution results with the two focuses in the yz plane. Light issuing from one focus can form a real image at the other focus with almost no aberrations. The values of the a, b and t determine the positions of the two focuses of the ellipsoid.

The inequalities of condition (2) are to insure that one of the focuses becomes the entrance pupil 6' for the first reflecting surface R3 as viewed from this surface. When either of the upper and lower limits of the condition (2) is violated, the one focus fails to ride on the reference axis with the result that the off-axial rays do not form an image at the internal point, or, even if the image can be formed, the produced amount of aberrations increases largely. So, it is not preferable.

The inequalities of condition (3) are to the same purpose. When the upper or lower limit is violated, the distance between the first reflecting surface R3 and the focus differs largely from the distance from the first reflecting surface R3 to the entrance pupil 6' for this surface. Still it results that the off-axial rays do not form an image at the internal point, or even if the image is formed, large aberrations are produced. So, it should be avoided.

The inequalities of condition (4) are to make good compromise between the thinning of the optical system and the aberration correction. The d is considered to be the width of the optical system. As compared with this, the position of the intermediate image point is regulated. When the upper limit is exceeded, as this means that the first reflecting surface R3 has its focus at too long a distance on the exit side, the off-axial light beam hardly converges. So, in the case of increasing the angle of view of the optical system, such expanding of the off-axial light beam causes the size of the optical system to increase objectionably. Conversely when the lower limit is exceeded, as this means that the refractive power of the first reflecting surface is too strong, aberrations are produced particularly at the off-axis.

The foregoing is the explanation of the conditions for the shape of the first reflecting surface R3 that is the ellipsoid of revolution.

In the present embodiment, the entrance surface R2 and the exit surface R7 of the optical system 10 have refractive powers (optical powers). In the present embodiment, the entrance surface R2 is made to be a concentric concave surface with the off-axial principal ray, thereby reducing the various off-axial aberrations. Also, the exit surface R7 is formed to a convex shape toward the image side, thereby preventing the back focal distance from becoming too long. On the other hand, if the entrance surface R2 is made convex toward the object side, the off-axial rays converges in crossing this surface. Therefore, the first reflecting surface R3 can be prevented from increasing in size.

Also, the shape of the exit surface R7 is determined so that the off-axial principal ray (pupil ray) to this surface is to exit therefrom (to the image side) in almost parallel, regardless of the angle of incidence, that is, to be telecentric. This produces an advantage when an image pickup element such as a CCD is used. In this case, there is a gap between the color filter of the CCD and the light receiving surface. Therefore, the color separation would otherwise vary with variation of the angle of incidence on the image pickup element. As the optical system is made telecentric to the image side, the principal rays of the on-axial and off-axial light beams both become almost parallel to the optical axis. Therefore, the angle of incidence on the CCD becomes almost constant over the entire area of the light receiving surface.

Further, in the present embodiment, each of the reflecting surfaces is a surface which has only one plane of symmetry. The shapes of the entrance and exit surfaces, on the other hand, are rotationally symmetric with respect to the reference axis. This is for the purpose of accurately measuring the reference axis when to manufacture and test the optical system. Also, by making the refracting surface to be rotationally symmetric, the amount of produced asymmetric chromatic aberrations can be reduced.

Figure 28:
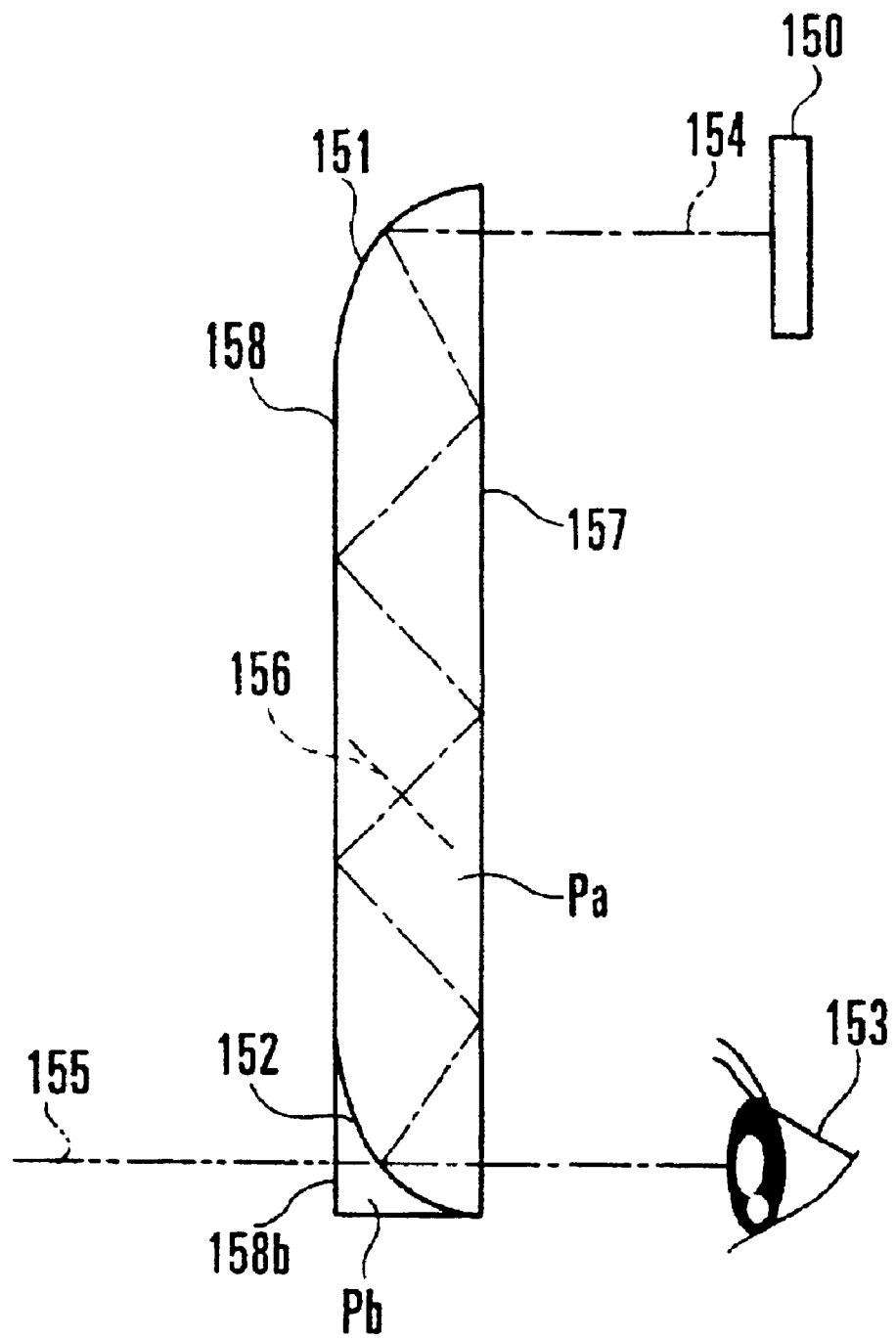
FIG. 28 is a diagram of another observing optical system using a prism having curved reflecting surfaces.

The present embodiment produces the following additional advantages:

In the conventional optical system shown in FIG. 28, the reflecting surfaces of the entrance and exit sides have refractive powers, but the reflections therebetween play the only role of merely guiding the light beam, or the so-called light guide. In the present embodiment, on the other hand, at least three reflecting surfaces having refractive powers are formed in a unit, thereby producing the function of folding the optical axis and the function of correcting aberrations at once. Thus, a photographic optical system of compact form with a large flexibility of the shape and good performance can be obtained.

In the present embodiment, the object light rays and the pupil light rays form intermediate images at the positions 7 and 8, respectively. In such a manner, in the present embodiment, the object and pupil light rays are made to form the intermediate images in the nearer stage to the entrance surface than with the conventional photographic optical system, thereby suppressing the size of each surface of which the effective area is determined by the object light rays and the pupil light rays on the image side of the stop R1. Thus, the invention has succeeded in minimizing the size of the cross-section of the optical system.

Further, in the present embodiment, the reference axis 5 that is zigzagging in the interior of the optical system is contained in one and the same plane, that is, in the paper of the drawing of FIG. 2. By this, along with the formation of the intermediate images of the object light rays and pupil light rays within the element, the size in the direction (X direction) perpendicular to the paper of the drawing is minimized.

The reflecting surfaces constituting the optical system each have its normal line at the point of intersection of the entering and exiting reference axis to be out of coincidence with the direction of the reference axis, or are the so-called decentering reflecting surface. This is for the purpose of preventing the vignetting effect from being produced as in the conventional mirror optical system. At the same time, a free configuration can be adopted. So, an optical element of good space efficiency, compact form and free shape can be made.

Further, the shape of each of the reflecting surfaces has different radii of curvature in the orthogonal two planes (yz plane and xz plane). This is for the purpose of suppressing the decentering aberrations produced by the decentering arrangement of each reflecting surface. Further, this reflecting surface is made asymmetric, thereby well correcting various aberrations. A desired optical performance is thus achieved.

Also, in the present embodiment, the stop R1 is arranged just in front of the entrance surface R2. In the case of the conventional optical system, the stop (entrance pupil) is often arranged in the interior of the optical system, producing a problem that the longer the separation from the stop to the entrance surface at the most front as viewed from the stop, the higher the rate at which the ray effective diameter of the entrance surface increases with increase of the angle of view. In the present embodiment, by arranging the stop R1 on the object side of the photographic optical system (on the light beam entering side of the optical system), the increase of the size of the photographic optical system resulting from the increase of the angle of view of the optical system is suppressed to a minimum.

As is characteristic of the reflecting type optical system, the directions of the entering reference axis and the exiting reference axis can be changed in various ways by selecting the combinations of the configurations of all the reflecting surfaces.

(Embodiment 2)

Figure 5:
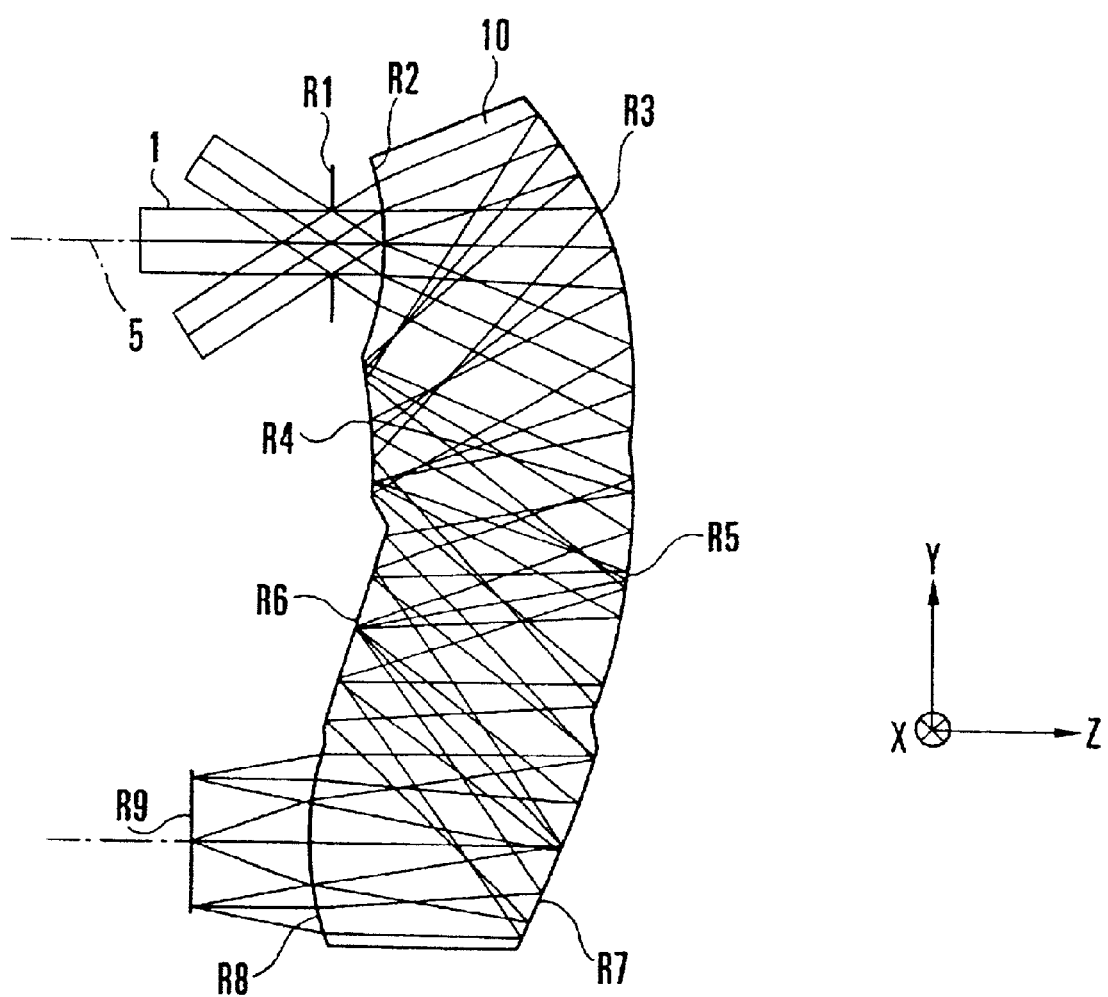
FIG. 5 is a sectional view in the YZ plane of an embodiment 2 of the optical system according to the invention.

FIG. 5 is a sectional view in the YZ plane of a second embodiment of the optical system according to the invention. The present embodiment is a photographic optical system of 63.4 degrees in the horizontal angle of view and 49.6 degrees in the vertical angle of view. FIG. 5 even shows the optical path. The data of the design parameters of the present embodiment are as follows:

Horizontal Half-Angle of View: 31.7°
Vertical Half-Angle of View: 24.8°
Aperture Diameter: 2.0 mm
Image Size: Horizontal 4 mm×Vertical 3 mm
Optical System Size: (X×Y×Z)=9.0×26.3×15.2

| i | Yi | Zi | θi | Di | Ndi | νdi | Surface |
|---|---|---|---|---|---|---|---|
| 1 | 0.00 | 0.00 | 0.00 | 1.82 | 1 | | Stop |
| 2 | 0.00 | 1.82 | 0.00 | 7.49 | 1.58310 | 30.20 | R |
| 3 | 0.00 | 9.30 | 18.49 | 9.86 | 1.58310 | 30.20 | L |
| 4 | −5.93 | 1.43 | 3.23 | 9.30 | 1.58310 | 30.20 | L |
| 5 | −10.65 | 9.44 | −12.55 | 8.90 | 1.58310 | 30.20 | L |
| 6 | −11.50 | 0.58 | −22.91 | 9.39 | 1.58310 | 30.20 | L |
| 7 | −18.82 | 6.46 | −25.63 | 8.02 | 1.58310 | 30.20 | L |
| 8 | −18.82 | −1.56 | 0.0 | 3.68 | 1 | | R |
| 9 | −18.82 | −5.24 | 0.0 | 0.00 | 1 | | I.P. |

Spherical Shape
R1:∞
R2:−7.648
R8:10.757
R9:∞
Spherical Shape

| R 3: | $a = -1.09716e+01$ | $b = -1.25390e+01$ | $t = 2.15145e+01$ | |
| --- | --- | --- | --- | --- |
| | $C_{02} = 0.$ | $C_{20} = 0.$ | | |
| | $C_{03} = 6.87152e-05$ | $C_{21} = -1.21962e-04$ | | |
| | $C_{04} = 3.59209e-05$ | $C_{22} = 1.02173e-04$ | $C_{40} = 4.95588e-05$ | |
| R 4: | $a = -2.34468e+00$ | $b = 4.88786e+00$ | $t = -3.56094e+01$ | |
| | $C_{02} = 0.$ | $C_{20} = 0.$ | | |
| | $C_{03} = -4.48049e-03$ | $C_{21} = -7.45433e-03$ | | |
| | $C_{04} = 1.81003e-03$ | $C_{22} = 2.09229e-03$ | $C_{40} = -8.28024e-04$ | |
| R 5: | $a = -6.11985e+00$ | $b = 1.70396e+01$ | $t = -2.17033e+01$ | |
| | $C_{02} = 0.$ | $C_{20} = 0.$ | | |
| | $C_{03} = -3.23467e-04$ | $C_{21} = -1.07985e-03$ | | |
| | $C_{04} = -3.70249e-05$ | $C_{22} = -1.74689e-04$ | $C_{40} = -1.21908e-04$ | |
| R 6: | $a = \infty$ | $b = \infty$ | $t = 0.$ | |
| | $C_{02} = 0.$ | $C_{20} = 0.$ | | |
| | $C_{03} = 1.10097e-03$ | $C_{21} = -3.73963e-04$ | | |
| | $C_{04} = -1.59596e-04$ | $C_{22} = -3.22152e-04$ | $C_{40} = -1.74291e-04$ | |
| R 7: | $a = -2.11332e+01$ | $b = -1.31315e+03$ | $t = 1.70335e+00$ | |
| | $C_{02} = 0.$ | $C_{20} = 0.$ | | |
| | $C_{03} = 8.29145e-05$ | $C_{21} = -1.11374e-03$ | | |
| | $C_{04} = -2.50522e-05$ | $C_{22} = -5.28330e-05$ | $C_{40} = -2.91711e-05$ | |

In FIG. 5, an optical element 10 has a plurality of curved reflecting surfaces and is made from a glass or like transparent body. The external surface of the optical element 10 is made, as comprising, in order of passage of light from an object, a refracting surface R2 (entrance surface) having a negative refractive power in concave form toward the object side, five reflecting surfaces, namely, a concave mirror R3 for giving convergence to the light rays, a convex mirror R4 for giving divergence, a concave mirror R5 for giving convergence, a reflecting surface R6 for giving convergence and a concave mirror R7, and a refracting surface R8 (exit surface) having a positive refractive power in convex form toward the image side. A stop R1 is located on the object side of the optical element 10. A last image plane R9 is coincident with the image sensing surface of a CCD or like image pickup element. A reference axis of the photographic optical system is indicated by reference numeral 5.

It is to be noted that the two refracting surfaces each are rotationally symmetrical or a sphere, and all the reflecting surfaces are symmetrical with respect to the YZ plane only.

This embodiment has an image forming function described below. A light beam 1 coming from the object passes through the stop R1, by which the light intensity is regulated, then enters the optical element 10 at the entrance surface R2, is then reflected from the surface R3, then once forms an image in the space between the surfaces R3 and R4, is then reflected from the surfaces R4, R5, R6 and R7 in succession, then exits from the exit surface R8, and then forms an image again on the last image plane R9.

Owing to such refractive powers by the entrance and exit surfaces and to such refractive powers in the internal space therebetween by the plurality of curved reflecting mirrors, the optical element 10 functions as a lens unit having a desired optical performance with the overall refractive power being positive.

In the present embodiment, the direction of the reference axis entering the optical element 10 and the direction of the reference axis exiting therefrom are parallel to each other and are opposite to each other. Also, the whole of the reference axis including entering In the present embodiment, focusing to a close object is performed by moving the whole optical system relative to the image receiving surface R10 of the image pickup element. Particularly in the present embodiment, because the direction of the reference axis entering the optical element 10 and the direction of the reference axis exiting from the optical element 10 are parallel, the whole optical system can be moved in parallel to the direction of the exiting reference axis (Z axis direction), so that the focusing operation is carried out as in the conventional lens system.

Also, the lateral aberrations of the optical system of the present embodiment are shown in FIG. 6.

The present embodiment produces similar advantages to those of the embodiment 1.

Besides these, in the present embodiment, because the entrance and exit surfaces for the optical element 10 are arranged on one side thereof, it is possible to make an optical system of reduced width in the X direction with the total length in the direction of the Z axis (+) being minimized.

Since the present embodiment is constructed with one more reflecting surface than in the embodiment 1 for the purpose of reversing the direction of the reference axis ray, determination of the refractive powers for all the surfaces and distribution of the capability of correcting asymmetric aberrations over the reflecting surfaces are made more suitable. It is thus possible to achieve improvements of the imaging performance and even more an increase of the angle of view.

(Embodiment 3)

Figure 7:
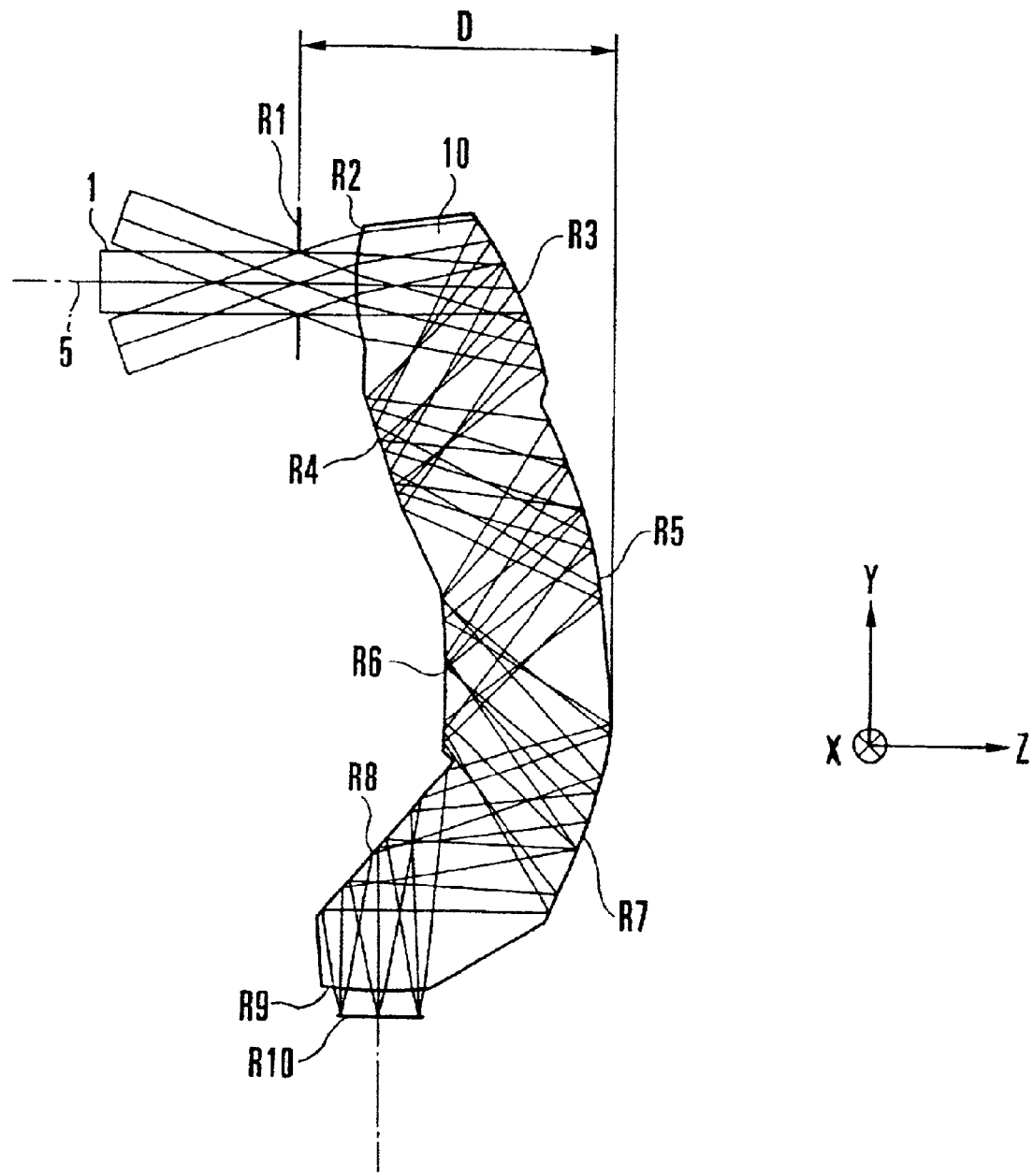
FIG. 7 is a sectional view in the YZ plane of an embodiment 3 of the optical system according to the invention.
Figure 8A:
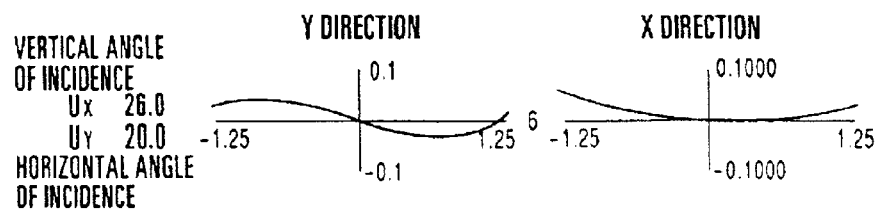
FIGS. 8A–8F are graphs of lateral aberrations of the embodiment 3.
Figure 8B:
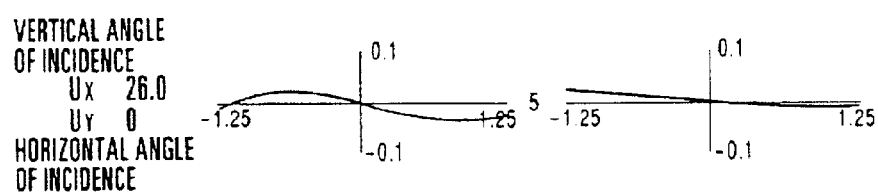
Figure 8C:
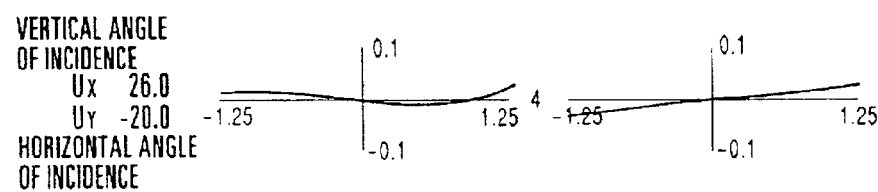
Figure 8D:
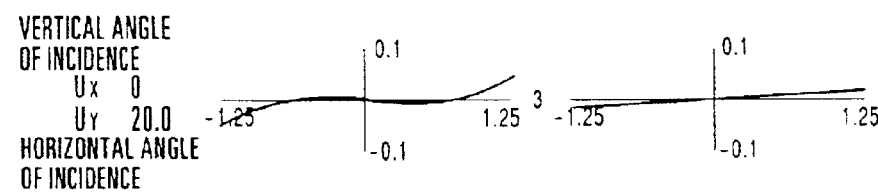
Figure 8E:
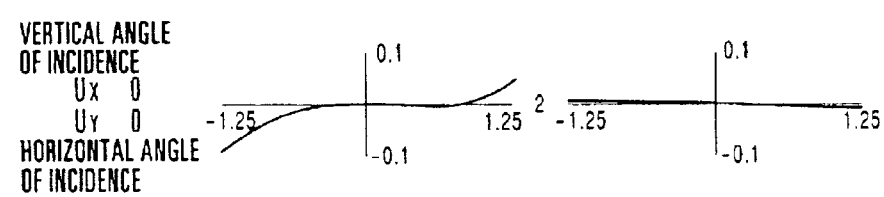
Figure 8F:
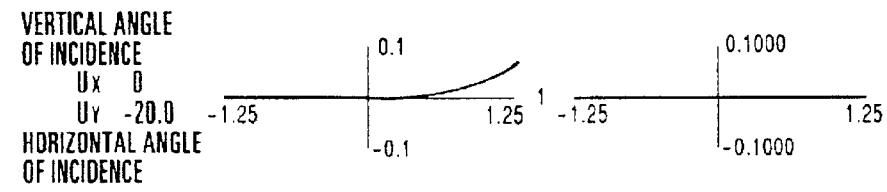

FIG. 7 is a sectional view in the YZ plane of a third embodiment of the optical system according to the invention. The present embodiment is a photographic optical system of 40.0 degrees in the horizontal angle of view and 52.0 degrees in the vertical angle of view. FIG. 7 even shows the optical path. The data of the design parameters of the present embodiment are shown below.

Horizontal Half-Angle of View: 20.0°
Vertical Half-Angle of View: 26.0°
Aperture Diameter: 2.5 mm Image Size: Horizontal 3 mm×Vertical 4 mm
Optical System Size: (X×Y×Z)=12.0×32.7×12.9

| i | Yi | Zi | θi | Di | Ndi | vdi | Surface |
|---|---|---|---|---|---|---|---|
| 1 | 0.00 | 0.00 | 0.00 | 2.25 | 1 | | Stop |
| 2 | 0.00 | 2.25 | 0.00 | 6.75 | 1.51633 | 64.15 | R |
| 3 | 0.00 | 9.00 | 25.18 | 8.75 | 1.51633 | 64.15 | L |
| 4 | −6.74 | 3.42 | 17.48 | 8.75 | 1.51633 | 64.15 | L |
| 5 | −9.06 | 11.85 | 15.54 | 8.75 | 1.51633 | 64.15 | L |
| 6 | −15.41 | 5.83 | 0.49 | 8.75 | 1.51633 | 64.15 | L |
| 7 | −21.65 | 11.96 | −18.56 | 9.00 | 1.51633 | 64.15 | L |
| 8 | −22.96 | 3.06 | −40.55 | 5.80 | 1.51633 | 64.15 | L |
| 9 | −28.76 | 3.11 | −89.47 | 1.00 | 1 | | R |
| 10 | −29.76 | 3.12 | −89.47 | 0.00 | 1 | | I.P. |

Spherical Shape

R1:∞

R2: 9.799

R9:−17.732

Aspherical Shape

R 3: $a = -1.00000e+02$  $b = -8.74864e+00$  $t = 1.88037e+01$
$C_{02} = 0.$  $C_{20} = 0.$
$C_{03} = -6.48391e-04$  $C_{21} = -1.07411e-03$
$C_{04} = 7.88198e-05$  $C_{22} = 2.68977e-04$  $C_{40} = 3.64351e-05$

R 4: $a = -1.36388e+01$  $b = -7.75615e+01$  $t = 5.21719e+01$
$C_{02} = 0.$  $C_{20} = 0.$
$C_{03} = 2.95862e-05$  $C_{21} = -3.33476e-03$
$C_{04} = 5.14020e-04$  $C_{22} = -2.71521e-04$  $C_{40} = -3.72473e-04$

R 5: $a = -1.27617e+01$  $b = -2.39346e+01$  $t = 4.41911e+01$
$C_{02} = 0.$  $C_{20} = 0.$
$C_{03} = 1.05543e-04$  $C_{21} = -1.60047e-04$
$C_{04} = 5.77804e-06$  $C_{22} = -4.74244e-05$  $C_{40} = -4.86554e-06$

R 6: $a = -9.22255e+00$  $b = -4.68183e+01$  $t = 6.55811e+01$
$C_{02} = 0.$  $C_{20} = 0.$
$C_{03} = 2.85339e-07$  $C_{21} = -3.51430e-06$
$C_{04} = -8.24508e-07$  $C_{22} = -3.64252e-06$  $C_{40} = 2.73565e-06$

R 7: $a = -1.44157e+01$  $b = -2.52331e+01$  $t = 3.36030e+01$
$C_{02} = 0.$  $C_{20} = 0.$
$C_{03} = 4.53839e-07$  $C_{21} = 1.49252e-06$
$C_{04} = 1.60060e-07$  $C_{22} = -3.37563e-07$  $C_{40} = 1.77901e-07$

R 8: $a = 6.88885e+02$  $b = 1.26527e+04$  $t = -8.69057e+01$
$C_{02} = 0.$  $C_{20} = 0.$
$C_{03} = -6.58580e-06$  $C_{21} = -1.96913e-05$
$C_{04} = -1.39036e-05$  $C_{22} = 6.01016e-06$  $C_{40} = -1.21001e-05$

In FIG. 7, an optical element 10 has a plurality of curved reflecting surfaces and is made from a glass or like transparent body. The external surface of the optical element 10 is made, in order of passage of light from an object of, a convex refracting surface R2 (entrance surface) having a positive refractive power, six reflecting surfaces, namely, a concave mirror R3, a convex mirror R4, a concave mirror R5, a reflecting surface R6, a concave mirror R7 and a convex mirror R8, and a convex refracting surface R9 (exit surface) having a positive refractive power. A stop R1 (entrance pupil) is located on the object side of the optical element 10. A last image plane R10 is coincident with the image sensing surface of a CCD or like image pickup element. A reference axis of the photographic optical system is indicated by reference numeral 5.

It is to be noted that the two refracting surfaces each are rotationally symmetrical or a sphere, and all the reflecting surfaces are symmetrical with respect to the YZ plane only.

This embodiment has an image forming function described below. A light beam 1 coming from the object passes through the stop R1, by which the light intensity is regulated, then enters the optical element 10 at the entrance surface R2, is then reflected from the surface R3, then once forms an image in the space between the surfaces R3 and R4, is then reflected from the surfaces R4, R5, R6, R7 and R8 in succession, then exits from the exit surface R9, and then forms an image again on the last image plane R10.

Owing to such refractive powers by the entrance and exit surfaces and to such refractive powers in the internal space therebetween by the plurality of curved reflecting mirrors, the optical element 10 functions as a lens unit having a desired optical performance with the overall refractive power being positive.

The lateral aberrations of the present embodiment are shown in FIG. 8.

In the present embodiment, the direction of the reference axis entering the optical element 10 and the direction of the reference axis exiting therefrom are orthogonal to each other. Also, all the whole of the reference axis including entering and exiting lies in the paper of the drawing (YZ plane).

With the use of such construction and arrangement, it becomes possible to collect the space the back focal distance of the optical system occupies and the width of the package and circuit of the CCD or like image pickup element to the Y direction. Therefore, a thinning of the size in the X direction and also a thinning of the size in the Z direction shown by D in FIG. 7 can be achieved.

(Embodiment 4)

Figure 9:
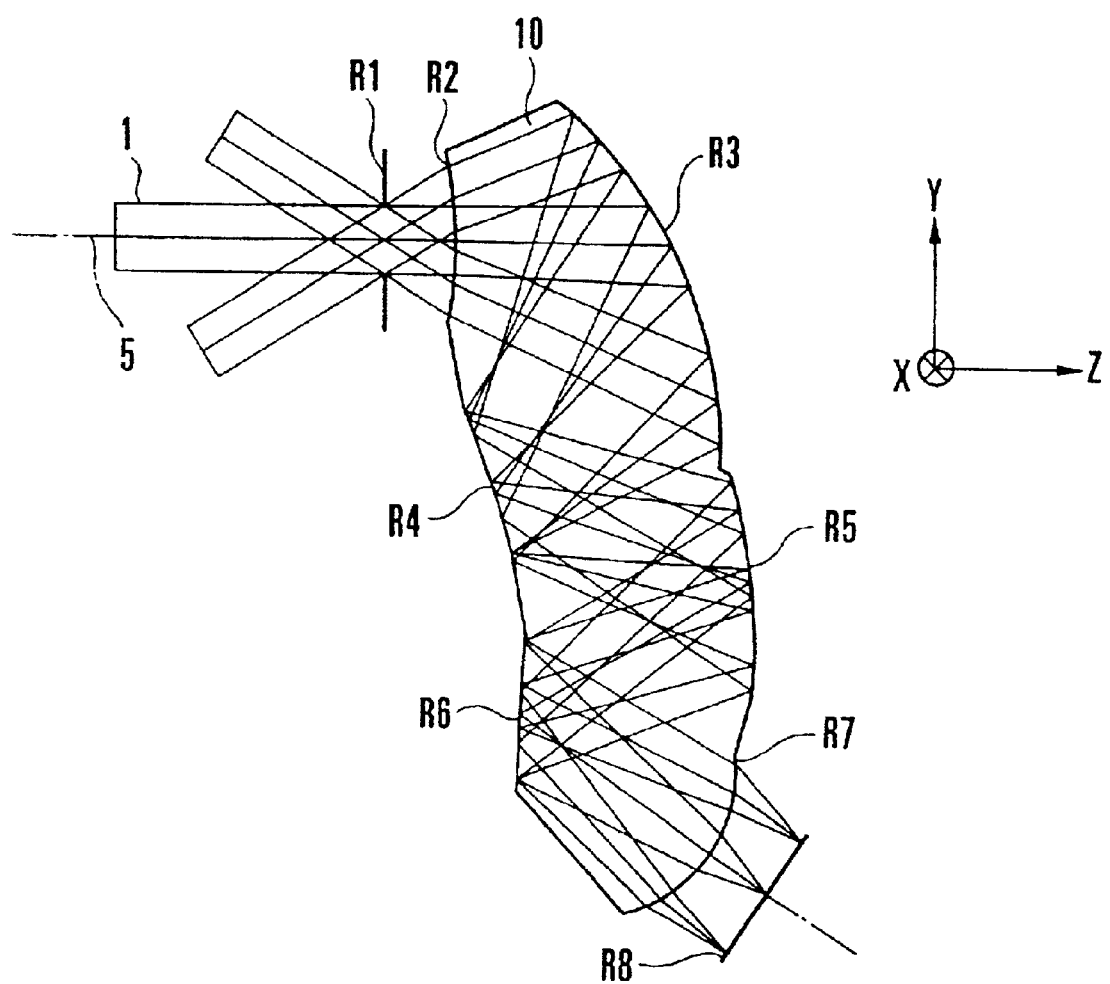
FIG. 9 is a sectional view in the YZ plane of an embodiment 4 of the optical system according to the invention.
Figure 10A:
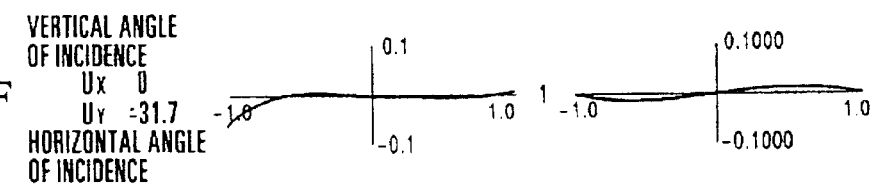
FIGS. 10A–10F are graphs of lateral aberrations of the embodiment 1.
Figure 10B:
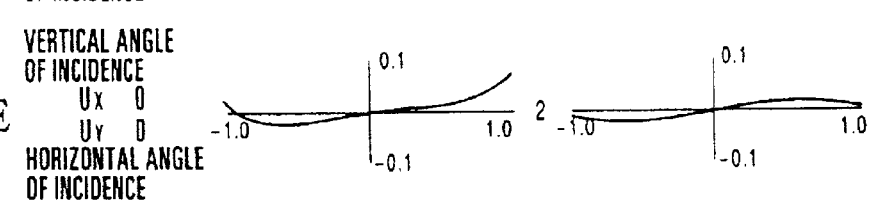
Figure 10C:
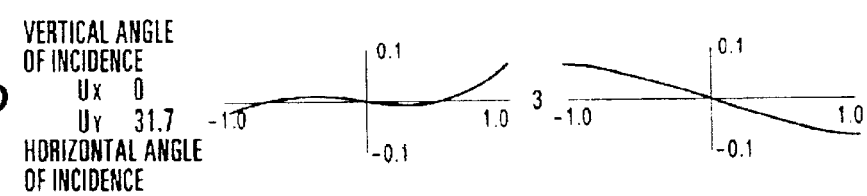
Figure 10D:
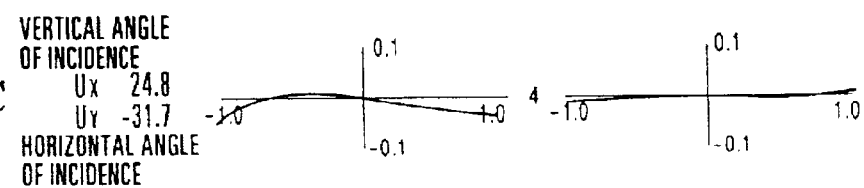
Figure 10E:
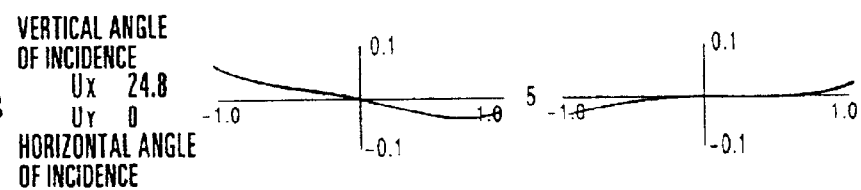
Figure 10F:
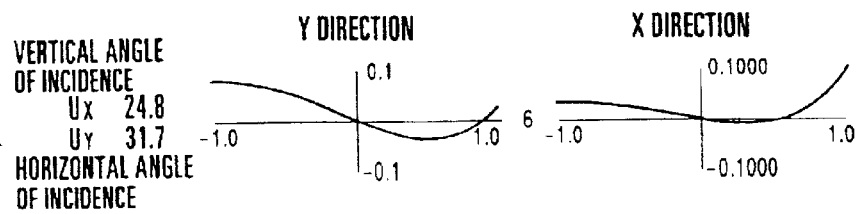

FIG. 9 is a sectional view in the YZ plane of a fourth embodiment of the optical system according to the invention. The present embodiment is a photographic optical system of 63.4 degrees in the horizontal angle of view and 49.6 degrees in the vertical angle of view. FIG. 9 even shows the optical path. The data of the design parameters of the present embodiment are shown below.

Horizontal Half-Angle of View: 31.7°

Vertical Half-Angle of View: 24.8°

Aperture Diameter: 2.0 mm

Image Size: Horizontal 4 mm×Vertical 3 mm

Optical System Size: (X×Y×Z)=8.4×24.5×12.3

| i | Yi | Zi | θi | Di | Ndi | vdi | Surface |
|---|---|---|---|---|---|---|---|
| 1 | 0.00 | 0.00 | 0.00 | 2.06 | 1 | | Stop |
| 2 | 0.00 | 2.06 | 0.00 | 6.50 | 1.51633 | 64.15 | R |
| 3 | 0.00 | 8.56 | 26.67 | 9.00 | 1.51633 | 64.15 | L |
| 4 | −7.22 | 3.19 | 17.66 | 8.00 | 1.51633 | 64.15 | L |
| 5 | −9.69 | 10.80 | 5.98 | 8.00 | 1.51633 | 64.15 | L |
| 6 | −13.69 | 3.87 | −2.50 | 7.00 | 1.51633 | 64.15 | L |
| 7 | −17.70 | 9.60 | −34.98 | 0.50 | 1 | | R |
| 8 | −18.83 | 11.21 | −34.98 | 0.00 | 1 | | I.P. |

Spherical Shape

R1∞

R2−13.016

R7−4.355

R8∞

Aspherical Shape

R 3: $a = -1.11462e+01$  $b = -1.16711e+01$  $t = 2.85172e+01$
$C_{02} = 0.$  $C_{20} = 0.$
$C_{03} = -3.97235e-05$  $C_{21} = 4.30551e-04$
$C_{04} = 4.26947e-05$  $C_{22} = 1.68530e-04$  $C_{40} = 8.54092e-05$

-continued

| | | | |
|---|---|---|---|
| R 4: | a = 3.43416e+00 | b = −2.32147e+00 | t = 3.90060e+02 |
| | $C_{02} = 0.$ | $C_{20} = 0.$ | |
| | $C_{03} = -2.26822\text{e}-03$ | $C_{21} = 4.62823\text{e}-03$ | |
| | $C_{04} = 9.93668\text{e}-04$ | $C_{22} = -8.22145\text{e}-04$ | $C_{40} = 9.87903\text{e}-04$ |
| R 5: | a = −1.89949e+01 | b = −1.16993e+01 | t = 2.64906e+01 |
| | $C_{02} = 0.$ | $C_{20} = 0.$ | |
| | $C_{03} = 4.15152\text{e}-04$ | $C_{21} = 2.65197\text{e}-04$ | |
| | $C_{04} = 1.20436\text{e}-05$ | $C_{22} = -4.92467\text{e}-05$ | $C_{40} = -2.64871\text{e}-05$ |
| R 6: | a = 2.61019e+01 | b = 2.31498e+02 | t = 2.24466e+00 |
| | $C_{02} = 0.$ | $C_{20} = 0.$ | |
| | $C_{03} = 2.27686\text{e}-03$ | $C_{21} = 2.95018\text{e}-03$ | |
| | $C_{04} = -4.85715\text{e}-04$ | $C_{22} = -9.91109\text{e}-04$ | $C_{40} = -6.39821\text{e}-04$ |

In FIG. 9, an optical element 10 has a plurality of curved reflecting surfaces and is made from glass or like transparent body. The external surface of the optical element 10 is made, in order of passage of light from an object of, a concave refracting surface R2 (entrance surface) having a negative refractive power, four reflecting surfaces, namely, a concave mirror R3, a convex mirror R4, a concave mirror R5 and a reflecting surface R6, and a convex refracting surface R7 (exit surface) having a positive refractive power. A stop R1 (entrance pupil) is located on the object side of the optical element 10. A last image plane R8 is coincident with the image sensing surface of a CCD or like image pickup element. A reference axis of the photographic optical system is indicated by reference numeral 5.

It is to be noted that the two refracting surfaces each are rotationally symmetrical or a sphere, and all the reflecting surfaces are symmetrical with respect to the YZ plane only.

This embodiment has an image forming function described below. A light beam 1 coming from the object passes through the stop R1, by which the light intensity is regulated, then enters the optical element 10 at the entrance surface R2, is then reflected from the surface R3, then once forms an image in the space between the surfaces R3 and R4, is then reflected from the surfaces R4, R5 and R6 in succession, then exits from the exit surface R7, and then forms an image again on the last image plane R8.

Owing to such refractive powers by the entrance and exit surfaces and to such refractive powers in the internal space therebetween by the plurality of curved reflecting mirrors, the optical element 10 functions as a lens unit having a desired optical performance with the overall refractive power being positive.

The lateral aberrations of the present embodiment are shown in FIG. 10.

In the present embodiment, the reference axis entering the optical element 10 makes an angle of 45° with the reference axis exiting therefrom. This is an example of the exiting reference axis which does not become parallel with, or perpendicular to, the entering reference axis, because the reference axis is so folded as to minimize the angle of incidence on each reflecting surface and as to avoid interference of the light rays at each surface.

Even in this case, to maintain a thinning of the size in the X direction of the entire optical system to be achieved, the whole of the reference axis including entering and exiting lies in one and the same plane (YZ plane).

(Embodiment 5)

Figure 11B:
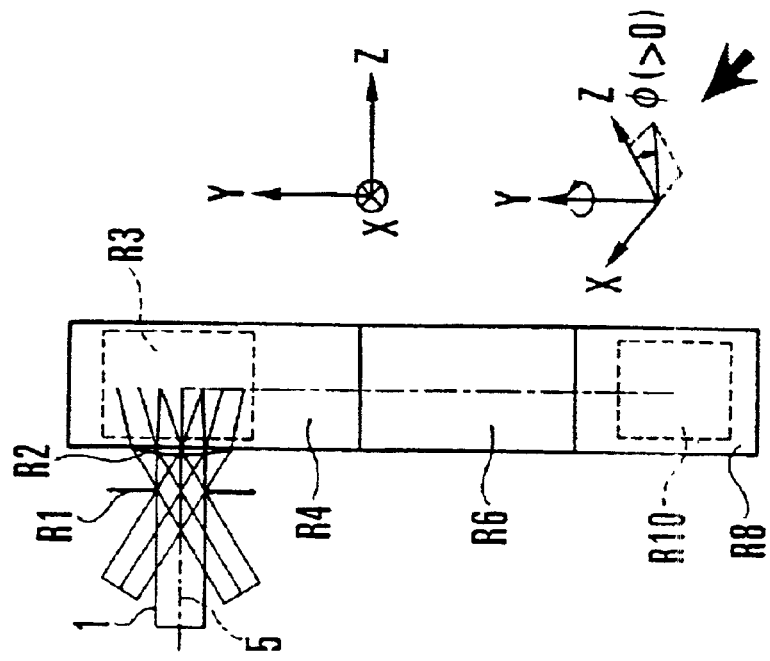
FIGS. 11A and 11B are a sectional views in the YZ plane and a side elevation view of an embodiment 5 of the optical system according to the invention.
Figure 11A:
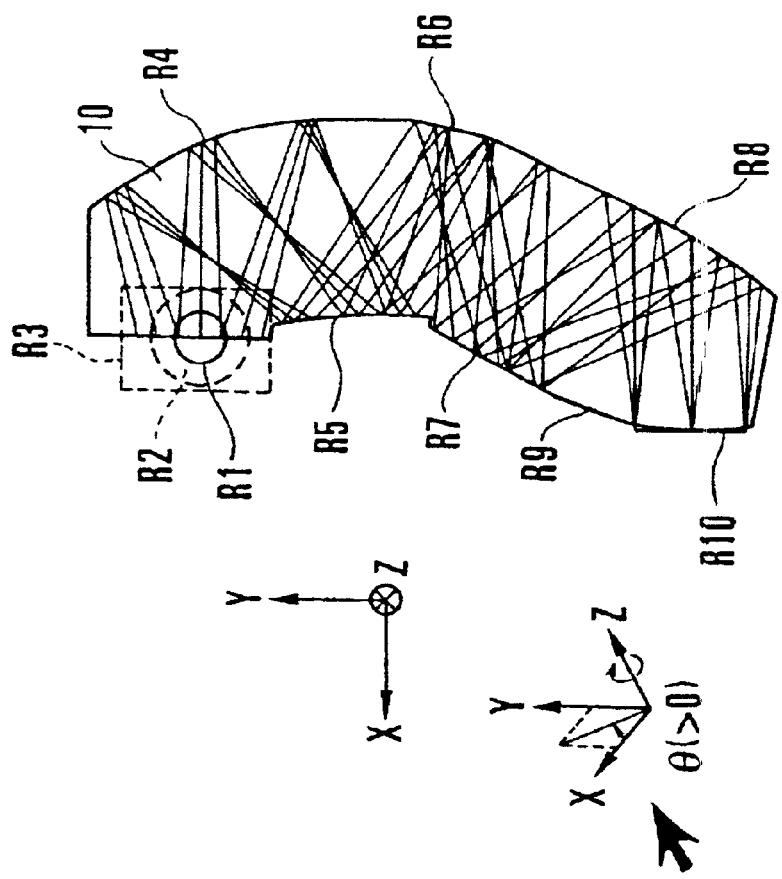
Figure 13A:
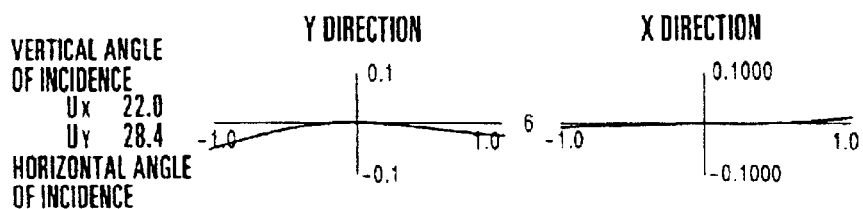
FIGS. 13A–13F are graphs of lateral aberrations of the embodiment 5.
Figure 13B:
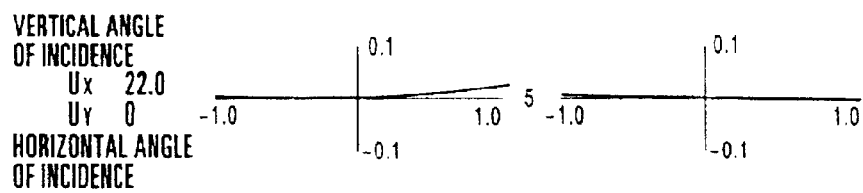
Figure 13C:
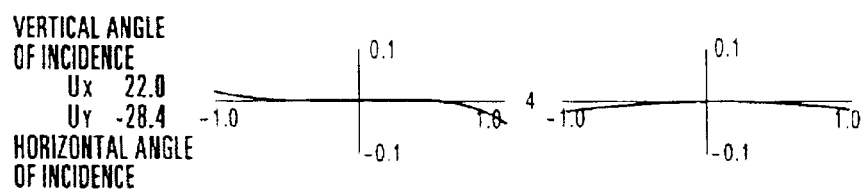
Figure 13D:
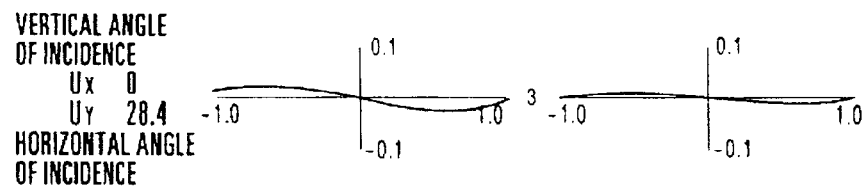
Figure 13E:
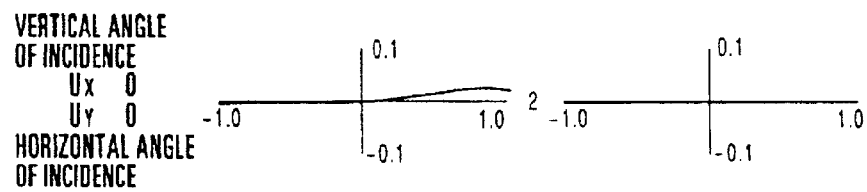
Figure 13F:
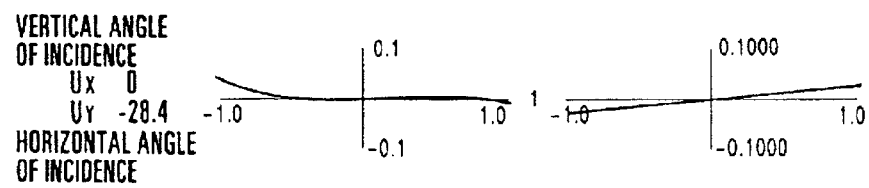

FIGS. 11A and 11B are a sectional view in the XY plane and a side elevation view of a fifth embodiment of the optical system according to the invention. FIG. 12 is a perspective view of the fifth embodiment, and shows the optical path, too. The present embodiment is a photographic optical system of 56.8 degrees in the horizontal angle of view and 44 degrees in the vertical angle of view.

As far as the present embodiment is concerned, there are two ways of tilting each surface, one of which is in the XZ plane and the other in the XY plane. Accordingly, the local coordinate system should otherwise be defined. The angle to which the i-th surface is first tilted in the XZ plane is expressed by $\phi i$ (in units of degree) with the clockwise direction as viewed from the plus direction of the Y axis being taken as positive, and then in the XY plane by $\phi i$ (in units of degree) with the counterclockwise direction as viewed from the plus direction of the Z axis being taken as positive. For the axes of the local coordinates (x,y,z) for the i-th surface to define in relation to the absolute coordinate system (X,Y,Z), suppose the local coordinate system is first moved until its original point coincides with a point (Xi,Yi,Zi), then turned in the XZ plane to the angle $\phi i$ and, at last, turned in the XY plane to the angle $\theta i$, the following settings are thus obtained:

The original point: (Xi,Yi,Zi)

z: the direction obtained by turning in the XZ plane to the angle $\Phi i$ with the axial direction of the first surface or Z direction and in the XY plane to the angle $\theta i$;

y: the direction making counterclockwise 90° with the z direction in the YZ plane; and x: the direction perpendicular to the YZ plane with the original point at the vertex of the reflecting surface.

The data of the design parameters of the present embodiment are shown below.

Horizontal Half-Angle of View: 28.4°

Vertical Half-Angle of View: 22.0°

Aperture Diameter: 2.0 mm

Image Size: Horizontal 4 mm×Vertical 3 mm

Optical System Size: (X×Y×Z)=12.6×28.5×10.6

| i | Xi | Yi | Zi | θi | φi | Di | Ndi | νdi | S |
|---|---|---|---|---|---|---|---|---|---|
| 1 | 0.00 | 0.00 | 0.00 | 0.00 | 0.00 | 1.50 | 1 | | Stop |
| 2 | 0.00 | 0.00 | 1.50 | 0.00 | 0.00 | 2.88 | 1.58310 | 30.20 | R |
| 3 | 0.00 | 0.00 | 4.38 | 0.00 | 45.00 | 8.12 | 1.58310 | 30.20 | L |
| 4 | −8.12 | 0.00 | 4.38 | −22.51 | 90.00 | 9.86 | 1.58310 | 30.20 | L |
| 5 | −1.15 | −6.97 | 4.38 | −4.56 | 90.00 | 9.30 | 1.58310 | 30.20 | L |
| 6 | −8.69 | −12.43 | 4.38 | 15.90 | 90.00 | 9.50 | 1.58310 | 30.20 | L |
| 7 | 0.79 | −13.11 | 4.38 | 25.90 | 90.00 | 10.00 | 1.58310 | 30.20 | L |
| 8 | −4.82 | −21.39 | 4.38 | 27.95 | 90.00 | 8.02 | 1.58310 | 30.20 | L |
| 9 | 3.20 | −21.39 | 4.38 | 0.00 | 90.00 | 0.07 | 1.58310 | 30.20 | R |
| 10 | 3.30 | −21.39 | 4.38 | 0.00 | 90.00 | 0.00 | 1 | | I.P. |

Spherical Shape

R1:∞

R2: 9.000

R3:∞

R9:−20.232

R10:∞

Aspherical Shape

| | | | |
|---|---|---|---|
| R 4: | a = 3.82478e+01 | b = 7.66525e+00 | t = −3.37224e+01 |
| | $C_{02}$ = 0. | $C_{20}$ = 0. | |
| | $C_{03}$ = 7.79171e−04 | $C_{21}$ = 5.74381e−04 | |
| | $C_{04}$ = −1.10731e−04 | $C_{22}$ = −3.68495e−04 | $C_{40}$ = −2.03734e−04 |
| R 5: | a = 4.33006e+00 | b = −1.13123e+01 | t = 4.85692e+01 |
| | $C_{02}$ = 0. | $C_{20}$ = 0. | |
| | $C_{03}$ = 1.37457e−03 | $C_{21}$ = 1.56506e−02 | |
| | $C_{04}$ = −4.94422e−04 | $C_{22}$ = −3.75514e−04 | $C_{40}$ = 5.75694e−04 |
| R 6: | a = 7.06881e+00 | b = −2.86427e+01 | t = 2.35496e+01 |
| | $C_{02}$ = 0. | $C_{20}$ = 0. | |
| | $C_{03}$ = 2.20424e−04 | $C_{21}$ = 1.90803e−03 | |
| | $C_{04}$ = −2.45384e−05 | $C_{22}$ = −2.20910e−05 | $C_{40}$ = 6.55653e−05 |
| R 7: | a = ∞ | b = ∞ | t = 0. |
| | $C_{02}$ = 0. | $C_{20}$ = 0. | |
| | $C_{03}$ = −1.25739e−03 | $C_{21}$ = 2.00682e−03 | |
| | $C_{04}$ = 6.21721e−05 | $C_{22}$ = −1.62119e−04 | $C_{40}$ = 2.82891e−05 |
| R 8: | a = −4.42534e+01 | b = 1.08452e+01 | t = 2.48660e+00 |
| | $C_{02}$ = 0. | $C_{20}$ = 0. | |
| | $C_{03}$ = −5.93354e−04 | $C_{21}$ = 1.95331e−03 | |
| | $C_{04}$ = −2.52041e−05 | $C_{22}$ = −2.46364e−04 | $C_{40}$ = −6.80191e−05 |

In FIGS. 11A and 11B, an optical element 10 has a plurality of curved reflecting surfaces and is made from glass or like transparent body. The external surface of the optical element 10 is made, as, in order of passage of light from an object of, a convex refracting surface R2 (entrance surface) having a positive refractive power, six reflecting surfaces, namely, a flat reflecting plane R3, a concave mirror R4, a convex mirror R5, a concave mirror R6, a reflecting surface R7 and a concave mirror R8, and a convex refracting surface R7 (exit surface) having a positive refractive power. A stop R1 (entrance pupil) is located on the object side of the optical element 10. A last image plane R8 is coincident with the image sensing surface of a CCD or like image pickup element. A reference axis of the photographic optical system is indicated by reference numeral 5.

It is to be noted that the two refracting surfaces each are rotationally symmetrical or a sphere, and all the reflecting surfaces are symmetrical with respect to the YZ plane only.

This embodiment has an image forming function described below. A light beam 1 from the object comes in the Z (−) direction and passes through the stop R1 (entrance pupil), by which the light intensity is regulated, then enters the optical element 10 at the entrance surface R2 to receive convergence, is then reflected from the surface R3 to deflect in the Z(−) direction, then reflected from the reflecting surface R4 to once form an image, is then reflected from the surfaces R5, R6, R7 and R8 in succession, then exits from the exit surface R7 in the X(+) direction, and then forms an image again on the last image plane R10.

The object light rays form an intermediate image in the space between the surfaces R4 and R5, and the pupil light rays form an intermediate image in the space between the surfaces R6 and R7.

Owing to such refractive powers by the entrance and exit surfaces and to such refractive powers in the internal space therebetween by the plurality of curved reflecting mirrors, the optical element 10 functions as a lens unit having a desired optical performance with the overall refractive power being positive.

The lateral aberrations of the present embodiment are shown in FIG. 13.

In the case of the present embodiment, the entrance surface R2 of the optical element 10 is made to have a relatively strong positive refractive power, thereby condensing the on-axial and off-axial light beams. The flat reflecting surface R3 is thus prevented from increasing in the size. This achieves a further thinning of the whole optical system.

In the present embodiment, the reference axis ray of the reflecting surface R3 and those that follow is made to zigzag in a plane (XY plane) perpendicular to the entering reference axis (Z axis). (80% or so of the length of the reference axis in the optical element 10 is laid in the XY plane.)

In the preceding embodiments, all of the reference axes, including the entering reference axis, and the exiting reference axis are contained in a certain plane (YZ plane). From the point of view of the layout of the photographic optical system, it is desirable in some cases that the entering reference axis is not in parallel with that plane. So, in the case of the present embodiment, the thinning is possible in the perpendicular direction (in this instance, the Z axis direction) to the plane in which the zigzagged reference axis of the interior of the optical system is contained likewise as in the other embodiments. Because of this, a photographic optical system of reduced thickness in the shooting direction can be formed. So, the degree of freedom for incorporating the optical system into the camera or the like is further increased.

Though, in the present embodiment, the entering reference axis is arranged perpendicularly to the plane in which most of the reference axis of the interior of the optical element falls, the exiting reference axis may be made perpendicular instead. For this purpose, a flat reflecting surface is arranged just in front of the exit surface. In this case, not only the thinning is achieved in the perpendicular direction to the plane of most of the reference axis, but also a degree of freedom is born on the layout of the image pickup element.

Further, it is also possible to arrange both of the entering and exiting reference axes perpendicularly to the plane in which most of the reference axis falls. While taking the free layout, a similar focusing operation to that in the conventional lens system can be carried out, since the entering and exiting optical axes are parallel to each other.

(Embodiment 6)

Figure 14:
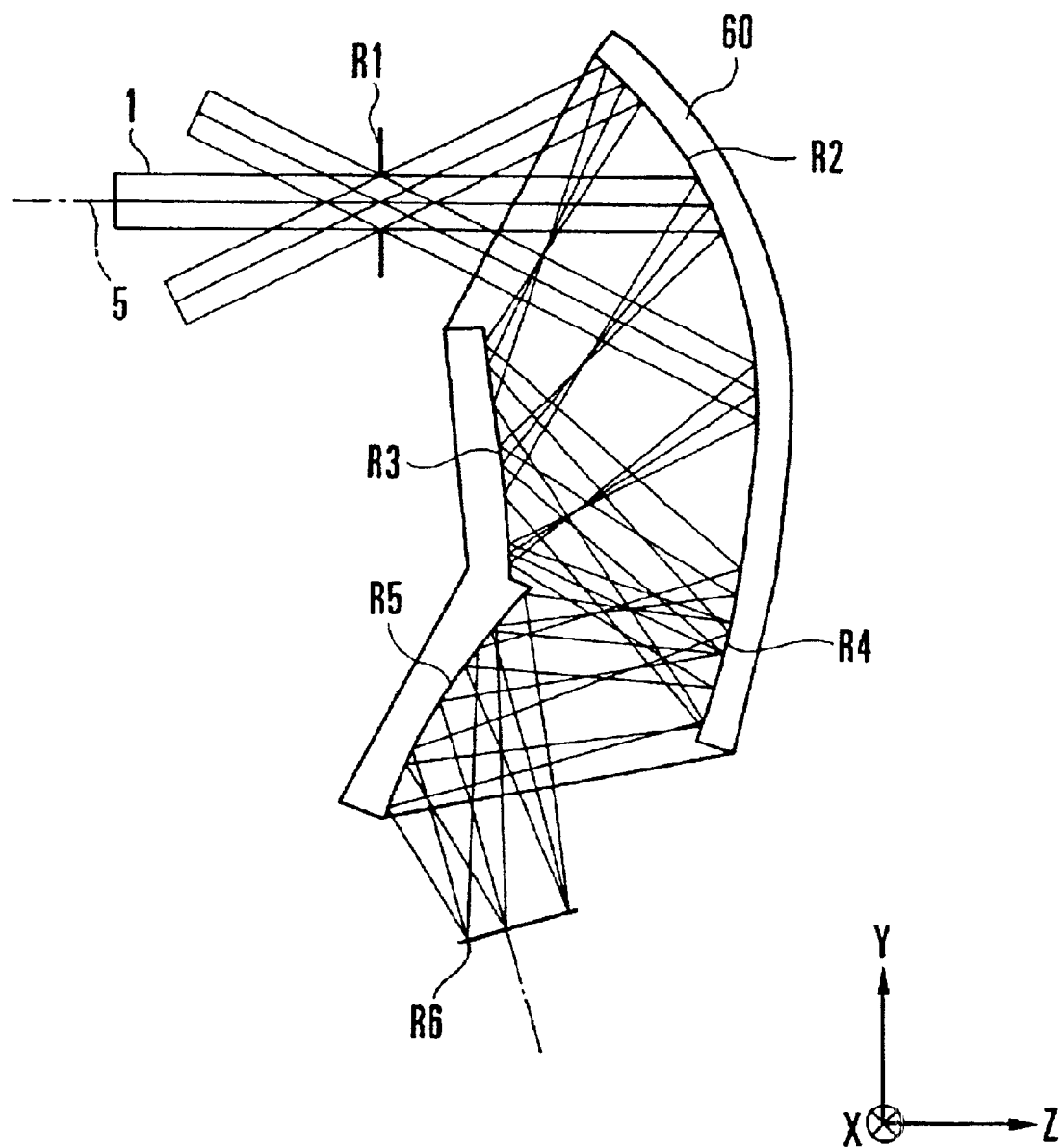
FIG. 14 is a sectional view in the YZ plane of an embodiment 6 of the optical system according to the invention.
Figure 15A:
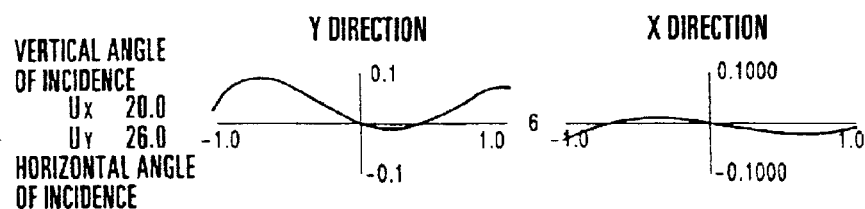
FIGS. 15A–15F are graphs of lateral aberrations of the embodiment 6.
Figure 15B:
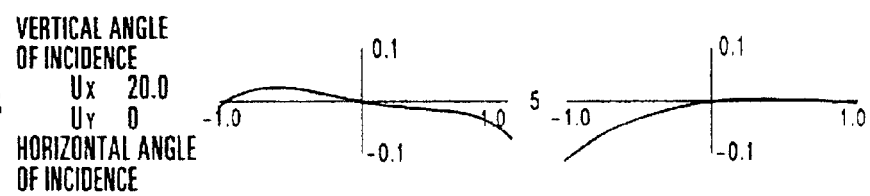
Figure 15C:
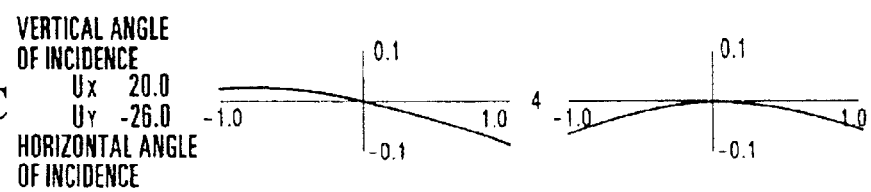
Figure 15D:
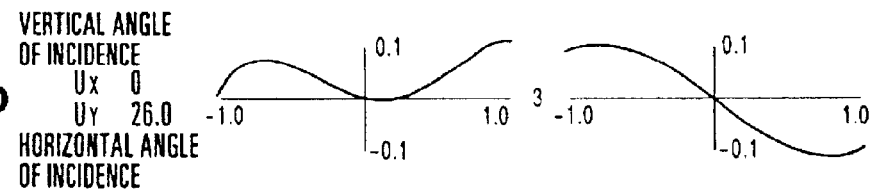
Figure 15E:
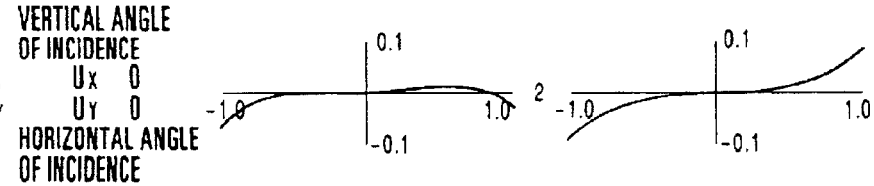
Figure 15F:
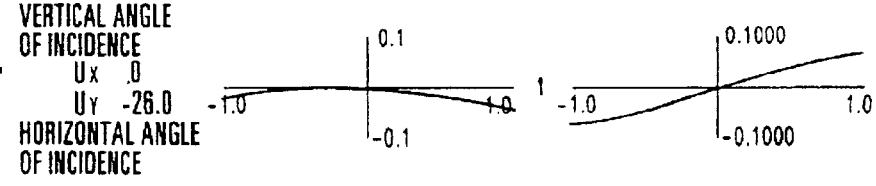

FIG. 14 is a sectional view in the YZ plane of a sixth embodiment of the optical system according to the invention. The present embodiment is a photographic optical system of 52.0 degrees in the horizontal angle of view and 40.0 degrees in the vertical angle of view. FIG. 14 even shows the optical path. The foregoing embodiments all have employed a type of optical elements in which the refracting and reflecting surfaces are formed on the external surface of the transparent body. A plurality of reflecting surfaces may otherwise be made up in the interior of a block of hollow core in the form of external surface mirrors. The present embodiment employs this type of optical element as obtained by providing the hollow interior of a block with mirror surfaces. The data of the design parameters of the present embodiment are as follows:

Horizontal Half-Angle of View: 26.0°

Vertical Half-Angle of View: 20.0°

Aperture Diameter: 2.0 mm

Image Size: Horizontal 4 mm×Vertical 3 mm

Optical System Size: (X×Y×Z)=11.4×32.5×14.2

| i | Yi | Zi | θi | Di | Ndi | vdi | Surface |
|---|------|-------|--------|-------|-----|-----|---------|
| 1 | 0.00 | 0.00 | 0.00 | 12.39 | 1 | | Stop |
| 2 | 0.00 | 12.39 | 24.93 | 12.60 | 1 | | L |
| 3 | −9.63 | 4.27 | 4.87 | 10.80 | 1 | | L |
| 4 | −16.59 | 12.53 | −15.13 | 10.80 | 1 | | L |
| 5 | −18.45 | 1.89 | −32.08 | 8.68 | 1 | | L |
| 6 | −26.79 | 4.28 | −74.03 | 0.00 | 1 | | I.P. |

Spherical Shape
 R1:∞
 R6:∞
Aspherical Shape

| | | | |
|---|---|---|---|
| R 2: | a = −1.27078e+01 | b = −1.61563e+01 | t = 3.43678e+01 |
| | $C_{02}$ = 0. | $C_{20}$ = 0. | |
| | $C_{03}$ = −9.19140e−05 | $C_{21}$ = 1.68009e−04 | |
| | $C_{04}$ = 1.32075e−05 | $C_{22}$ = 4.77170e−05 | $C_{40}$ = 9.64328e−05 |
| R 3: | a = −8.00318e+00 | b = 1.94833e+01 | t = −6.57313e+01 |
| | $C_{02}$ = 0. | $C_{20}$ = 0. | |
| | $C_{03}$ = −9.87875e−05 | $C_{21}$ = 2.02373e−03 | |
| | $C_{04}$ = 1.55491e−04 | $C_{22}$ = 7.57581e−05 | $C_{40}$ = 3.56041e−03 |
| R 4: | a = −1.28016e+01 | b = −1.17328e+02 | t = −4.11271e+01 |
| | $C_{02}$ = 0. | $C_{20}$ = 0. | |
| | $C_{03}$ = 6.04887e−04 | $C_{21}$ = −3.51858e−04 | |
| | $C_{04}$ = 1.69212e−04 | $C_{22}$ = 2.77107e−05 | $C_{40}$ = −2.25094e−05 |
| R 5: | a = 1.26067e+01 | b = 2.82424e+02 | t = 4.14909e−01 |
| | $C_{02}$ = 0. | $C_{20}$ = 0. | |
| | $C_{03}$ = 3.02802e−05 | $C_{21}$ = 2.82991e−04 | |
| | $C_{04}$ = 2.96306e−05 | $C_{22}$ = −6.80814e−05 | $C_{40}$ = −1.08283e−04 |

In FIG. 14, a block 60 of hollow core (optical element) has a plurality of curved reflecting surfaces formed in the interior thereof. The internal surface of the optical element 60 is made, in order of passage of light from an object of, four reflecting surfaces, namely, a concave mirror R2, reflecting surfaces R3 and R4 and a concave mirror R5. A stop R1 (entrance pupil) is located on the object side of the optical element 60. A last image plane R6 is coincident with the image sensing surface of a CCD or like image pickup element. A reference axis of the photographic optical system is indicated by reference numeral 5. The whole of the reference axis lies in the paper of the drawing YZ plane).

It is to be noted that all the reflecting surfaces are symmetrical with respect to the YZ plane only.

This embodiment has an image forming function described below. A light beam 1 coming from the object passes through the stop R1 (entrance pupil), by which the light intensity is regulated, then enters the optical element 60, is then reflected from the surface R2, then once forms an image in the neighborhood of the surface R3, is then reflected from the surfaces R3, R4 and R5 in succession, then exits from the optical element 60 and then forms an image again on the last image plane R6.

The object light rays form an intermediate image in the space between the surfaces R2 and R3, and re-form an image in contracted scale on the last image plane R6. The pupil light rays form an intermediate image in the neighborhood of the surface R3.

Owing to such refractive powers in its interior by the plurality of curvature-imparted reflecting mirrors, the optical element 60 functions as a lens unit having a desired optical performance with the overall refractive power being positive.

The lateral aberrations of the present embodiment are shown in FIG. 15.

In the present embodiment, use is made of only the surface reflecting mirrors and, because of the absence of refracting surfaces, there is a merit that no chromatic aberrations are produced. In the case of using the surface reflecting mirrors as in the present embodiment, for the purpose of avoiding production of errors of the relative positions of the surfaces to one another, it is preferred to form all the reflecting surface in unison.

(Embodiment 7)

Figure 16:
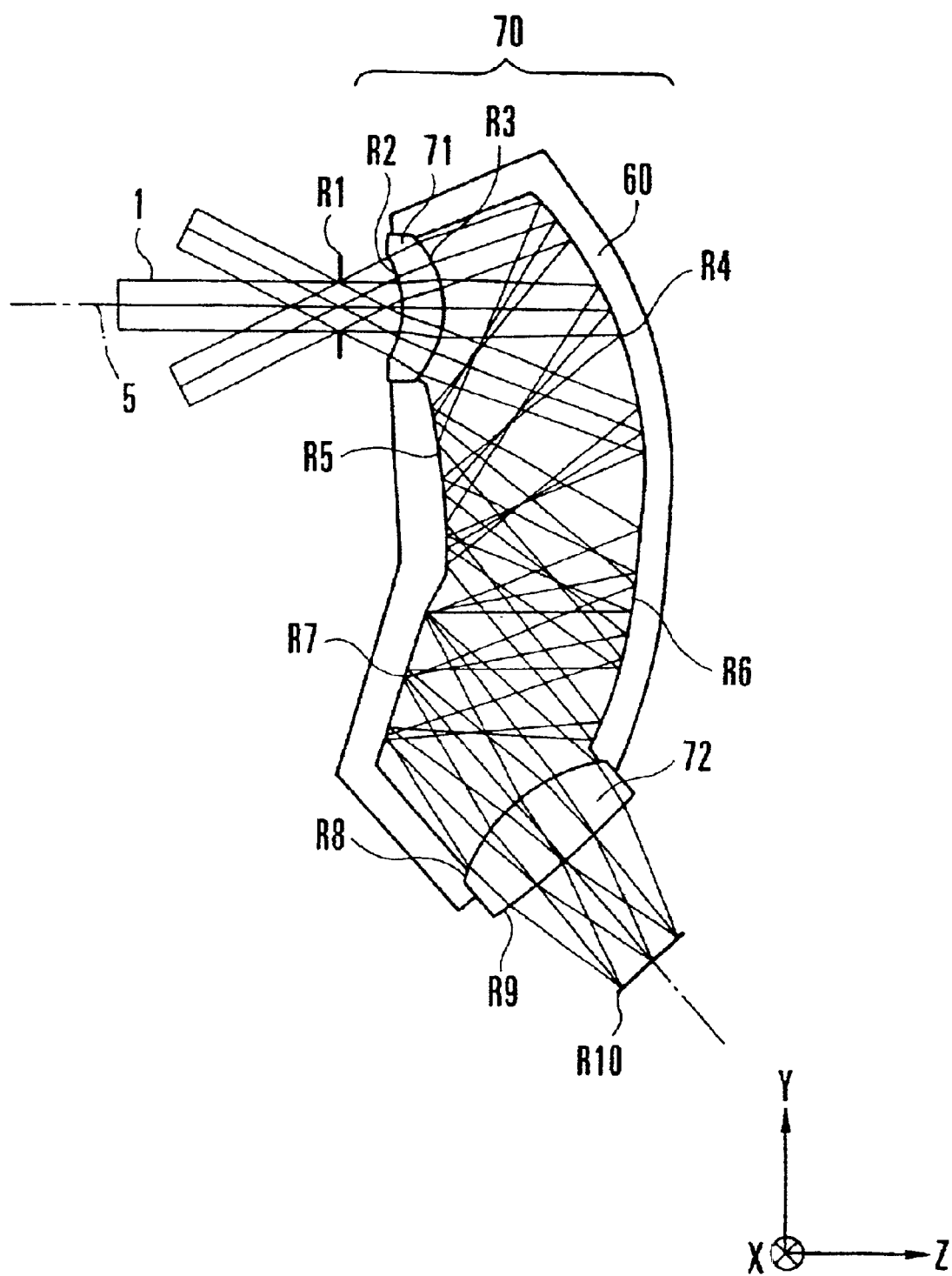
FIG. 16 is a sectional view in the YZ plane of an embodiment 7 of the optical system according to the invention.

FIG. 16 is a sectional view in the YZ plane of a seventh embodiment of the optical system according to the invention. The present embodiment is a photographic optical system of 52.0 degrees in the horizontal angle of view and 40.0 degrees in the vertical angle of view. FIG. 16 even shows the optical path. This embodiment is an example of construction of an optical system by a block of hollow core having formed therein a plurality of external surface reflecting mirrors and two refracting lenses.

The data of the design parameters of the present embodiment are as follows:

Horizontal Half-Angle of View: 26.0°
Vertical Half-Angle of View: 20.0°
Aperture Diameter: 2.5 mm
Image Size: Horizontal 4 mm×Vertical 3 mm
Optical System Size: (X×Y×Z)=11.2×40.9×17.5

| i | Yi | Zi | θi | Di | Ndi | vdi | Surface |
|---|------|-------|--------|-------|---------|-------|---------|
| 1 | 0.00 | 0.00 | 0.00 | 3.39 | 1 | | Stop |
| 2 | 0.00 | 3.39 | 0.00 | 2.21 | 1.75500 | 52.32 | R |
| 3 | 0.00 | 5.60 | 0.00 | 8.75 | 1 | | R |
| 4 | 0.00 | 14.35 | 23.67 | 13.12 | 1 | | L |
| 5 | −9.65 | 5.46 | 5.35 | 11.88 | 1 | | L |
| 6 | −16.74 | 14.98 | −12.65 | 12.00 | 1 | | L |
| 7 | −19.10 | 3.22 | −18.65 | 8.75 | 1 | | L |
| 8 | −25.67 | 9.00 | −48.65 | 3.96 | 1.75500 | 52.32 | R |
| 9 | −28.65 | 11.62 | −48.65 | 6.80 | 1 | | R |
| 10 | −33.75 | 16.10 | −48.65 | 0.00 | 1 | | I.P. |

Spherical Shape
 R1:∞
 R2:−4.933
 R3:−5.275
 R8: 10.191
 R9:−48.967
 R10:∞
Aspherical Shape

| | | | |
|---|---|---|---|
| R 4: | a = −2.16731e+01 | b = −1.68559e+01 | t = 2.45932e+01 |
| | $C_{02}$ = 0. | $C_{20}$ = 0. | |
| | $C_{03}$ = −6.14092e−05 | $C_{21}$ = 8.03325e−05 | |
| | $C_{04}$ = −3.45169e−06 | $C_{22}$ = 3.74779e−05 | $C_{40}$ = −9.72565e−06 |
| R 5: | a = −4.96405e+00 | b = 8.31430e+00 | t = −4.21818e+01 |
| | $C_{02}$ = 0. | $C_{20}$ = 0. | |
| | $C_{03}$ = −2.11160e−04 | $C_{21}$ = 6.81127e−04 | |
| | $C_{04}$ = 4.71978e−06 | $C_{22}$ = 1.98254e−04 | $C_{40}$ = −5.40751e−04 |
| R 6: | a = −1.27294e+01 | b = 2.11554e+02 | t = −2.40317e+01 |
| | $C_{02}$ = 0. | $C_{20}$ = 0. | |
| | $C_{03}$ = 6.89343e−05 | $C_{21}$ = 5.46114e−05 | |
| | $C_{04}$ = −5.72350e−06 | $C_{22}$ = −1.46912e−05 | $C_{40}$ = −2.50225e−05 |
| R 7: | a = 3.73721e+00 | b = −3.91247e+00 | t = −2.95187e+01 |
| | $C_{02}$ = 0. | $C_{20}$ = 0. | |
| | $C_{03}$ = 4.49626e−04 | $C_{21}$ = 5.03152e−04 | |
| | $C_{04}$ = −7.69860e−05 | $C_{22}$ = −7.23646e−05 | $C_{40}$ = −4.95296e−05 |

In FIG. 16, a block 60 of hollow core (optical element) has a plurality of curved reflecting surfaces formed in the interior thereof. Two positive lenses 71 and 72 (refracting optical systems) are located at the entrance and exit of the optical element 60, respectively. The internal surface of the optical element 60 is made, in order of passage of light from an object of, four reflecting surfaces, namely, a concave mirror R4, a convex mirror R5, a concave mirror R6 and a reflecting surface R7. A stop R1 (entrance pupil) is located on the object side of the positive lens 71. A last image plane R10 is coincident with the image sensing surface of a CCD or like image pickup element. A reference axis of the photographic optical system is indicated by reference numeral 5. The whole of the reference axis lies in the paper of the drawing (YZ plane).

It is to be noted that the optical element 60 and the positive lenses 71 and 72 constitute part of an optical system 70.

This embodiment has an image forming function described below. A light beam 1 coming from the object passes through the stop R1 (entrance pupil), by which the light intensity is regulated, then refracts in crossing the refracting surfaces R2 and R3 of the positive lens 71 to converge, then enters the optical element 60, is then reflected from the surface R4, then once forms an image in the neighborhood of the reflecting surface R5, is then reflected from the surfaces R5, R6 and R7 in succession, then exits from the optical element 60, then enters the positive lens 72, then refracts in crossing the refracting surfaces R8 and R9 and then forms an image again on the last image plane R10. The object light rays form an intermediate image in the space between the surfaces R4 and R5, and re-form an image in contracted scale on the last image plane R10. The pupil light rays form an intermediate image in the space between the surfaces R6 and R7.

Owing to such refractive powers in the interior of the optical element 60 by the plurality of curved reflecting mirrors, and to such refractive powers by the two positive lenses 71 and 72, the optical system 70 functions as a lens unit having a desired optical performance with the overall refractive power being positive.

Figure 17:
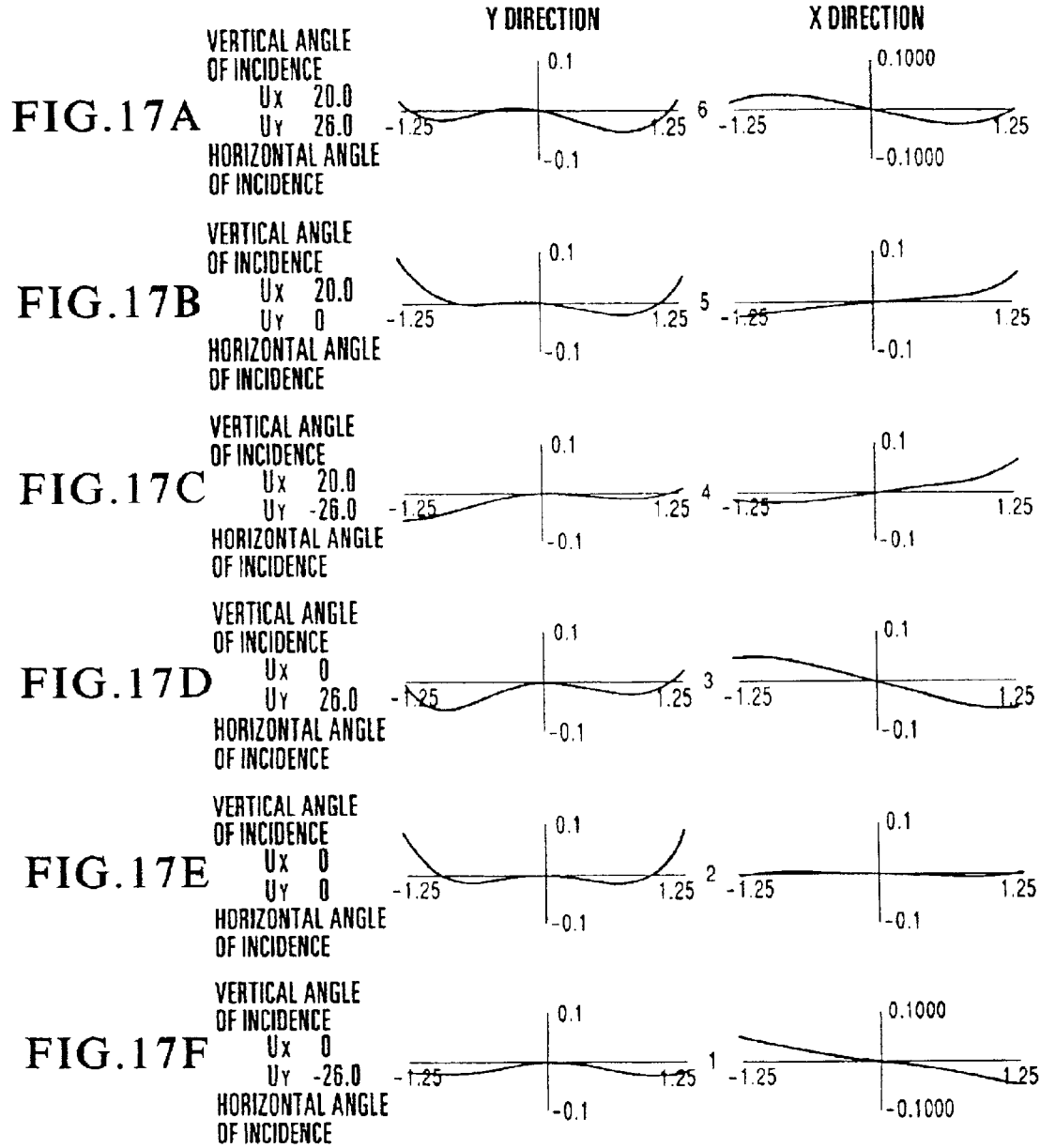
FIGS. 17A–17F are graphs of lateral aberrations of the embodiment 7.

The lateral aberrations of the present embodiment are shown in FIG. 17.

In the present embodiment, the entrance and exit of the optical element 60 using the hollow core mirror surfaces are provided with respective refracting systems to thereby supplement the insufficiency of the refractive power arising from the fact that the reflection in air contributes to a small refractive index (=1.0).

Also, if the surface reflecting mirror is used, dust or foreign particles accumulate on it. When shooting, they cast shadow on the image plane. In the present embodiment, however, the two positive lenses 71 and 72 are formed in unison with the optical element 60 to thereby prevent dust or foreign particles from invading.

Also, in the present embodiment, the positive lens at the entrance of the optical system functions to converge the incoming light rays to avoid an unduly large increase of the first reflecting surface R4 of the optical element 60. At the exit, too, of the optical system, there is arranged the positive lens 72 to supplement a refractive power.

(Embodiment 8)

Figure 18:
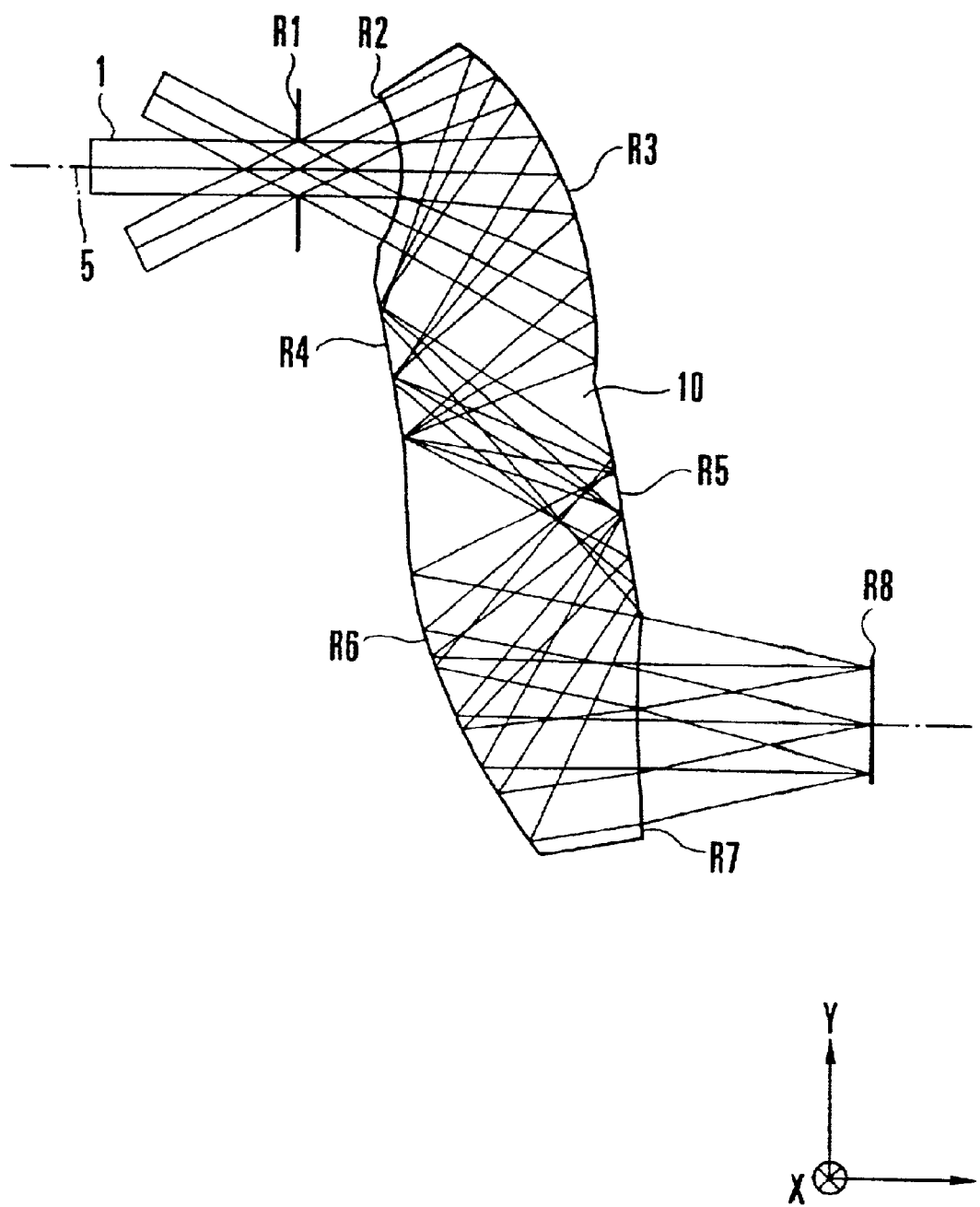
FIG. 18 is a sectional view in the YZ plane of an embodiment 8 of the optical system according to the invention.
Figure 19A:
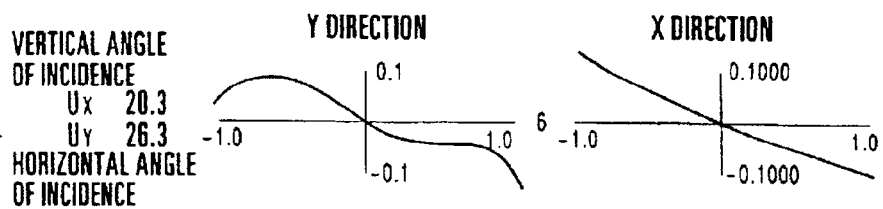
FIGS. 19A–19F are graphs of lateral aberrations of the embodiment 8.
Figure 19B:
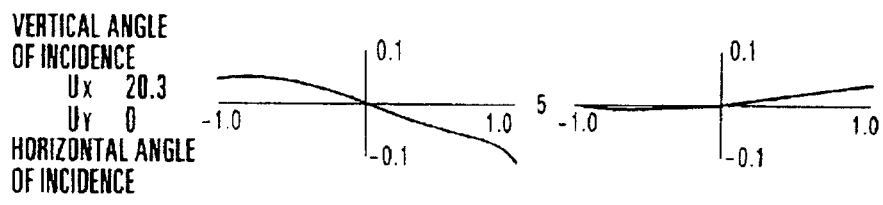
Figure 19C:
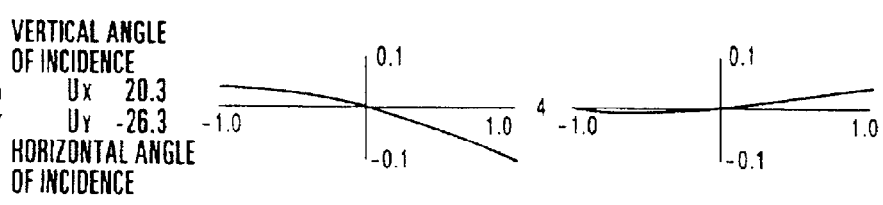
Figure 19D:
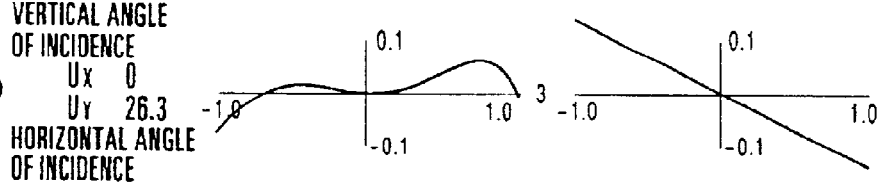
Figure 19E:
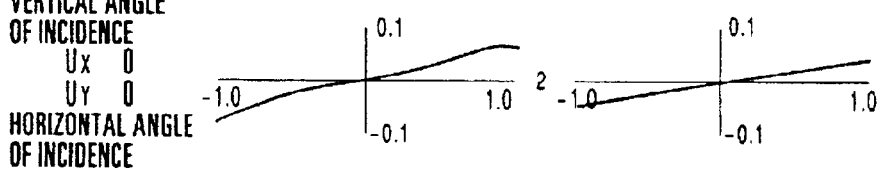
Figure 19F:
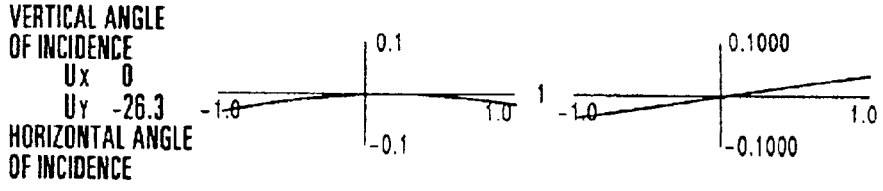

FIG. 18 is a sectional view in the YZ plane of an eighth embodiment of the optical system according to the invention. The present embodiment is a photographic optical system of 52.6 degrees in the horizontal angle of view and 40.6 degrees in the vertical angle of view. FIG. 16 even shows the optical path.

The data of the design parameters of the present embodiment are as follows:

Horizontal Half-Angle of View: 26.3°
Vertical Half-Angle of View: 20.3°
Aperture Diameter: 2.0 mm
Image Size: Horizontal 4 mm×Vertical 3 mm
Optical System Size: (X×Y×Z)=10.2×29.5×21.5

| i | Yi | Zi | θi | Di | Ndi | vdi | Surface |
|---|-----|-----|-----|-----|-----|-----|-----|
| 1 | 0.00 | 0.00 | 0.00 | 4.00 | 1 | | Stop |
| 2 | 0.00 | 4.00 | 0.00 | 6.00 | 1.51633 | 64.15 | R |
| 3 | 0.00 | 10.00 | 25.00 | 10.00 | 1.51633 | 64.15 | L |
| 4 | −7.66 | 3.57 | 10.00 | 10.00 | 1.51633 | 64.15 | L |
| 5 | −12.66 | 12.23 | 10.00 | 10.00 | 1.51633 | 64.15 | L |
| 6 | −20.32 | 5.80 | 25.00 | 7.00 | 1.51633 | 64.15 | L |
| 7 | −20.32 | 12.80 | 0.00 | 8.73 | 1 | | R |
| 8 | −20.32 | 21.54 | 0.00 | 0.00 | 1 | | I.P. |

Spherical Shape
R1:∞
R2:−4.887
R7: 50.000
R8:∞
Aspherical Shape

R 3:   a = −1.25474e+01   b = −1.33487e+01   t = 2.51430e+01
       $C_{02}$ = 0.         $C_{20}$ = 0.
       $C_{03}$ = −2.62139e−04   $C_{21}$ = 4.52298e−04
       $C_{04}$ = −8.34221e−06   $C_{22}$ = 4.34287e−05   $C_{40}$ = 6.55966e−06
R 4:   a = −1.99702e+00   b = 2.11270e+00   t = −6.34728e+01
       $C_{02}$ = 0.         $C_{20}$ = 0.
       $C_{03}$ = −1.47470e−03   $C_{21}$ = 4.94307e−03
       $C_{04}$ = 1.81131e−04   $C_{22}$ = −1.92667e−04   $C_{40}$ = 1.31369e−04
R 5:   a = 9.60134e+00   b = −9.43206e+00   t = −1.72001e+00
       $C_{02}$ = 0.         $C_{20}$ = 0.
       $C_{03}$ = 1.56729e−03   $C_{21}$ = 6.80826e−04
       $C_{04}$ = 1.88025e−04   $C_{22}$ = −1.68825e−04   $C_{40}$ = 2.53692e−04
R 6:   a = 1.23961e+01   b = 4.86671e+01   t = −2.51796e+01
       $C_{02}$ = 0.         $C_{20}$ = 0.
       $C_{03}$ = 5.13451e−05   $C_{21}$ = −2.64192e−04
       $C_{04}$ = −5.09712e−06   $C_{22}$ = 5.90352e−06   $C_{40}$ = 1.54707e−05

In FIG. 18, an optical element 10 has two refracting surfaces and a plurality of curved reflecting surfaces and is made from glass or like transparent body. The external surface of the optical element 10 is made, in order of passage of light from an object of, a concave refracting surface R2 (entrance surface) having a negative refractive power, four reflecting surfaces, namely, a concave mirror R3, a reflecting surface R4, a reflecting surface R5 and a concave mirror R6, and a concave refracting surface R7 (exit surface) having a negative refractive power. A stop R1 (entrance pupil) is located on the object side of the optical element 10. A last image plane R8 is coincident with the image sensing surface of a CCD or like image pickup element. A reference axis of the photographic optical system is indicated by reference numeral 5. The whole of the reference axis lies in the paper of the drawing (YZ plane).

It is to be noted that the two refracting surfaces each are rotationally symmetrical or a sphere, and all the reflecting surfaces are symmetrical with respect to the YZ plane only.

This embodiment has an image forming function described below. A light beam 1 from the object comes in the Z (−) direction and passes through the stop R1 (entrance pupil), by which the light intensity is regulated, then enters the optical element 10 at the entrance surface R2 to receive divergence, is then reflected from the surface R3 to once form an image, is then reflected from the surfaces R4, R5 and R6 in succession, then exits from the exit surface R7, and then forms an image again on the last image plane R8.

The object light rays form an intermediate image in the neighborhood of the surface R4, and the pupil light rays form an intermediate image in the neighborhood of the surface R5.

Owing to such refractive powers by the entrance and exit surfaces and to such refractive powers in the internal space therebetween by the plurality of curved reflecting mirrors, the optical element 10 functions as a lens unit having a desired optical performance with the overall refractive power being positive.

The lateral aberrations of the present embodiment are shown in FIG. 19.

In the present embodiment, the entrance surface R2 is formed to a concave refracting surface of sphere, so that, concerning the off-axial principal ray, it is made concentric toward the object side to thereby reduce the produced amount of off-axial aberrations. The exit surface R7, too, is formed to a concave refracting surface of sphere so that, concerning the on-axial rays, it is made concentric toward the image side to thereby suppress the spherical aberration and the longitudinal chromatic aberration.

(Embodiment 9)

Figure 20:
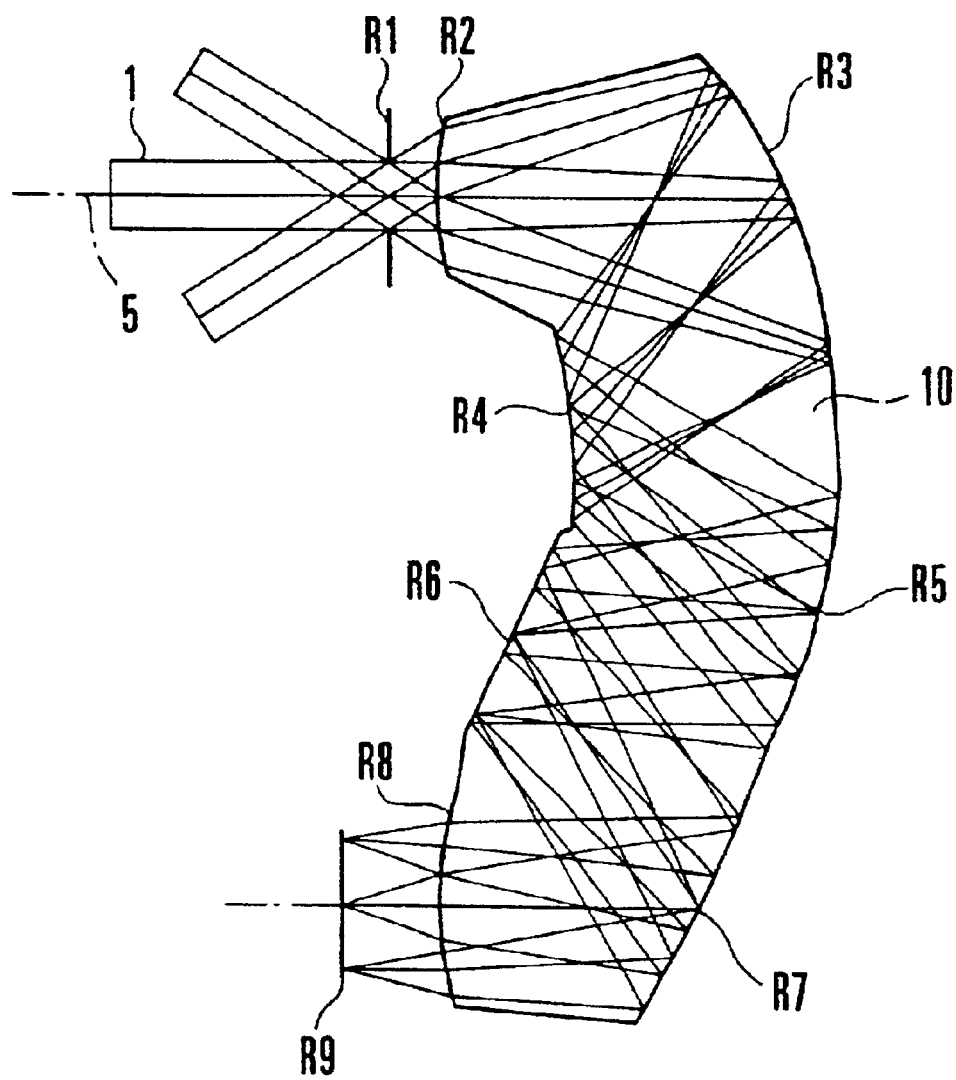
FIG. 20 is a sectional view in the YZ plane of an embodiment 9 of the optical system according to the invention.
Figure 21A:
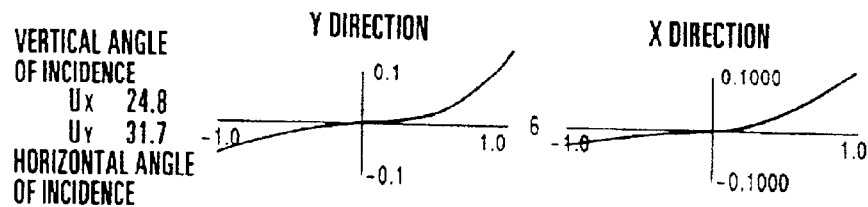
FIGS. 21A–21F are graphs of lateral aberrations of the embodiment 9.
Figure 21B:
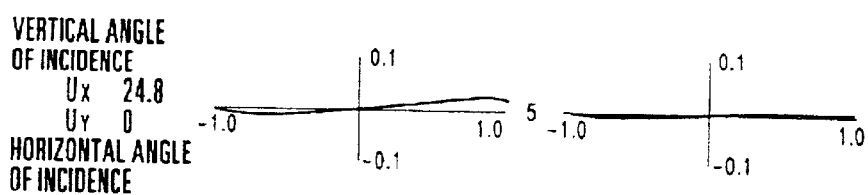
Figure 21C:
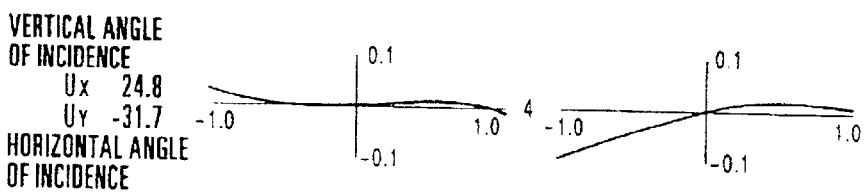
Figure 21D:
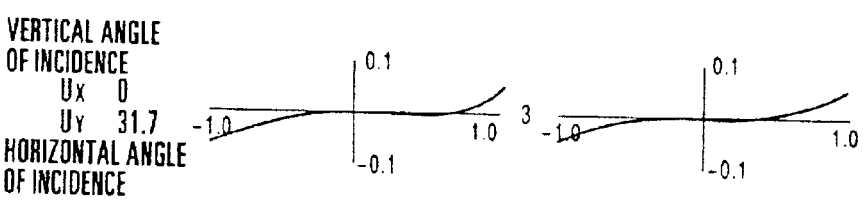
Figure 21E:
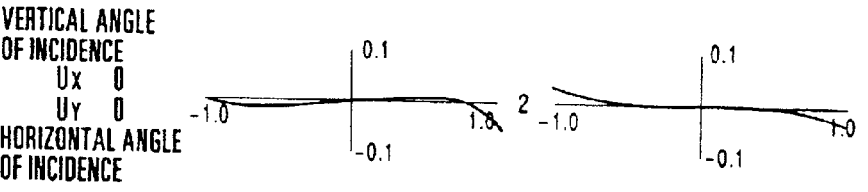
Figure 21F:
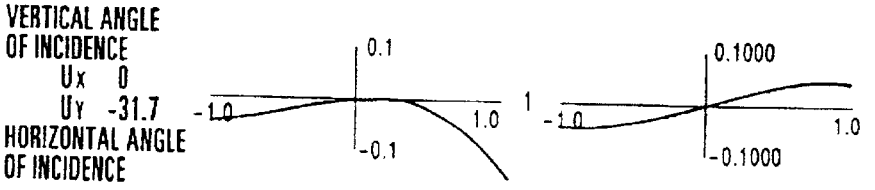
Figure 24:
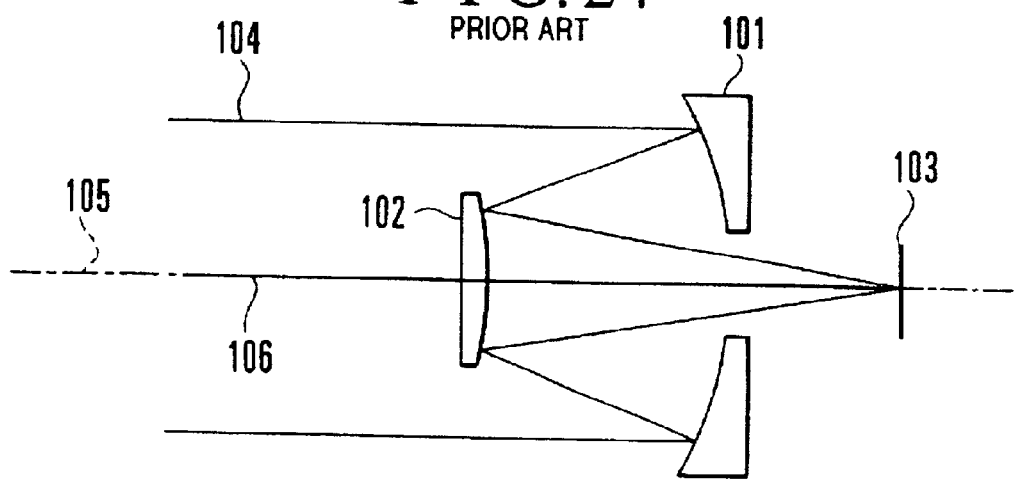
FIG. 24 is a diagram of the fundamental configuration of the Cassegrainian reflecting telescope.
Figure 25:
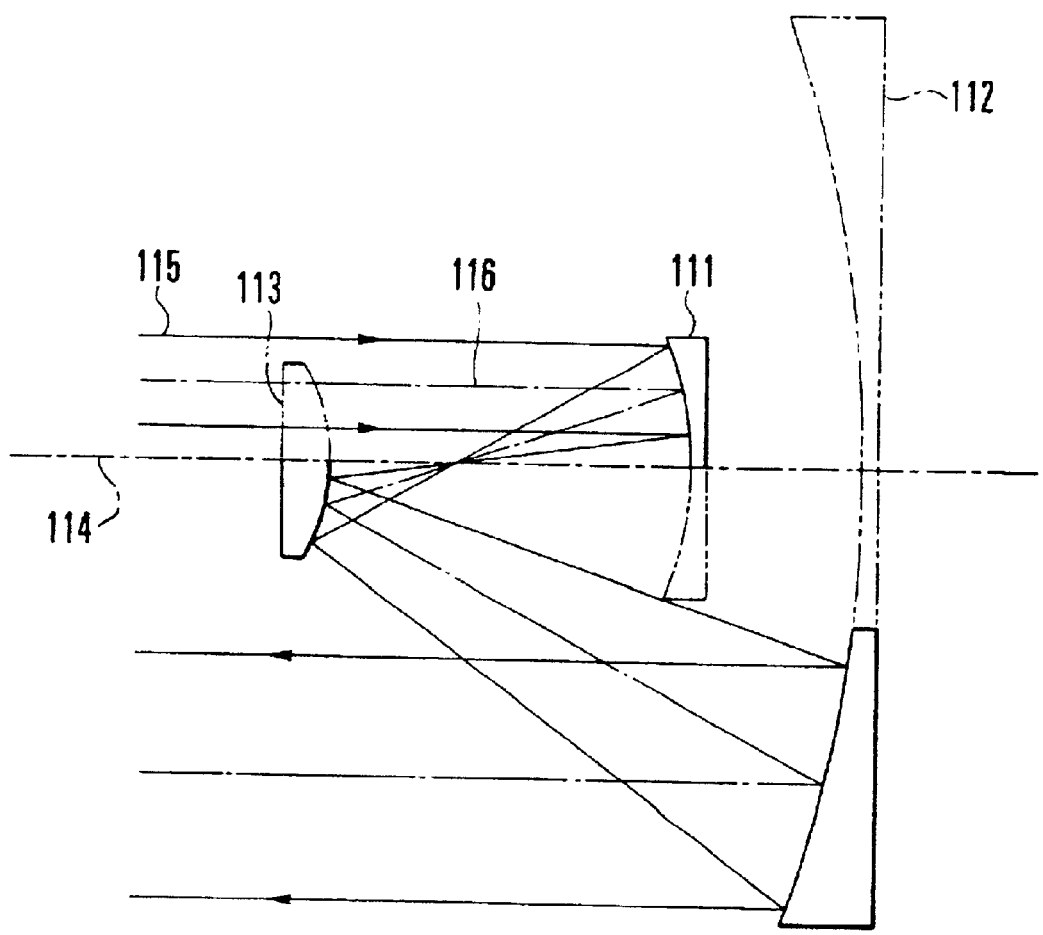
FIG. 25 is a diagram to explain a first method of avoiding the vignetting by putting the principal ray away from the optical axis in the mirror optical system.
Figure 26:
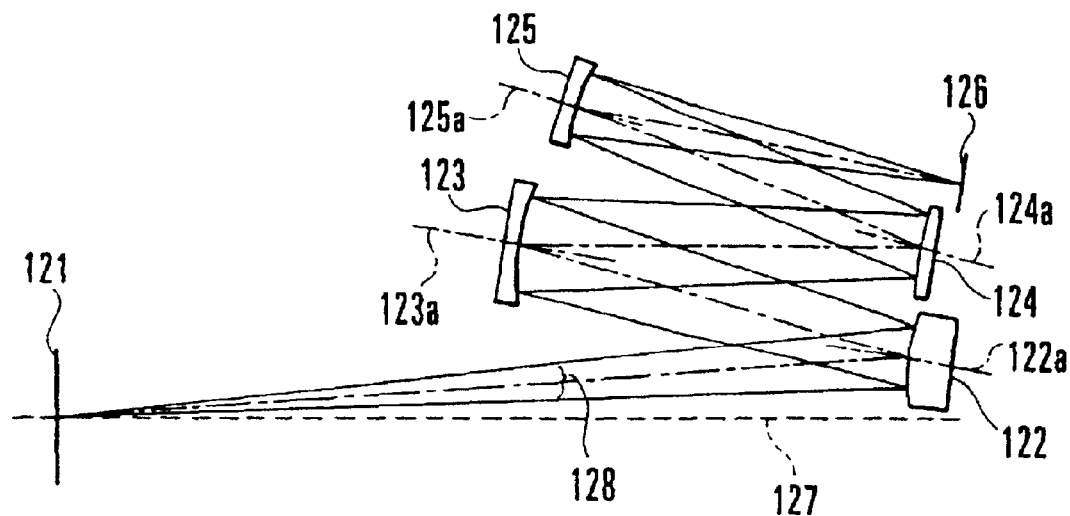
FIG. 26 is a diagram to explain a second method of avoiding the vignetting by putting the principal ray away from the optical axis in the mirror optical system.
Figure 27:
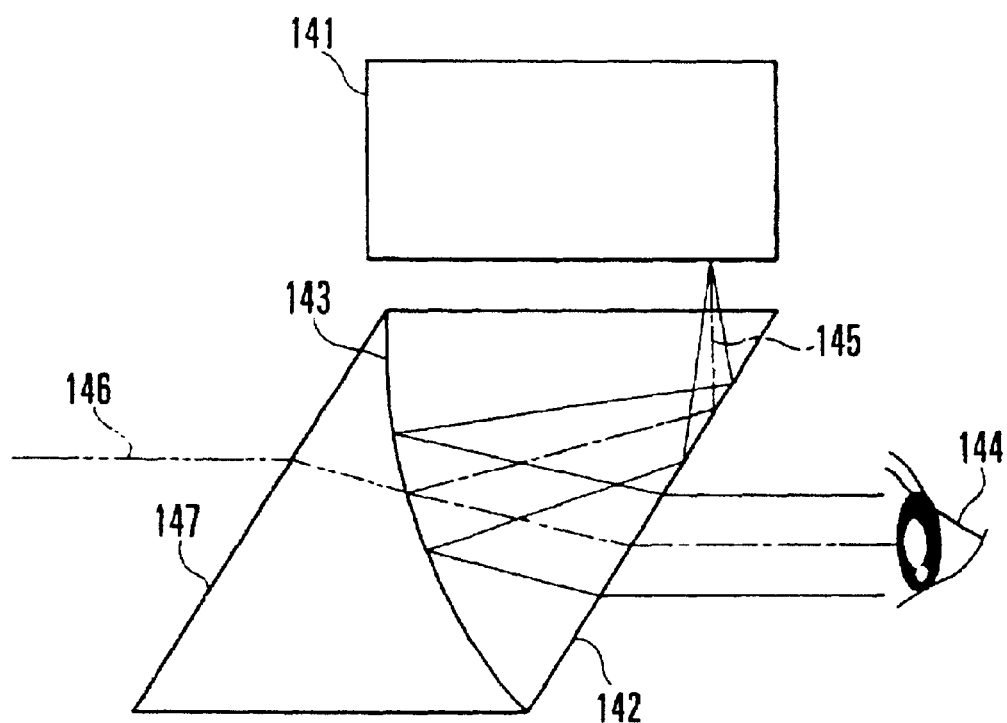
FIG. 27 is a diagram of an observing optical system using a prism having a curved reflecting surface.

FIG. 20 is a sectional view in the YZ plane of a ninth embodiment of the optical system according to the invention. The present embodiment is a photographic optical system of 63.4 degrees in the horizontal angle of view and 49.6 degrees in the vertical angle of view. FIG. 20 also shows the optical path. The data of the design parameters of the present embodiment are as follows:

Horizontal Half-Angle of View: 31.7°

Vertical Half-Angle of View: 24.8°

Aperture Diameter: 2.0 mm

Image Size: Horizontal 4 mm×Vertical 3 mm

Optical System Size: (X×Y×Z)=8.8×28.5×15.6

| i | Yi | Zi | θi | Di | Ndi | νdi | Surface |
|---|-----|------|--------|-------|---------|-------|---------|
| 1 | 0.00 | 0.00 | 0.00 | 1.50 | 1 | | Stop |
| 2 | 0.00 | 1.50 | 0.00 | 11.00 | 1.58310 | 30.20 | R |
| 3 | 0.00 | 12.50 | 22.51 | 9.86 | 1.58310 | 30.20 | L |
| 4 | −6.97 | 5.53 | 4.56 | 9.30 | 1.58310 | 30.20 | L |
| 5 | −12.43 | 13.07 | −15.90 | 9.50 | 1.58310 | 30.20 | L |
| 6 | −13.11 | 3.59 | −25.90 | 10.00 | 1.58310 | 30.20 | L |
| 7 | −21.39 | 9.20 | −27.95 | 8.02 | 1.58310 | 30.20 | L |
| 8 | −21.39 | 1.18 | 0.00 | 3.02 | 1 | | R |
| 9 | −21.39 | −1.84 | 0.00 | 0.00 | 1 | | I.P. |

Spherical Shape

R1:∞

R2: 9.000

R8: 11.420

R9:∞

Aspherical Shape

R 3: $a = -1.42089e+01$   $b = -1.27971e+01$   $t = 2.34670e+01$
$C_{02} = 0.$   $C_{20} = 0.$
$C_{03} = -1.21650e-04$   $C_{21} = 1.77751e-04$
$C_{04} = 1.02473e-04$   $C_{22} = 0.00000e+00$   $C_{40} = 1.17019e-04$

-continued

R 4: $a = -2.73896e+00$   $b = 5.70605e+00$   $t = -4.72249e+01$
$C_{02} = 0.$   $C_{20} = 0.$
$C_{03} = -5.27069e-03$   $C_{21} = -1.70267e-02$
$C_{04} = 1.01639e-03$   $C_{22} = 3.49290e-03$   $C_{40} = -2.36127e-03$

R 5: $a = -7.00149e+00$   $b = 2.25899e+01$   $t = -2.54205e+01$
$C_{02} = 0.$   $C_{20} = 0.$
$C_{03} = -5.00133e-04$   $C_{21} = -1.36126e-03$
$C_{04} = 9.37676e-06$   $C_{22} = 5.68911e-05$   $C_{40} = -7.68163e-05$

R 6: $a = \infty$   $b = \infty$   $t = 0.$
$C_{02} = 0.$   $C_{20} = 0.$
$C_{03} = 2.96631e-04$   $C_{21} = -9.13393e-04$
$C_{04} = -3.54650e-05$   $C_{22} = 1.83483e-04$   $C_{40} = -8.42594e-05$ R 7: $a = 3.21010e+01$   $b = -1.20905e+01$   $t = 5.43506e+00$
$C_{02} = 0.$   $C_{20} = 0.$
$C_{03} = -4.10032e-04$   $C_{21} = -1.36310e-03$
$C_{04} = 5.26092e-05$   $C_{22} = 3.62455e-04$   $C_{40} = 3.18477e-05$ In FIG. 20, an optical element 10 has a plurality of curved reflecting surfaces and is made from glass or like transparent body. The external surface of the optical element 10 is made, in order of passage of light from an object of, a convex refracting surface R2 (entrance surface) having a positive refractive power, five reflecting surfaces, namely, a concave mirror R3, a convex mirror R4, a concave mirror R5, a reflecting surface R6 and a concave mirror R7, and a convex refracting surface R8 (exit surface) having a positive refractive power. A stop R1 is located on the object side of the optical element 10. A last image plane R9 is coincident with the image sensing surface of a CCD or like image pickup element. A reference axis of the photographic optical system is indicated by reference numeral 5.

It is to be noted that the two refracting surfaces each are rotationally symmetrical or a sphere, and all the reflecting surfaces are symmetrical with respect to the YZ plane only.

This embodiment has an image forming function described below. A light beam 1 coming from the object passes through the stop R1 (entrance pupil), by which the light intensity is regulated, then enters the optical element 10 at the entrance surface R2, is then reflected from the surface R3, then once forms an image, is then reflected from the surfaces R4, R5, R6 and R7 in succession, then exits from the exit surface R8, and then forms an image again on the last image plane R9. The object light rays form an intermediate image in the space between the surfaces R3 and R4, and the pupil light rays form an intermediate image in the neighborhood of the surface R6.

The lateral aberrations of the optical system of the present embodiment are shown in FIG. 21.

In the present embodiment, the direction of the reference axis entering the optical element 10 and the direction of the reference axis exiting therefrom are parallel to each other and are opposite to each other. Also, the whole of the reference axis including entering and exiting lies in the paper of the drawing (YZ plane).

Owing to such refractive powers by the entrance and exit surfaces and to such refractive powers in the internal space therebetween by the plurality of curved reflecting mirrors, the optical element 10 functions as a lens unit having a desired optical performance with the overall refractive power being positive.

In the present embodiment, focusing to a close object is performed by moving the whole optical system relative to the image sensing surface R9 of the image pickup element. Particularly in the present embodiment, because the direction of the reference axis entering the optical element 10 and the direction of the reference axis exiting from the optical element 10 are parallel to each other, the whole optical system can be moved in parallel to the direction of the exiting reference axis (Z axis direction), so that the focusing operation is carried out likewise as in the conventional lens system.

In the present embodiment, the entrance surface R2 is made to be a convex refracting surface of sphere, thereby converging the off-axial principal ray. With this, when increasing the angle of field, the size of the first reflecting surface R3 is prevented from becoming big. The exit surface R8, too, is made to be a convex refracting surface of sphere, thereby preventing the back focal distance from increasing too much. At the same time, the off-axial rays are controlled so that the off-axial principal ray becomes telecentric to the image side.

(Embodiment 10)

FIG. 22 is a sectional view in the YZ plane of a tenth embodiment of the optical system according to the invention. The present embodiment is a photographic optical system of 63.4 degrees in the horizontal angle of view and 49.6 degrees in the vertical angle of view. In FIG. 22, the optical path is also shown. The data of the design parameters of the present embodiment are as follows:

Horizontal Half-Angle of View: 31.7°

Vertical Half-Angle of View: 24.8°

Aperture Diameter: 2.0 mm

Image Size: Horizontal 4 mm×Vertical 3 mm

Optical System Size: (X×Y×Z)=11.6×31.7×18.4

| i | Yi | Zi | θi | Di | Ndi | vdi | Surface |
|---|---|---|---|---|---|---|---|
| 1 | 0.00 | 0.00 | 0.00 | 1.51 | 1 | | Stop |
| 2 | 0.00 | 1.51 | 0.00 | 11.00 | 1.58310 | 30.20 | R |
| 3 | 0.00 | 12.51 | 25.00 | 9.86 | 1.58310 | 30.20 | L |
| 4 | −7.55 | 6.17 | 9.54 | 10.00 | 1.58310 | 30.20 | L |
| 5 | −12.69 | 14.75 | −8.92 | 10.00 | 1.58310 | 30.20 | L |
| 6 | −14.95 | 5.01 | −16.92 | 11.00 | 1.58310 | 30.20 | L |
| 7 | −22.99 | 12.52 | −23.46 | 9.63 | 1.58310 | 30.20 | L |
| 8 | −22.99 | 2.90 | 0.00 | 6.12 | 1 | | R |
| 9 | −22.99 | −3.22 | 0.00 | 0.00 | 1 | | I.P. |

Spherical Shape

R1: ∞

R2: 10.000

R8: −22.319

R9: ∞

Aspherical Shape

R 3: $a = -1.62082e+01$ $b = -1.49848e+01$ $t = 2.55369e+01$
$C_{02} = 0.$ $C_{20} = 0.$
$C_{03} = 4.68179e-04$ $C_{21} = -2.57239e-04$
$C_{04} = 1.15267e-04$ $C_{22} = 9.16989e-05$ $C_{40} = -6.20857e-05$

R 4: $a = -6.04401e+00$ $b = 9.16117e+00$ $t = -4.83700e+01$
$C_{02} = 0.$ $C_{20} = 0.$
$C_{03} = 2.51981e-04$ $C_{21} = -2.34078e-03$
$C_{04} = 2.21931e-04$ $C_{22} = -4.14266e-05$ $C_{40} = -2.26683e-03$

R 5: $a = -1.88694e+01$ $b = 2.70209e+01$ $t = -7.32613e+01$
$C_{02} = 0.$ $C_{20} = 0.$
$C_{03} = 1.41397e-03$ $C_{21} = -3.28610e-03$
$C_{04} = 1.24323e-04$ $C_{22} = 2.04931e-04$ $C_{40} = -5.89334e-05$

R 6: $a = \infty$ $b = \infty$ $t = 0.$
$C_{02} = 0.$ $C_{20} = 0.$
$C_{03} = 1.84391e-04$ $C_{21} = -3.75729e-03$
$C_{04} = -3.27025e-05$ $C_{22} = -9.89759e-05$ $C_{40} = -1.40884e-04$ R 7: $a = 1.73176e+01$ $b = -7.42208e+00$ $t = -2.00865e+00$
$C_{02} = 0.$ $C_{20} = 0.$
$C_{03} = 1.40461e-03$ $C_{21} = -1.06651e-03$
$C_{04} = -4.75156e-05$ $C_{22} = -4.70293e-05$ $C_{40} = -4.21348e-05$ In FIG. 22, an optical element 10 has a plurality of curved reflecting surfaces and is made from glass or like transparent body. The external surface of the optical element 10 is made, in order of passage of light from an object of, a convex refracting surface R2 (entrance surface) having a positive refractive power, five reflecting surfaces, namely, a concave mirror R3, reflecting surfaces R4, R5 and R6 and a concave mirror R7, and a concave refracting surface R8 (exit surface) having a negative refractive power. A stop R1 is located on the object side of the optical element 10. A last image plane R9 is coincident with the image sensing surface of a CCD or like image pickup element. A reference axis of the photographic optical system is indicated by reference numeral 5.

It is to be noted that the two refracting surfaces each are rotationally symmetrical or a sphere, and all the reflecting surfaces are symmetrical with respect to the YZ plane only.

This embodiment has an image forming function described below. A light beam 1 coming from the object passes through the stop R1 (entrance pupil), by which the light intensity is regulated, then enters the optical element 10 at the entrance surface R2, is then reflected from the surface R3, then once forms an image, is then reflected from the surfaces R4, R5, R6 and R7 in succession, then exits from the exit surface R8, and then forms an image again on the last image plane R9. The object light rays form an intermediate image in the space between the surfaces R3 and R4, and the pupil light rays form an intermediate image in the space between the surfaces R5 and R6.

The lateral aberrations of the optical system of the present embodiment are shown in FIG. 23.

In the present embodiment, the direction of the reference axis entering the optical element 10 and the direction of the reference axis exiting therefrom are parallel to each other and are opposite to each other. Also, the whole of the reference axis including entering and exiting lies in the paper of the drawing (YZ plane).

Owing to such refractive powers by the entrance and exit surfaces and to such refractive powers in the internal space therebetween by the plurality of curved reflecting mirrors, the optical element 10 functions as a lens unit having a desired optical performance with the overall refractive power being positive.

In the present embodiment, focusing to shorter object distances is performed by moving the whole optical system relative to the image sensing surface R9 of the image pickup element. Particularly in the present embodiment, because the direction of the reference axis entering the optical element 10 and the direction of the reference axis exiting from the optical element 10 are parallel to each other, the whole optical system can be moved in parallel to the direction of the exiting reference axis (Z axis direction), so that the focusing operation is carried out likewise as in the conventional lens system.

In the present embodiment, the entrance surface R2 is made to be a convex refracting surface of a sphere, thereby converging the off-axial principal ray. With this, when increasing the angle of field, the effective diameter of the first reflecting surface R3 is prevented from increasing in size. Also, the exit surface R8 is made to be a concave refracting surface of sphere. With this arrangement, for the on-axial rays, a long back focal distance is secured, and, for the off-axial rays, it becomes telecentric to the image side.

It will be appreciated from each of the foregoing embodiments that the optical element essential to the invention has a constructional feature of having at least three curved reflecting surfaces. In the prior art, it has been the common practice to employ two curved reflecting surfaces as decentered. In this case, the on-axial light beam could be corrected for aberrations, but it is very difficult to correct the off-axial light beam. In the present invention, on the other hand, use is made of at least three reflecting surfaces imparted with such curvature and so decentered that they get refractive powers. The aberrations are well corrected over the entire area of the two-dimensional image plane.

Also, in the embodiments 1 to 5 and 8 to 10 using the optical element provided, on the external surface of the transparent body, the light entrance and exit surfaces and the curved reflecting surfaces of internal reflection, 70% or more of the length of the reference axis in the interior of the optical element is found present in one and the same plane. More specifically speaking, in the embodiments 1 to 4 and 8 to 10, the whole of the reference axis is contained in one and the same plane. By virtue of this, the optical system of reflecting type of the invention can be formed to the thinnest shape in the direction perpendicular to that plane. Also, the embodiment 5 is an example of making the object light beam enter from the direction perpendicular to the plane containing most of the reference axis. Even in this case, at least 70% of the reference axis lies in one plane. Therefore, for the direction perpendicular to that plane, the optical system can be formed to be very thin. It is to be noted that, for the favorable results, it is preferable that 80% or more of the reference axis lies in one plane.

The values of the factors in the conditions (1) to (4) of the first curved reflecting surface, when counted from the object side, for the embodiments are listed below.

| | Inequality of Condition | | | |
|---|---|---|---|---|
| Embodiment No. | (1) a b >0 | (2) t/\|θ\| 0.9< <1.5 | (3) \|a\|/d 0.9< <2.0 | (4) \|b\|/d 0.9< <2.0 |
| 1 | 203.37 | 1.04 | 1.56 | 1.21 |
| 2 | 137.57 | 1.16 | 1.18 | 1.35 |
| 4 | 130.09 | 1.07 | 1.30 | 1.36 |
| 6 | 205.31 | 1.38 | 1.03 | 1.30 |
| 7 | 365.32 | 1.04 | 1.51 | 1.17 |
| 8 | 167.49 | 1.01 | 1.25 | 1.33 |
| 9 | 181.83 | 1.04 | 1.14 | 1.02 |
| 10 | 242.88 | 1.02 | 1.30 | 1.20 |

It is to be noted that, though the foregoing embodiments have been described all in connection with the stop located at a position nearest to the object side of the optical system, because, in the embodiments of the invention, a real image of the pupil is formed within the optical system, as the case may be, the optical element is divided into two parts with the boundary at the position of that image and the stop is put in the space therebetween. If so, the entrance pupil is formed at a position nearest to the object side of the optical system likewise as in the foregoing embodiments. Thus, an equivalent optical system is obtained with similar advantages. In this case, it is recommended that the entrance pupil takes its place on the object side of the first curved reflecting surface, when counted from the object side, of the one of the optical elements which receives at first the light beam from the object. With this, the same improved results as those of the foregoing embodiments are effected.

The present invention has set forth the design rules as described above so that many advantages are produced. Of these, the remarkable ones are as follows.

With the use of the optical elements each having a plurality of reflecting surfaces of curved and flat shapes formed in unison, the compact form of the entirety of the mirror optical system is improved, while still permitting the position and angle tolerances (assembling tolerances) for the reflecting mirrors to be made looser than was heretofore usually necessary to the mirror optical systems. Hence, it is possible to achieve a highly accurate optical system of reflecting type and an image pickup apparatus using the same.

With the use of a configuration that the stop is located at a position nearest to the object side of the optical system, and the object and pupil images are formed at least once in the interior of the optical element, despite the wide angle of field from the point of view of the reflecting type of optical system, the effective diameter of the optical system is shortened. In addition, of the reflecting surfaces constituting the optical element, some are given appropriate refractive powers and the reflecting surfaces constituting every optical system are arranged in appropriate decentering relation to obtain a desired zigzagging optical path within the optical system. Hence, it is possible to achieve an optical system of reflecting type whose total length in a certain direction is shorter than was heretofore possible and an image pickup apparatus using the same.

Besides these, according to the invention, the following advantages are produced.

In the case of the embodiments either when the stop is ahead of the optical element, or when the entrance pupil lies on the object side of the first reflecting surface, when counted from the object side of the optical element, particularly the impartment of the converging function to the first reflecting surface of the optical element contributes to a reduction of the size of the optical system, since the pupil ray (principal ray) forms the intermediate image in the stage near to the entrance surface, so that a further thinning of the optical system is assured. After having exited from the stop R1 and before diverging largely, the off-axial principal ray is made to converge. With this, when increasing the angle of view of the optical system, the increase of the effective diameters of the first reflecting surface and those that follow is suppressed.

In a case where the first reflection surface is an ellipsoid of revolution with a focus at an apparent stop center as viewed from that reflection surface (entrance pupil to that reflecting surface) and another focus at a point on the zigzagging reference axis of the interior of the optical system, the off-axial principal ray is possible to form an intermediate image point with almost no aberrations. By this, thinning of the optical element can be achieved and, at the same time, the off-axial aberrations are suppressed from increasing in the initial stage.

In the embodiments of the invention, if the entrance and exit surfaces of the optical system are imparted with refractive powers, distinct effects are produced. For example, with the entrance surface, when in a concentric concave form to the off-axial principal ray, all off-axial aberrations can be reduced. Also, with the exit surface, when in a convex form, the back focal distance is prevented from becoming too long. Meanwhile, if the entrance surface is made convex, because the off-axial rays converge by this surface, the first reflecting surface can be prevented from increasing in its size largely.

Also, the shape of the exit surface may otherwise be determined so that the off-axial principal ray (pupil ray) to this surface refracts to an angle depending on its angle of incidence, thereby effecting almost perfect parallelism on the exit side (the image side), that is, telecentricity. In application of this to the image pickup element such as CCD, where a gap exists between the color filter of the CCD and the light sensing surface, the ability to separate colors is advantageously prevented from varying with variation of the angle of incidence on the image pickup element, because, if the optical system is made telecentric to the image side, the principal rays of the on-axial and off-axial light beams both become almost parallel to the optical axis so that the angle of incidence on the CCD becomes almost constant over the entire area of the light sensing surface thereof.

Further, in the embodiments, whilst almost every reflecting surfaces has only one plane of symmetry, the entrance and exit surfaces are of rotationally symmetric form with respect to the reference axis. By virtue of this, the reference axis can be accurately measured and tested when manufacturing the optical systems. Also, by making the refracting surface to be rotationally symmetric, the amount of produced asymmetric chromatic aberrations can be reduced.

In the conventional optical system shown in FIG. 28, the reflecting surfaces at the entrance and exit sides have refractive powers, but the reflections therebetween merely guide the light beam, that is, play the only role of the so-called light guide. In the embodiments of the invention, on the other hand, at least three refractive power-imparted reflecting surfaces are formed in a unit, thereby producing the combined function of folding the optical axis and of correcting aberrations for the two-dimensional image plane. Thus, a photographic optical system of compact form and large flexibility of the contour with good performance can be obtained.

In the embodiments of the invention, the object light rays and the pupil light rays each form an intermediate image. The intermediate images of the object and pupil take their place nearer to the entrance surface than with the conventional photographic optical system, thereby suppressing the size of each surface on the image side of the stop. Thus, the invention has succeeded in minimizing the size of the cross-section of the optical system.

Further, in the embodiments of the invention, the reference axis that is zigzagging in the interior of the optical system is contained in one and the same plane, that is, in the YZ plane. By combining this with the formation of the intermediate images with the object light rays and pupil light rays within the element, the size in the direction (X direction) perpendicular to the YZ plane is minimized.

The reflecting surfaces constituting the optical element each have its normal line at the point of intersection of the entering and exiting reference axis to be out of coincidence with the direction of the reference axis, or are the so-called decentered reflecting surface. This is for the purpose of preventing the vignetting effect from being produced as in the conventional mirror optical system. At the same time, by this, a free layout can be adopted. So, an optical element of good space efficiency, compact form and free shape can be made up.

Further, the shape of each reflecting surface has different radii of curvature in the two planes (yz plane and xz plane) orthogonal to each other. This is for the purpose of suppressing the decenterihg aberrations produced by the decentering arrangement of each reflecting surface. Further, this reflecting surface is made asymmetric, thereby achieving good correction of all aberrations for a desired optical performance.

In the invention, as the interior of the optical element is filled with a transparent material such as glass, the molding techniques can be employed to thereby improve the productivity and reduce the production cost. Meanwhile, if the optical element is formed to a hollow core block, and the external mirrors are formed in the surfaces of the hollow core, it becomes possible to achieve reduction of the weight of the optical system and also to reduce chromatic aberrations.

In the invention, the stop is arranged just in front of the entrance surface of the optical element, or the entrance pupil is on the object side of the first reflecting surface, when counted from the object side, of the optical element. In the case of the conventional optical system, the stop is often located in the interior of the optical system. Moreover, in most cases, the entrance pupil is at a far position from the entrance surface. Therefore, a problem arises in that the farther the separation from the stop to the entrance surface at the most front as viewed from the stop, the higher the rate at which the ray effective diameter of the entrance surface increases with increase of the angle of view. In the embodiments of the invention, by arranging the stop or the entrance pupil on the object side of the optical element (on the light beam entering side of the optical system), the increase of the size of the photographic optical system resulting from the increase of the angle of view of the optical system is suppressed to a minimum.

In a case where the directions of the entering reference axis and the exiting reference axis are made parallel to each other, focusing can be performed in a similar manner to that of the conventional lens system by moving the whole optical system in parallel to the entering or exiting reference axis. Moreover, the target area is not caused to change by such focusing.

As the feature of the reflecting type optical system, the surfaces can be arranged in various ways. So, there is a wide variety of choices in the combination of the directions of the entering reference axis and the exiting reference axis.

In more detail, according to the invention, a wide variety of forms of optical elements can be obtained with the orientation of the entering reference axis different from that of the exiting reference axis. By virtue of a high degree of freedom for the layout, therefore, it becomes possible to adopt the most suitable form of the photographic optical system for the camera or the like apparatus.

What is claimed is:

1. An optical system forming an image of an object, comprising:
   at least three curved reflecting surfaces, at least one curved reflecting surface of said at least three curved reflecting surfaces having a shape of rotational asymmetry,
   wherein an object ray reflected from at least one curved reflecting surface of said at least three curved reflecting surfaces temporarily forms a real image of the object in an optical path of said optical system, and a pupil ray reflected from at least one curved reflecting surface of said at least three curved reflecting surfaces forms a real image of a pupil in an optical path of said optical system.

2. An optical system according to claim 1, further comprising an optical unit including said at least three curved reflecting surfaces,
   wherein the object ray forms a real image of the object in said optical unit, and the pupil ray forms a real image of the pupil in said optical unit.

3. An optical system according to claim 2, wherein said optical unit is one optical element composed of a transparent medium, and said at least three curved reflecting surfaces are internal reflection surfaces provided in the optical element.

4. An optical system according to claim 1, wherein said at least three curved reflecting surfaces have a shape of rotational asymmetry.

5. An optical system according to claim 4, wherein said at least three curved reflecting surfaces have a shape of symmetry with respect to only one symmetry plane.

6. An optical system according to claim 1, wherein an entrance pupil of said optical system is disposed nearer to the light entrance side than a reflecting surface, which is disposed nearest to the light entrance side among the curved reflecting surfaces included in said optical system.

7. An image pickup apparatus, comprising an optical system forming an image of an object, said optical system comprising:

at least three curved reflecting surfaces, at least one curved reflecting surface of said at least three curved reflecting surfaces having a shape of rotational asymmetry, wherein an object ray reflected from at least one curved reflecting surface of said at least three curved reflecting surfaces temporarily forms a real image of the object in an optical path of said optical system, and a pupil ray reflected from at least one curved reflecting surface of said at least three curved reflecting surfaces forms a real image of a pupil in an optical path of said optical system; and an image pickup medium in which an image sensing surface is arranged at a position where an image of an object is formed by said optical system.

* * * * *

UNITED STATES PATENT AND TRADEMARK OFFICE
CERTIFICATE OF CORRECTION

PATENT NO. : 6,785,060 B2
APPLICATION NO. : 10/043305
DATED : August 31, 2004
INVENTOR(S) : Kenichi Kimura et al.

It is certified that error appears in the above-identified patent and that said Letters Patent is hereby corrected as shown below:

ON THE TITLE PAGE
Item (56), Foreign Patent Documents, "0 722 106  7/1796" should read --0 722 106  7/1996--.

COLUMN 2
Line 3, "114 of" should read --114.  Of--.

COLUMN 8
Line 37, "a sectional" should read --sectional--.

COLUMN 10
Line 56, "have" should read --has--.

COLUMN 11
Lines 43-45, "Further, in a case where the following conditions are satisfied, $C_{03}=C_2=0$, t=0 its shape is symmetrical with respect to to the XZ plane." should be deleted.
Line 53, "$C_{02}=C_{20}$, $C_{04}=C_{40}C_{22}/2$" should read --$C_{02}=C_{20}$, $C_{04}=C_{40}=C_{22}/2$--.

COLUMN 13
Line 38, "respect'" should read --respect--.

COLUMN 18
Line 24, "entering" should read --entering and exiting lies in the paper of the drawing (YZ plane)--.

COLUMN 19
Line 20, "R9: -17.732" should read --R9:-17.732
              R10: ∞--.

UNITED STATES PATENT AND TRADEMARK OFFICE
CERTIFICATE OF CORRECTION

PATENT NO. : 6,785,060 B2
APPLICATION NO. : 10/043305
DATED : August 31, 2004
INVENTOR(S) : Kenichi Kimura et al.

It is certified that error appears in the above-identified patent and that said Letters Patent is hereby corrected as shown below:

COLUMN 22
Line 12, "a sectional view" should read --sectional views--.

COLUMN 26
Line 8, "surface" should read --surfaces--.

Signed and Sealed this

Twenty-sixth Day of December, 2006

JON W. DUDAS
*Director of the United States Patent and Trademark Office*